US011704219B1

(12) United States Patent
Lerner et al.

(10) Patent No.: US 11,704,219 B1
(45) Date of Patent: Jul. 18, 2023

(54) PERFORMANCE MONITORING OF DISTRIBUTED LEDGER NODES

(71) Applicant: SPLUNK Inc., San Francisco, CA (US)

(72) Inventors: Steven Lerner, Montclair, NJ (US); Antoine Toulme, San Jose, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/492,942

(22) Filed: Oct. 4, 2021

(51) Int. Cl.
G06F 11/30 (2006.01)
G06F 11/32 (2006.01)
G06F 11/07 (2006.01)
G06F 11/34 (2006.01)

(52) U.S. Cl.
CPC ........ G06F 11/327 (2013.01); G06F 11/0709 (2013.01); G06F 11/302 (2013.01); G06F 11/3419 (2013.01); G06F 11/3466 (2013.01)

(58) Field of Classification Search
CPC .............. G06F 11/327; G06F 11/3006; G06F 11/3417; G06F 11/0709; G06F 11/302; G06F 11/3466; G06F 11/30; G06F 11/3055; G06F 11/202
See application file for complete search history.

(56) References Cited

U.S. PATENT DOCUMENTS

| | | | |
|---|---|---|---|
| 6,324,659 B1 * | 11/2001 | Pierro ................. | G06F 11/2257 714/48 |
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 9,798,629 B1 * | 10/2017 | Shilane ............... | G06F 11/1466 |
| 10,127,258 B2 * | 11/2018 | Lamas ................ | G06F 16/2291 |
| 2002/0147966 A1 * | 10/2002 | Frazier ................ | G06F 11/3409 717/130 |
| 2011/0264790 A1 * | 10/2011 | Haeuptle ............. | G06F 11/3419 709/224 |
| 2014/0215459 A1 * | 7/2014 | Tsirkin ................ | G06F 9/45558 718/1 |
| 2019/0098106 A1 | 3/2019 | Mungel et al. | |

(Continued)

FOREIGN PATENT DOCUMENTS

JP           10269084 A   * 10/1998   ......... G06Q 20/3821

OTHER PUBLICATIONS

Splunk Enterprise 8.0.0 Overview, available online, retrieved May 20, 2020 from docs.splunk.com.

(Continued)

*Primary Examiner* — Yolanda L Wilson

(74) *Attorney, Agent, or Firm* — Lowenstein Sandler LLP

(57) ABSTRACT

Systems and methods for performance monitoring of distributed ledger nodes by data intake and query systems. An example method includes: receiving, by an application performance monitoring engine, from a distributed ledger node, values of a plurality of metrics reflecting operational parameters of one or more tasks performed by the distributed ledger node; determining, by analyzing a data set comprising the values of the plurality of metrics, a value of a performance parameter of the distributed ledger node; and generating an alert responsive to determining that the value of the performance parameter satisfies an alert triggering condition.

20 Claims, 38 Drawing Sheets

(56) References Cited

U.S. PATENT DOCUMENTS

| | | | | |
|---|---|---|---|---|
| 2020/0034833 | A1* | 1/2020 | Collen | G06Q 50/06 |
| 2021/0133079 | A1* | 5/2021 | Kannan | G06F 11/3476 |
| 2021/0365341 | A1* | 11/2021 | Nath | H04L 9/3297 |
| 2022/0012120 | A1* | 1/2022 | Safary | G06F 11/0751 |
| 2022/0114150 | A1* | 4/2022 | Saurabh | H04L 67/1001 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pds/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

\* cited by examiner

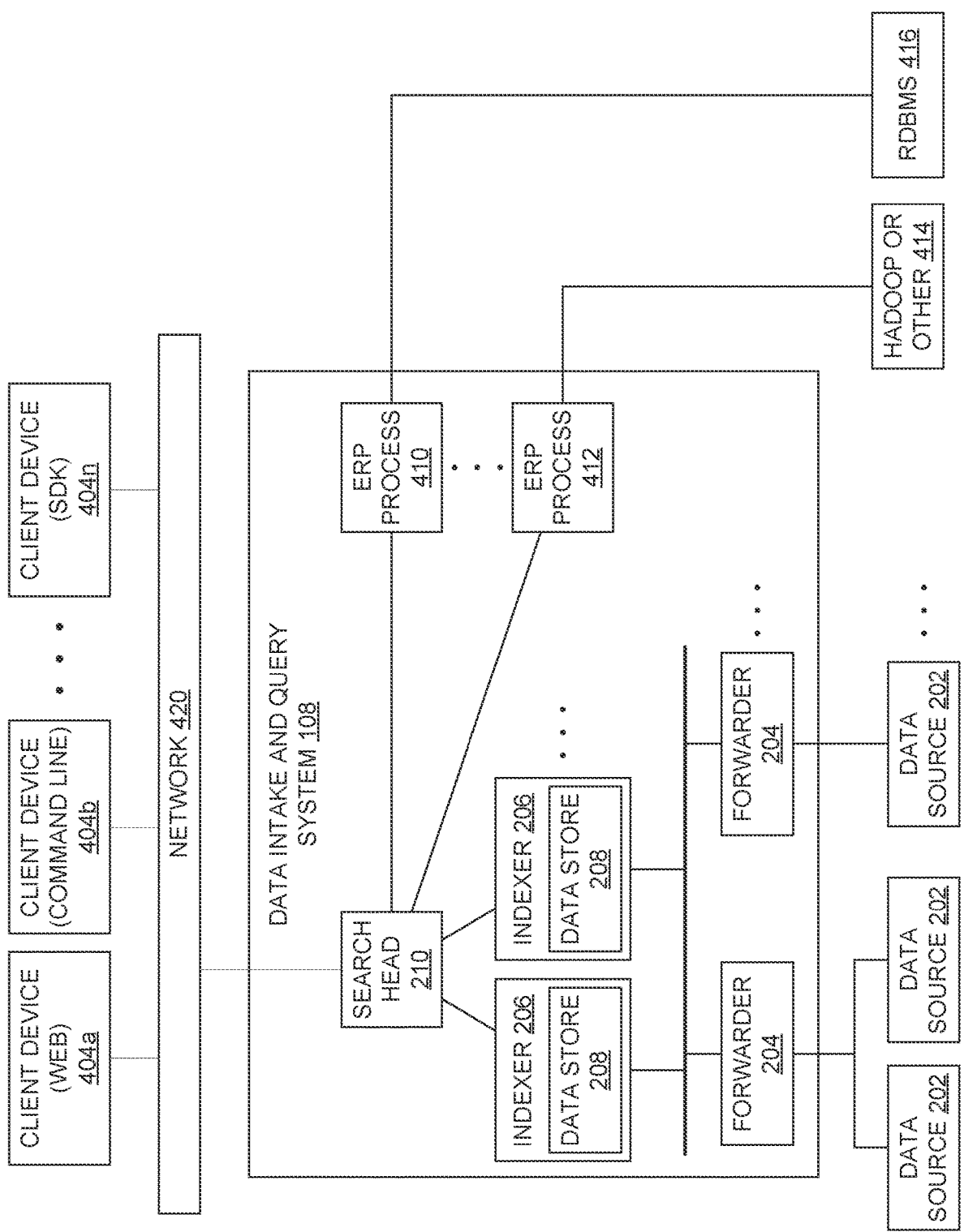

| Time 535 | Host 536 | Source 537 | Source Type 538 | Event 539 |
|---|---|---|---|---|
| 531 — 10/10/2000 1:55 p.m. | www1 | access.log | access_combined | 540 541 542<br>127.0.0.1 - frank [10/Oct/2000:13:55:36-0700] "GET/apache.gif HTTP/1.0" 200 2326 0.0947<br>543 545 |
| 532 — 10/10/2000 1:56 p.m. | www2 | access.log | access_combined | 127.0.0.1 - bob [10/Oct/2000:13:56:36-0700] "GET/mickey_mouse.gif HTTP/1.0" 200 2980 0.0899<br>546 |
| 533 — 10/10/2000 1:57 p.m. | www2 | access.log | access_combined | 127.0.0.1 - carlos [10/Oct/2000:13:57:36-0700] "GET/donald_duck.gif HTTP/1.0" 200 2900 0.0857 |
| 534 — 10/10/2000 1:58 p.m. | www2 | error.log | apache_error | [Sunday Oct 10 1:58:33 2010] [error] [client 127.10.1.1.015] File does not exist: /home/reba/public_html/images/daffy_duck.gif |

| Data Summary | | |
|---|---|---|
| Hosts (5) | Sources (8) | Sourcetypes (3) | filter

| Host ≎ | Count ≎ | Last Update ≎ |
|---|---|---|
| mailsv | 9,829 | 4/29/14 1:32:47.000 PM |
| vendor_sales | 30,244 | 4/29/14 1:32:46.000 PM |
| www1 | 24,221 | 4/29/14 1:32:44.000 PM |
| www2 | 22,595 | 4/29/14 1:32:47.000 PM |
| www3 | 22,975 | 4/29/14 1:32:45.000 PM |

Original Search:
Search "error" | stats count BY host  ~1602

Sent to peers:
Search "error" | prestats count BY host  ~1604

Executed by search head:
Aggregate the prestats results received from peers  ~1606

PERFORMANCE MONITORING OF DISTRIBUTED LEDGER NODES

TECHNICAL FIELD

Embodiments of the present disclosure are generally related to data intake and query systems, and more specifically, to performance monitoring of distributed ledger nodes.

BACKGROUND

A distributed ledger may include multiple nodes, such that each node may be associated with one or more distributed ledger accounts. The distributed ledger may implement a transaction-based state machine, which transitions to a new state based on a set of inputs represented by transactions.

BRIEF DESCRIPTION OF THE DRAWINGS

The examples described herein will be understood more fully from the detailed description given below and from the accompanying drawings, which, however, should not be taken to limit the application to the specific examples, but are for explanation and understanding.

FIG. 4 is a block diagram of an example data intake and query system that performs searches across external data systems, in accordance with example embodiments;

FIG. 5C provides a visual representation of the manner in which a pipelined search language or query operates, in accordance with example embodiments;

FIG. 8A is an interface diagram of an example user interface for a search screen, in accordance with example embodiments;

FIG. 8B is an interface diagram of an example user interface for a data summary dialog that enables a user to select various data sources, in accordance with example embodiments;

FIGS. 9, 10, 11A, 11B, 11C, 11D, 12, 13, 14, and 15 are interface diagrams of example report generation user interfaces, in accordance with example embodiments;

FIG. 17B is an interface diagram of an example user interface of an incident review dashboard, in accordance with example embodiments;

DETAILED DESCRIPTION

Figure 1:
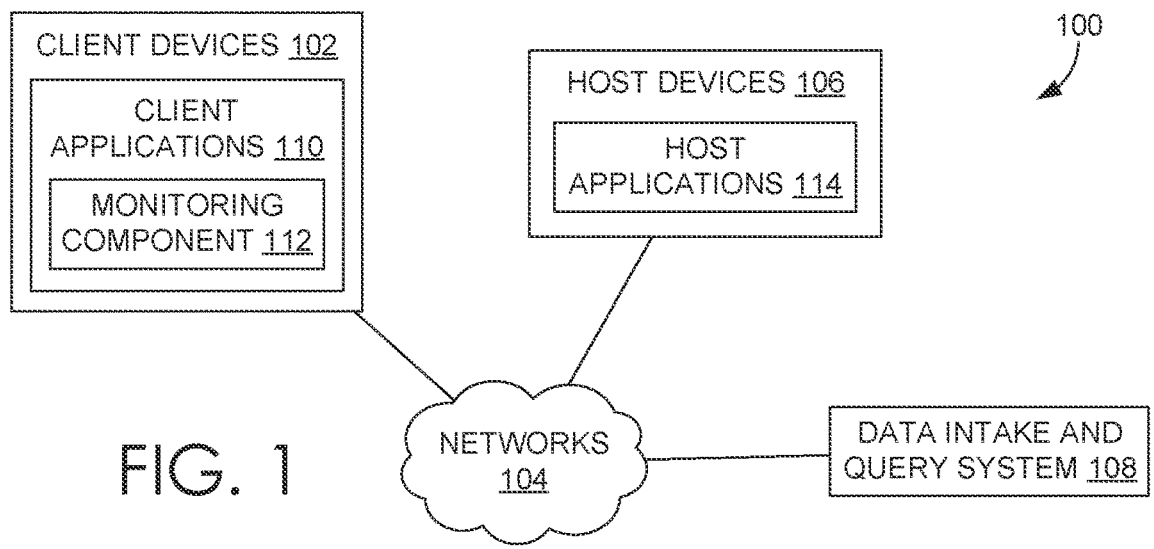
FIG. 1 is a block diagram of an example networked computer environment, in accordance with example embodiments.

Described herein are systems and methods for performance monitoring of distributed ledger nodes. The metric, log, and trace data received from distributed ledger notes may be utilized for data extraction and visualization, as well as for further processing, such as diagnostics, performance improvement recommendations, alert triggering, and/or reporting, as described in more detail herein below.

An example distributed ledger may include multiple nodes, such that each node may be associated with one or more distributed ledger accounts. The distributed ledger may implement a transaction-based state machine, which transitions to a new state based on a set of inputs represented by transaction records (referred to as "transactions" for conciseness). A distributed ledger may be cryptographically-protected, e.g., by cryptographically encrypting the transaction records, such that reversing a transaction becomes computationally infeasible. In one embodiment, the cryptographically-protected distributed ledger may be implemented by a blockchain.

A transaction may encode a message that is sent by a source account to a destination account. The message, which is signed by the private key of the source account, may specify a transfer of a certain amount of a digital asset from the source account to the destination account. In various implementations, a transaction may further specify various other parameters, e.g., the amount of a digital asset to be transferred to a node that has successfully processed the transaction. A transaction may be cryptographically signed by the originating node.

To cause a state transition of the blockchain, a transaction should be validated by at least one node, which would then include it, together with other transactions, into a block that is appended to the blockchain. The block also includes a "proof of work" value that has been computed by the node that created the block in order to enforce a sequential order of blocks. The proof of work value is produced by solving a computationally intensive task (e.g., computing padding bits to be appended to the block in order to produce a predetermined value of the block hash). Some distributed ledgers, such as Ethereum, may rely on other consensus mechanisms, such as Clique, IBFT, PBFT, or use proof of stake instead of proof of work to order blocks. Thus, a distributed ledger may implement a cryptographically protected distributed immutable database and a distributed virtual machine for executing smart contracts.

A data intake and query system operating in accordance with aspects of the present disclosure may implement various Getting-Data-In (GDI) components (such as data adapters, monitors, forwarders, connectors, or the like) in order to ingest the distributed ledger transaction data, e.g., by reading log files maintained by one or more nodes of the distributed ledger, listening to the blocks, transactions, and events that are broadcasted to all participating nodes of a distributed ledger, and/or performing other actions. Furthermore, the data intake and query system may further employ data collection agents operating on the distributed ledger nodes for collecting metrics, traces, and logs reflecting the operational aspects and internal states of the respective nodes. The ingested data may be aggregated, decoded, visualized, and/or further processed by the data intake and query system.

In some implementations, the data intake and query system may include an application performance monitoring (APM) engine, which is employed to receive and process metric, trace, and log data from the data collector agents operating on the distributed ledger nodes. In some implementations, the data collector agent may, by analyzing the collected raw data, build enhanced execution profiles of one or more functional components of a given node. The execution profiles may reflect the times of performing various operations, such as verifying block signature, generating a hash of the block, saving data to a local data store, receiving and/or sending data over the network, etc.

The collected metrics, traces, and logs raw data may be processed by the data collector agent in order to produce profiling data reflecting the operation of the distributed ledger node. In various illustrative example, the profiling data may reflect the elapsed time to store various data objects to a local data store, to perform various block processing functions (e.g., verifying block signature, computing a hash of the block), to receive and/or transmit messages, to run discovery sessions, to obtain a number of peers that would be sufficient for synchronization, etc.

The data intake and query system may process the data received from one or more distributed ledger nodes in order to identify the structure of the distributed ledger system and/or given node, identify node failures or bottlenecks, perform node diagnostics, and generate troubleshooting and/or performance improvement recommendations. Analyzing the collected metrics, log, trace, and transaction data may provide useful insights into the state of the distributed ledger system, a given transaction, and/or a specified node.

The data intake and query system may render various visual representations of the data received from the data collector agents operating on the nodes and/or information and recommendations derived from the collected data, as described in more detail herein below.

In some implementations, the data intake and query system may be represented by the SPLUNK® ENTERPRISE system developed by Splunk Inc. of San Francisco, Calif., as described in more detail herein below.

The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data may have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data may comprise various data items of different data types that may be stored at different locations within the data. For example, when the data source is an operating system log, an event may include one or more lines from the operating system log containing machine data that includes different types of performance and diagnostic information associated with a specific point in time (e.g., a timestamp).

Examples of components which may generate machine data from which events may be derived include, but are not limited to, web servers, application servers, databases, firewalls, routers, operating systems, and software applications that execute on computer systems, mobile devices, sensors, Internet of Things (IoT) devices, distributed ledger nodes, cloud compute infrastructure and its associated components, etc. The machine data generated by such data sources may include, for example and without limitation, server log files, activity log files, configuration files, messages, network packet data, performance measurements, sensor measurements, distributed ledger transactions, key/value metric pairs and application traces related to physical or virtual infrastructure and software etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events.

One aspect of a late-binding schema is applying extraction rules to events to extract values for specific fields during search time. More specifically, the extraction rule for a field may include one or more instructions that specify how to extract a value for the field from an event. An extraction rule may generally include any type of instruction for extracting values from events. In some cases, an extraction rule comprises a regular expression, where a sequence of characters forms a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema may be developed on an ongoing basis until the time a query is actually executed. This means that extraction rules for the fields specified in a query may be provided in the query itself, or may be located during execution of the query. Hence, as a user learns more about the data in the events, the user may continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 may provide access to different content, for instance, content provided by one or more host devices 106, etc. Each client device 102 may comprise one or more client applications 110, described in more detail in a separate section hereinafter.

In some embodiments, each client device 102 may host or execute one or more client applications 110 that are capable of interacting with one or more host devices 106 via one or more networks 104. For instance, a client application 110 may be or comprise a web browser that a user may use to navigate to one or more web sites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that may be incorporated into the code implementing a client application 110. When the code is converted to an executable application, the custom code implementing the monitoring functionality may become part of the application itself.

In some embodiments, an SDK or other code for implementing the monitoring functionality may be offered by a provider of a data intake and query system, such as a system 108. In such cases, the provider of the system 108 may implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 may add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets may be read or examined to identify network data contained within the packets, for example, and other aspects of data packets may be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data may be transmitted to a data intake and query system 108 for analysis.

Upon developing a client application 110 that incorporates a monitoring component 112, the client application 110 may be distributed to client devices 102. Applications generally may be distributed to client devices 102 in any manner, or they may be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "network Latency" field (not shown in the Figure) in which a value is stored. This field indicates a network latency measurement associated with one or more network requests. The data record may include a "state" field to store a value indicating a state of a network connection, and so forth for any number of aspects of collected performance data.

Figure 2:
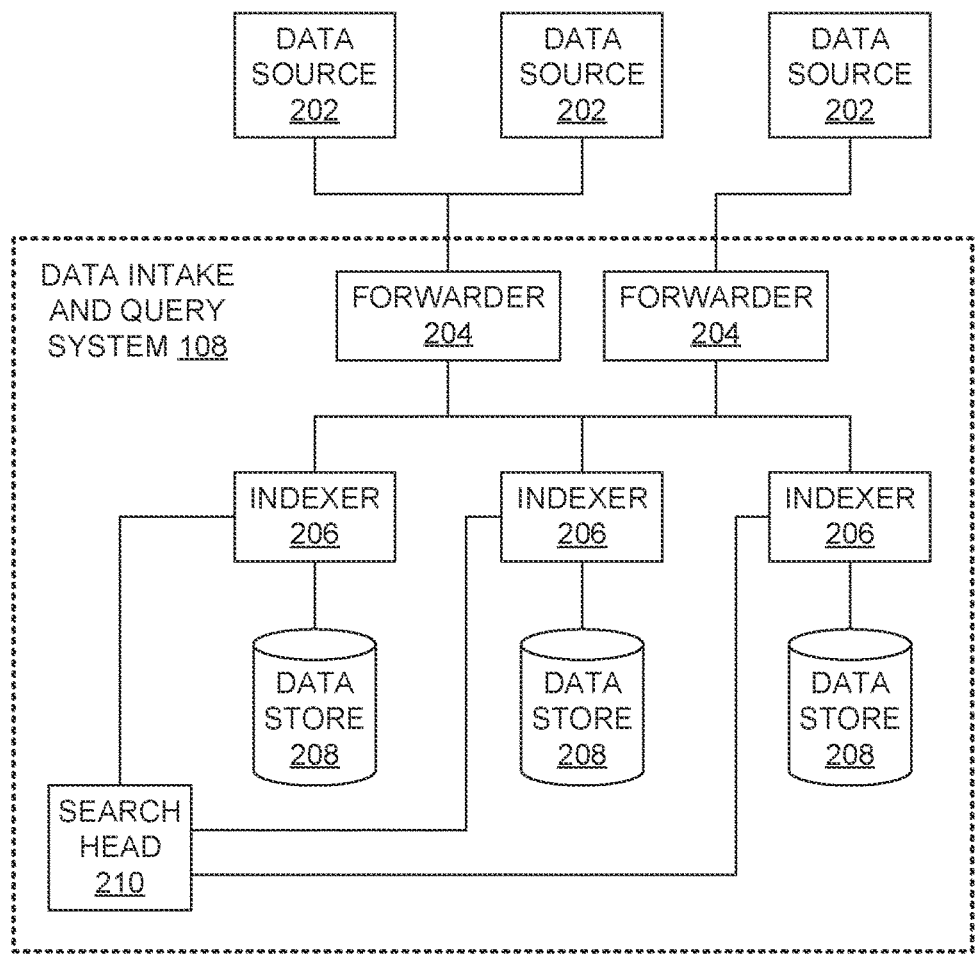
FIG. 2 is a block diagram of an example data intake and query system, in accordance with example embodiments.

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 206 may comprise separate computer systems, or may alternatively comprise separate processes executing on one or more computer systems.

Each data source 202 broadly represents a distinct source of data that may be consumed by system 108. Examples of data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 may also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally, or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that is accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
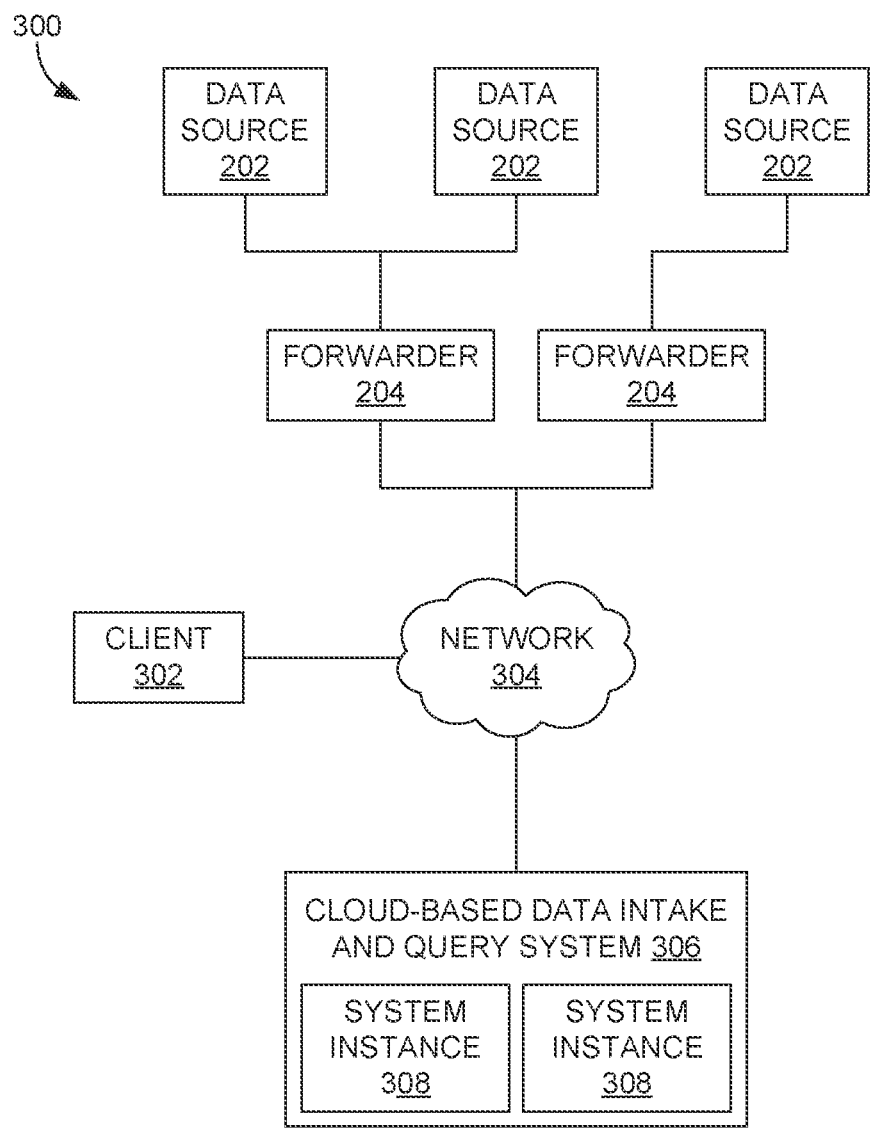
FIG. 3 is a block diagram of an example cloud-based data intake and query system, in accordance with example embodiments.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK® CLOUD, are centrally visible).

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, Calif. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b . . . 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores may comprise one or more storage devices and typically reside on the same system, though they may be connected via a local network connection.

If the request parameters of the received search request reference an external data collection, which is not accessible to the indexers 206 or under the management of the data intake and query system, then the search head 210 may access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively, or additionally, an ERP process may be spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 may communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

The ERP processes described above may include two operation modes: a streaming mode and a reporting mode. The ERP processes may operate in streaming mode only, in reporting mode only, or in both modes simultaneously. Operating in both modes simultaneously is referred to as mixed mode operation. In a mixed mode operation, the ERP at some point may stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which may then process the results data (e.g., break the machine data into events, timestamp it, filter it, etc.) and integrate the results data with the results data from other external data sources, and/or from data stores of the search head. The search head performs such processing and may immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically, the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode may involve the ERP process (or an external system) performing event breaking, time stamping, filtering of events to match the search query request, and calculating statistics on the results. The user may request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or Map-Reduce, rather than SPL or the like).

As noted, the ERP process may operate in the streaming mode alone. After the ERP process has performed the translation of the query request and received raw results from the streaming mode, the search head may integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process may complete sufficient processing to start returning any search results. The switchover between streaming and reporting mode happens when the ERP process determines that the switchover is appropriate, such as when the ERP process determines it may begin returning meaningful results from its reporting mode.

The operation described above illustrates the source of operational latency: streaming mode has low latency (immediate results) and usually has relatively low bandwidth (fewer results may be returned per unit of time). In contrast, the concurrently running reporting mode has relatively high latency (it has to perform a lot more processing before returning any results) and usually has relatively high bandwidth (more results may be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process may be configured to operate in the reporting mode only. Also, the ERP process may be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process may be configured to merely return the contents of a search result file verbatim, with little or no processing of results. That way, the search head performs all processing (such as parsing byte streams into events, filtering, etc.). The ERP process may be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

Figure 5A:
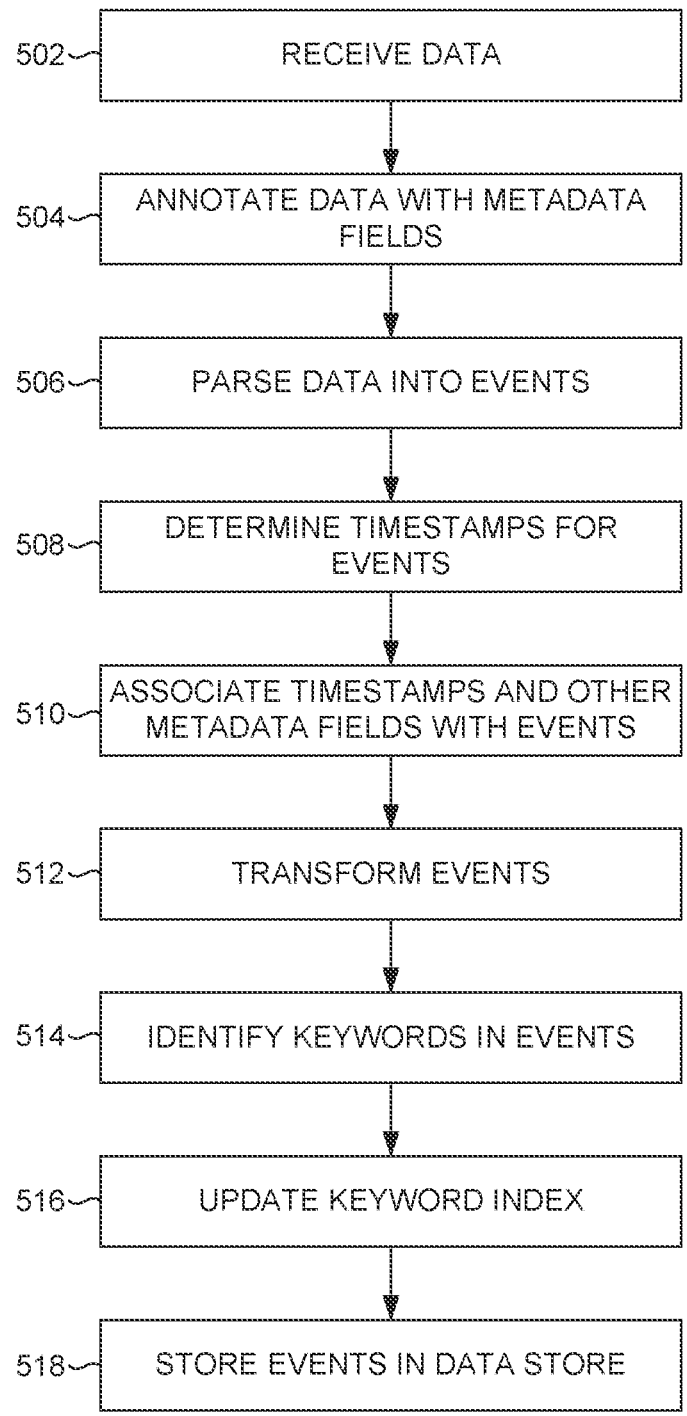
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system may employ different types of forwarders in a configuration.

In some embodiments, a forwarder may contain the essential components needed to forward data. A forwarder may gather data from a variety of inputs and forward the data to an indexer for indexing and searching. A forwarder may also tag metadata (e.g., source, source type, host, etc.).

In some embodiments, a forwarder has the capabilities of the aforementioned forwarder as well as additional capabilities. The forwarder may parse data before forwarding the data (e.g., may associate a time stamp with a portion of data and create an event, etc.) and may route data based on criteria such as source or type of event. The forwarder may also index data locally while forwarding the data to another indexer.

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer may apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations may include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data that may be stored in a data store in accordance with various disclosed embodiments. In other embodiments, machine data may be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data may be stored in a compressed or encrypted format. In such embodiments, the machine data may be stored with or be associated with data that describes the compression or encryption scheme with which the machine data is stored. The information about the compression or encryption scheme may be used to decompress or decrypt the machine data, and any metadata with which it is stored, at search time.

As mentioned above, certain metadata, e.g., host 536, source 537, source type 538 and timestamps 535 may be generated for each event, and associated with a corresponding portion of machine data 539 when storing the event data in a data store, e.g., data store 208. Any of the metadata may be extracted from the corresponding machine data, or supplied or defined by an entity, such as a user or computer system. The metadata fields may become part of or stored with the event. Note that while the time-stamp metadata field may be extracted from the raw data of each event, the values for the other metadata fields may be determined by the indexer based on information it receives pertaining to the source of the data separate from the machine data.

While certain default or user-defined metadata fields may be extracted from the machine data for indexing purposes, all the machine data within an event may be maintained in its original condition. As such, in embodiments in which the portion of machine data included in an event is unprocessed or otherwise unaltered, it is referred to herein as a portion of raw machine data. In other embodiments, the port of machine data in an event may be processed or otherwise altered. As such, unless certain information needs to be removed for some reasons (e.g., extraneous information, confidential information), all the raw machine data contained in an event may be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-533 is associated with a discrete request made from a client device. The raw machine data generated by the server and extracted from a server access log may include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 531-533 in the data store.

Event 534 is associated with an entry in a server error log, as indicated by "error.log" in the source column 537 that records errors that the server encountered when processing a client request. Similar to the events related to the server access log, all the raw machine data in the error log file pertaining to event 534 may be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user may continue to refine the late-binding schema by defining new extraction rules, or modifying or deleting existing extraction rules used by the system.

At blocks 514 and 516, an indexer may optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer may access the keyword index to quickly identify events containing the keyword.

In some embodiments, the keyword index may include entries for field name-value pairs found in events, where a field name-value pair may include a pair of keywords connected by a symbol, such as an equals sign or colon. This way, events containing these field name-value pairs may be quickly located. In some embodiments, fields may automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events may be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers may analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query. In some embodiments, each bucket may be associated with an identifier, a time range, and a size constraint. In certain embodiments, a bucket may correspond to a file system directory and the machine data, or events, of a bucket may be stored in one or more files of the file system directory. The file system directory may include additional files, such as one or more inverted indexes, high performance indexes, permissions files, configuration files, etc.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that may no longer receive events for storage but has not yet been moved to the cold directory. A cold bucket is a bucket that may no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets may also be replicated across different indexers and data stores to facilitate high availability and disaster recovery as described in U.S. Pat. No. 9,130,971, entitled "SITE-BASED SEARCH AFFINITY", issued on 8 Sep. 2015, and in U.S. patent Ser. No. 14/266,817, entitled "MULTI-SITE CLUSTERING", issued on 1 Sep. 2015, each of which is hereby incorporated by reference in its entirety for all purposes.

Figure 5B:
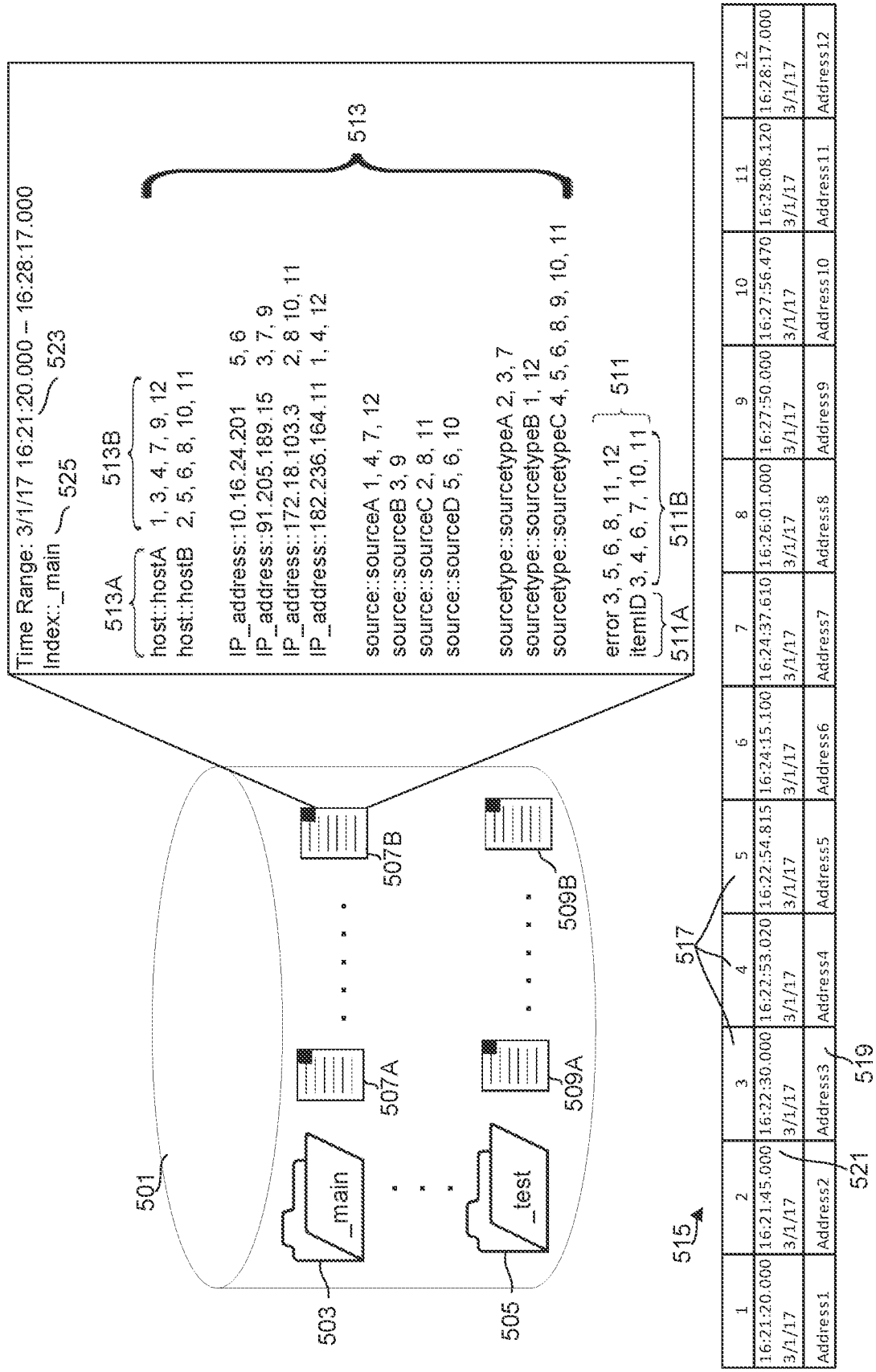
FIG. 5B is a block diagram of a data structure in which time-stamped event data may be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 may correspond to a data store 208 that stores events managed by an indexer 206 or may correspond to a different data store associated with an indexer 206. In the illustrated embodiment, the data store 501 includes a main directory 503 associated with a main index and a test directory 505 associated with a test index. However, the data store 501 may include fewer or more directories. In some embodiments, multiple indexes may share a single directory or all indexes may share a common directory. Additionally, although illustrated as a single data store 501, it will be understood that the data store 501 may be implemented as multiple data stores storing different portions of the information shown in FIG. 5B. For example, a single index or partition may span multiple directories or multiple data stores, and may be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B may be keyword indexes or field-value pair indexes described herein and may include less or more information that is depicted in FIG. 5B.

In some embodiments, the inverted index 507A . . . 507B, and 509A . . . 509B may correspond to a distinct time-series bucket that is managed by the indexer 206 and that contains events corresponding to the relevant index (e.g., main index, test index). As such, each inverted index may correspond to a particular range of time for an index. Additional files, such as high performance indexes for each time-series bucket of an index, may also be stored in the same directory as the inverted indexes 507A . . . 507B, and 509A . . . 509B. In some embodiments inverted index 507A . . . 507B, and 509A . . . 509B may correspond to multiple time-series buckets or inverted indexes 507A . . . 507B, and 509A . . . 509B may correspond to a single time-series bucket.

Each inverted index 507A . . . 507B, and 509A . . . 509B may include one or more entries, such as keyword (or token) entries or field-value pair entries. Furthermore, in certain embodiments, the inverted indexes 507A . . . 507B, and 509A . . . 509B may include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B may include less or more information than depicted.

Token entries, such as token entries 511 illustrated in inverted index 507B, may include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index main 503 that are located in the time-series bucket associated with the inverted index 507B.

In some cases, some token entries may be default entries, automatically determined entries, or user specified entries. In some embodiments, the indexer 206 may identify each word or string in an event as a distinct token and generate a token entry for it. In some cases, the indexer 206 may identify the beginning and ending of tokens based on punctuation, spaces, as described in greater detail herein. In certain cases, the indexer 206 may rely on user input or a configuration file to identify tokens for token entries 511, etc. It will be understood that any combination of token entries may be included as a default, automatically determined, and/or included based on user-specified criteria.

Similarly, field-value pair entries, such as field-value pair entries 513 shown in inverted index 507B, may include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 may be default entries, automatically determined entries, or user specified entries. As a non-limiting example, the field-value pair entries for the fields host, source, sourcetype may be included in the inverted indexes 507A . . . 507B, and 509A . . . 509B as a default. As such, all of the inverted indexes 507A . . . 507B, and 509A . . . 509B may include field-value pair entries for the fields host, source, sourcetype. As yet another non-limiting example, the field-value pair entries for the IP address field may be user-specified and may only appear in the inverted index 507B based on user-specified criteria. As another non-limiting example, as the indexer indexes the events, it may automatically identify field-value pairs and create field-value pair entries. For example, based on the indexer's review of events, it may identify IP address as a field in each event and add the IP address field-value pair entries to the inverted index 507B. It will be understood that any combination of field-value pair entries may be included as a default, automatically determined, or included based on user-specified criteria.

Each unique identifier 517, or event reference, may correspond to a unique event located in the time series bucket. However, the same event reference may be located in multiple entries. For example, if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different source types of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 may be used to locate the events in the corresponding bucket. For example, the inverted index may include, or be associated with, an event reference array 515. The event reference array 515 may include an array entry 517 for each event reference in the inverted index 507B. Each array entry 517 may include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers may be listed in chronological order or the value of the event reference may be assigned based on chronological data, such as a timestamp associated with the event referenced by the event reference. For example, the event reference 1 in the illustrated embodiment of FIG. 5B may correspond to the first-in-time event for the bucket, and the event reference 12 may correspond to the last-in-time event for the bucket. However, the event references may be listed in any order, such as reverse chronological order, ascending order, descending order, or some other order, etc. Further, the entries may be sorted. For example, the entries may be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B may be used during a data categorization request command, the indexers may receive filter criteria indicating data that is to be categorized and categorization criteria indicating how the data is to be categorized. Example filter criteria may include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer may identify the inverted indexes stored in the directory corresponding to the particular partition as relevant inverted indexes. Other means may be used to identify inverted indexes associated with a partition of interest. For example, in some embodiments, the indexer may review an entry in the inverted indexes, such as an index-value pair entry 513 to determine if a particular inverted index is relevant. If the filter criteria does not identify any partition, then the indexer may identify all inverted indexes managed by the indexer as relevant inverted indexes.

Similarly, if the filter criteria includes a time range, the indexer may identify inverted indexes corresponding to buckets that satisfy at least a portion of the time range as relevant inverted indexes. For example, if the time range is last hour then the indexer may identify all inverted indexes that correspond to buckets storing events associated with timestamps within the last hour as relevant inverted indexes.

When used in combination, an index filter criterion specifying one or more partitions and a time range filter criterion specifying a particular time range may be used to identify a subset of inverted indexes within a particular directory (or otherwise associated with a particular partition) as relevant inverted indexes. As such, the indexer may focus the processing to only a subset of the total number of inverted indexes that the indexer manages.

Once the relevant inverted indexes are identified, the indexer may review them using any additional filter criteria to identify events that satisfy the filter criteria. In some cases, using the known location of the directory in which the relevant inverted indexes are located, the indexer may determine that any events identified using the relevant inverted indexes satisfy an index filter criterion. For example, if the filter criteria includes a partition main, then the indexer may determine that any events identified using inverted indexes within the partition main directory (or otherwise associated with the partition main) satisfy the index filter criterion.

Furthermore, based on the time range associated with each inverted index, the indexer may determine that any events identified using a particular inverted index satisfies a time range filter criterion. For example, if a time range filter criterion is for the last hour and a particular inverted index corresponds to events within a time range of 50 minutes ago to 35 minutes ago, the indexer may determine that any events identified using the particular inverted index satisfy the time range filter criterion. Conversely, if the particular inverted index corresponds to events within a time range of 59 minutes ago to 62 minutes ago, the indexer may determine that some events identified using the particular inverted index may not satisfy the time range filter criterion.

Using the inverted indexes, the indexer may identify event references (and therefore events) that satisfy the filter criteria. For example, if the token "error" is a filter criterion, the indexer may track all event references within the token entry "error." Similarly, the indexer may identify other event references located in other token entries or field-value pair entries that match the filter criteria. The system may identify event references located in all of the entries identified by the filter criteria. For example, if the filter criteria include the token "error" and field-value pair sourcetype::web_ui, the indexer may track the event references found in both the token entry "error" and the field-value pair entry sourcetype::web_ui. As mentioned previously, in some cases, such as when multiple values are identified for a particular filter criterion (e.g., multiple sources for a source filter criterion), the system may identify event references located in at least one of the entries corresponding to the multiple values and in all other entries identified by the filter criteria. The indexer may determine that the events associated with the identified event references satisfy the filter criteria.

In some cases, the indexer may further consult a timestamp associated with the event reference to determine whether an event satisfies the filter criteria. For example, if an inverted index corresponds to a time range that is partially outside of a time range filter criterion, then the indexer may consult a timestamp associated with the event reference to determine whether the corresponding event satisfies the time range criterion. In some embodiments, to identify events that satisfy a time range, the indexer may review an array, such as the event reference array 515 that identifies the time associated with the events. Furthermore, as mentioned above using the known location of the directory in which the relevant inverted indexes are located (or other index identifier), the indexer may determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer may review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer may review an extraction rule that identifies how the sessionID field is to be extracted from a particular host, source, or sourcetype (implicitly identifying the particular host, source, or sourcetype that includes a sessionID field). The indexer may replace the field name "sessionID" in the filter criteria with the identified host, source, or sourcetype. In some cases, the field name "sessionID" may be associated with multiple hosts, sources, or sourcetypes, in which case, all identified hosts, sources, and sourcetypes may be added as filter criteria. In some cases, the identified host, source, or sourcetype may replace or be appended to a filter criterion, or be excluded. For example, if the filter criteria includes a criterion for source S1 and the "sessionID" field is found in source S2, the source S2 may replace S1 in the filter criteria, be appended such that the filter criteria includes source S1 and source S2, or be excluded based on the presence of the filter criterion source S1. If the identified host, source, or sourcetype is included in the filter criteria, the indexer may then identify a field-value pair entry in the inverted index that includes a field value corresponding to the identity of the particular host, source, or sourcetype identified using the extraction rule.

Once the events that satisfy the filter criteria are identified, the system, such as the indexer 206 may categorize the results based on the categorization criteria. The categorization criteria may include categories for grouping the results, such as any combination of partition, source, sourcetype, or host, or other categories or fields as desired.

The indexer may use the categorization criteria to identify categorization criteria-value pairs or categorization criteria values by which to categorize or group the results. The categorization criteria-value pairs may correspond to one or more field-value pair entries stored in a relevant inverted index, one or more index-value pairs based on a directory in which the inverted index is located or an entry in the inverted index (or other means by which an inverted index may be associated with a partition), or other criteria-value pair that identifies a general category and a particular value for that category. The categorization criteria values may correspond to the value portion of the categorization criteria-value pair.

As mentioned, in some cases, the categorization criteria-value pairs may correspond to one or more field-value pair entries stored in the relevant inverted indexes. For example, the categorization criteria-value pairs may correspond to field-value pair entries of host, source, and sourcetype (or other field-value pair entry as desired). For instance, if there are ten different hosts, four different sources, and five different sourcetypes for an inverted index, then the inverted index may include ten host field-value pair entries, four source field-value pair entries, and five sourcetype field-value pair entries. The indexer may use the nineteen distinct field-value pair entries as categorization criteria-value pairs to group the results.

Specifically, the indexer may identify the location of the event references associated with the events that satisfy the filter criteria within the field-value pairs, and group the event references based on their location. As such, the indexer may identify the particular field value associated with the event corresponding to the event reference. For example, if the categorization criteria include host and sourcetype, the host field-value pair entries and sourcetype field-value pair entries may be used as categorization criteria-value pairs to identify the specific host and sourcetype associated with the events that satisfy the filter criteria.

In addition, as mentioned, categorization criteria-value pairs may correspond to data other than the field-value pair entries in the relevant inverted indexes. For example, if partition or index is used as a categorization criterion, the inverted indexes may not include partition field-value pair entries. Rather, the indexer may identify the categorization criteria-value pair associated with the partition based on the directory in which an inverted index is located, information in the inverted index, or other information that associates the inverted index with the partition, etc. As such a variety of methods may be used to identify the categorization criteria-value pairs from the categorization criteria.

Accordingly, based on the categorization criteria (and categorization criteria-value pairs), the indexer may generate groupings based on the events that satisfy the filter criteria. As a non-limiting example, if the categorization criteria includes a partition and sourcetype, then the groupings may correspond to events that are associated with each unique combination of partition and sourcetype. For instance, if there are three different partitions and two different source types associated with the identified events, then the six different groups may be formed, each with a unique partition value-sourcetype value combination. Similarly, if the categorization criteria includes partition, sourcetype, and host and there are two different partitions, three sourcetypes, and five hosts associated with the identified events, then the indexer may generate up to thirty groups for the results that satisfy the filter criteria. Each group may be associated with a unique combination of categorization criteria-value pairs (e.g., unique combinations of partition value sourcetype value, and host value).

In addition, the indexer may count the number of events associated with each group based on the number of events that meet the unique combination of categorization criteria for a particular group (or match the categorization criteria-value pairs for the particular group). With continued reference to the example above, the indexer may count the number of events that meet the unique combination of partition, sourcetype, and host for a particular group.

Each indexer communicates the groupings to the search head. The search head may aggregate the groupings from the indexers and provide the groupings for display. In some cases, the groups are displayed based on at least one of the host, source, sourcetype, or partition associated with the groupings. In some embodiments, the search head may further display the groups based on display criteria, such as a display order or a sort order as described in greater detail above.

As a non-limiting example and with reference to FIG. 5B, consider a request received by an indexer 206 that includes the following filter criteria: keyword=error, partition=main, time range=3/1/17 16:22.00.000-16:28.00.000, sourcetype=sourcetypeC, host=hostB, and the following categorization criteria: source.

Based on the above criteria, the indexer 206 identifies main directory 503 and may ignore_test directory 505 and any other partition-specific directories. The indexer determines that inverted partition 507B is a relevant partition based on its location within the main directory 503 and the time range associated with it. For sake of simplicity in this example, the indexer 206 determines that no other inverted indexes in the main directory 503, such as inverted index 507A satisfy the time range criterion.

Having identified the relevant inverted index 507B, the indexer reviews the token entries 511 and the field-value pair entries 513 to identify event references, or events that satisfy all of the filter criteria.

With respect to the token entries 511, the indexer may review the error token entry and identify event references 3, 5, 6, 8, 11, 12, indicating that the term "error" is found in the corresponding events. Similarly, the indexer may identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer may ignore those field-value pair entries.

In addition to identifying event references found in at least one token entry or field-value pair entry (e.g., event references 3, 4, 5, 6, 8, 9, 10, 11, 12), the indexer may identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 may identify the event references that satisfy all of the filter criteria (e.g., event references 5, 6, 8).

Having identified the events (and event references) that satisfy all of the filter criteria, the indexer 206 may group the event references using the received categorization criteria (source). In doing so, the indexer may determine that event references 5 and 6 are located in the field-value pair entry source::sourceD (or have matching categorization criteria-value pairs) and event reference 8 is located in the field-value pair entry source::sourceC. Accordingly, the indexer may generate a sourceC group having a count of one corresponding to reference 8 and a sourceD group having a count of two corresponding to references 5 and 6. This information may be communicated to the search head. In turn the search head may aggregate the results from the various indexers and display the groupings. As mentioned above, in some embodiments, the groupings may be displayed based at least in part on the categorization criteria, including at least one of host, source, sourcetype, or partition.

It will be understood that a change to any of the filter criteria or categorization criteria may result in different groupings. As a one non-limiting example, a request received by an indexer 206 that includes the following filter criteria: partition=main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)
Group 2 (hostA, sourceA, sourcetypeB): 2 (event references 1, 12)
Group 3 (hostA, sourceA, sourcetypeC): 1 (event reference 4)
Group 4 (hostA, sourceB, sourcetypeA): 1 (event reference 3)
Group 5 (hostA, sourceB, sourcetypeC): 1 (event reference 9)
Group 6 (hostB, sourceC, sourcetypeA): 1 (event reference 2)
Group 7 (hostB, sourceC, sourcetypeC): 2 (event references 8, 11)
Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer may include the categorization criteria-value pairs for each group and the count. In some embodiments, the indexer may include more or less information. For example, the indexer may include the event references associated with each group and other identifying information, such as the indexer or inverted index used to identify the groups.

As another non-limiting examples, a request received by an indexer 206 that includes the following filter criteria: partition=main, time range=3/1/17 3/1/17 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)
Group 2 (hostA, sourceA, sourcetypeA): 1 (event reference 7)
Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer may review multiple inverted indexes associated with a partition or review the inverted indexes of multiple partitions, and categorize the data using any combination of partition, host, source, sourcetype, or other category, as desired.

Further, if a user interacts with a particular group, the indexer may provide additional information regarding the group. For example, the indexer may perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer may identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group may be referred to as the filter criteria associated with the group. Using the filter criteria associated with the group, the indexer identifies event references 4, 5, 6, 8, 10, 11.

Based on a sampling criteria, discussed in greater detail above, the indexer may determine that it will analyze a sample of the events associated with the event references 4, 5, 6, 8, 10, 11. For example, the sample may include analyzing event data associated with the event references 5, 8, 10. In some embodiments, the indexer may use the event reference array 515 to access the event data associated with the event references 5, 8, 10. Once accessed, the indexer may compile the relevant information and provide it to the search head for aggregation with results from other indexers. By identifying events and sampling event data using the inverted indexes, the indexer may reduce the amount of actual data this is analyzed and the number of events that are accessed in order to generate the summary of the group and provide a response in less time.

Figure 6A:
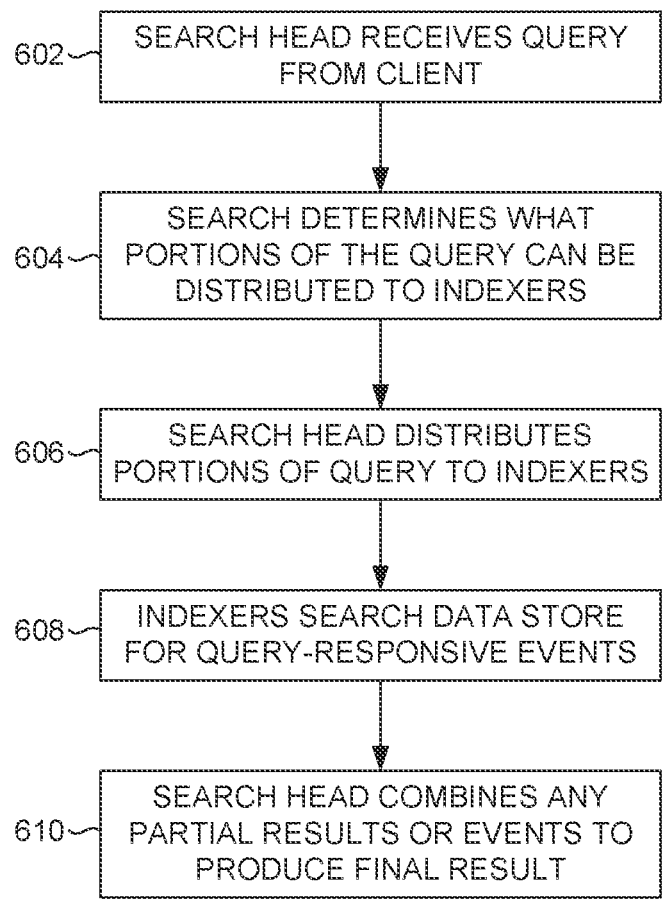
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query may be delegated to indexers and what portions of the query may be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head may distribute the determined portions of the query. The master node maintains a list of active indexers and may also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria may include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results may include a listing of matching events returned by the query, or some type of visualization of the data from the returned events. In another example, the final result may include one or more calculated values derived from the matching events.

The results generated by the system 108 may be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head may also perform various operations to make the search more efficient. For example, before the search head begins execution of a query, the search head may determine a time range for the query and a set of common keywords that all matching events include. The search head may then use these parameters to query the indexers to obtain a superset of the eventual results. Then, during a filtering stage, the search head may perform field-extraction operations on the superset to produce a reduced set of search results. This speeds up queries, which may be particularly helpful for queries that are performed on a periodic basis.

Various embodiments of the present disclosure may be implemented using, or in conjunction with, a pipelined command language. A pipelined command language is a language in which a set of inputs or data is operated on by a first command in a sequence of commands, and then subsequent commands in the order they are arranged in the sequence. Such commands may include any type of functionality for operating on data, such as retrieving, searching, filtering, aggregating, processing, transmitting, and the like. As described herein, a query may thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, may be formulated such that the order in which the commands are arranged defines the order in which the commands are applied to a set of data or the results of an earlier executed command. For example, a first command in a command sequence may operate to search or filter for specific data in particular set of data. The results of the first command may then be passed to another command listed later in the command sequence for further processing.

In various embodiments, a query may be formulated as a command sequence defined in a command line of a search UI. In some embodiments, a query may be formulated as a sequence of SPL commands. Some or all of the SPL commands in the sequence of SPL commands may be separated from one another by a pipe symbol "|". In such embodiments, a set of data, such as a set of events, may be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein may be implemented with Splunk Processing Language (SPL) used in conjunction with the SPLUNK® ENTERPRISE system.

While a query may be formulated in many ways, a query may start with a search command and one or more corresponding search terms at the beginning of the pipeline. Such search terms may include any combination of keywords, phrases, times, dates, Boolean expressions, fieldname-field value pairs, etc., specifying the results that should be obtained from an index. The results may then be passed as inputs into subsequent commands in a sequence of commands by using, for example, a pipe character. The subsequent commands in a sequence may include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary may include a graph, chart, metric, or other visualization of the data. An aggregation function may include analysis or calculations to return an aggregate value, such as an average value, a sum, a maximum value, a root mean square, statistical values, and the like.

Due to its flexible nature, use of a pipelined command language in various embodiments is advantageous because it may perform "filtering" as well as "processing" functions. In other words, a single query may include a search command and search term expressions, as well as data-analysis expressions. For example, a command at the beginning of a query may perform a "filtering" step by retrieving a set of data based on a condition (e.g., records associated with server response times of less than 1 microsecond). The results of the filtering step may then be passed to a subsequent command in the pipeline that performs a "processing" step (e.g., calculation of an aggregate value related to the filtered events such as the average response time of servers with response times of less than 1 microsecond). Furthermore, the search command may allow events to be filtered by keyword as well as field value criteria. For example, a search command may filter out all events containing the word "warning" or filter out all events where a field value associated with a field "clientip" is "10.0.1.2."

The results obtained or generated in response to a command in a query may be considered a set of results data. The set of results data may be passed from one command to another in any data format. In one embodiment, the set of result data may be in the form of a dynamically created table. Each command in a particular query may redefine the shape of the table. In some implementations, an event retrieved from an index in response to a query may be considered a row with a column for each field value. Columns contain basic information about the data and also may contain data that has been dynamically extracted at search time.

Figure 6B:
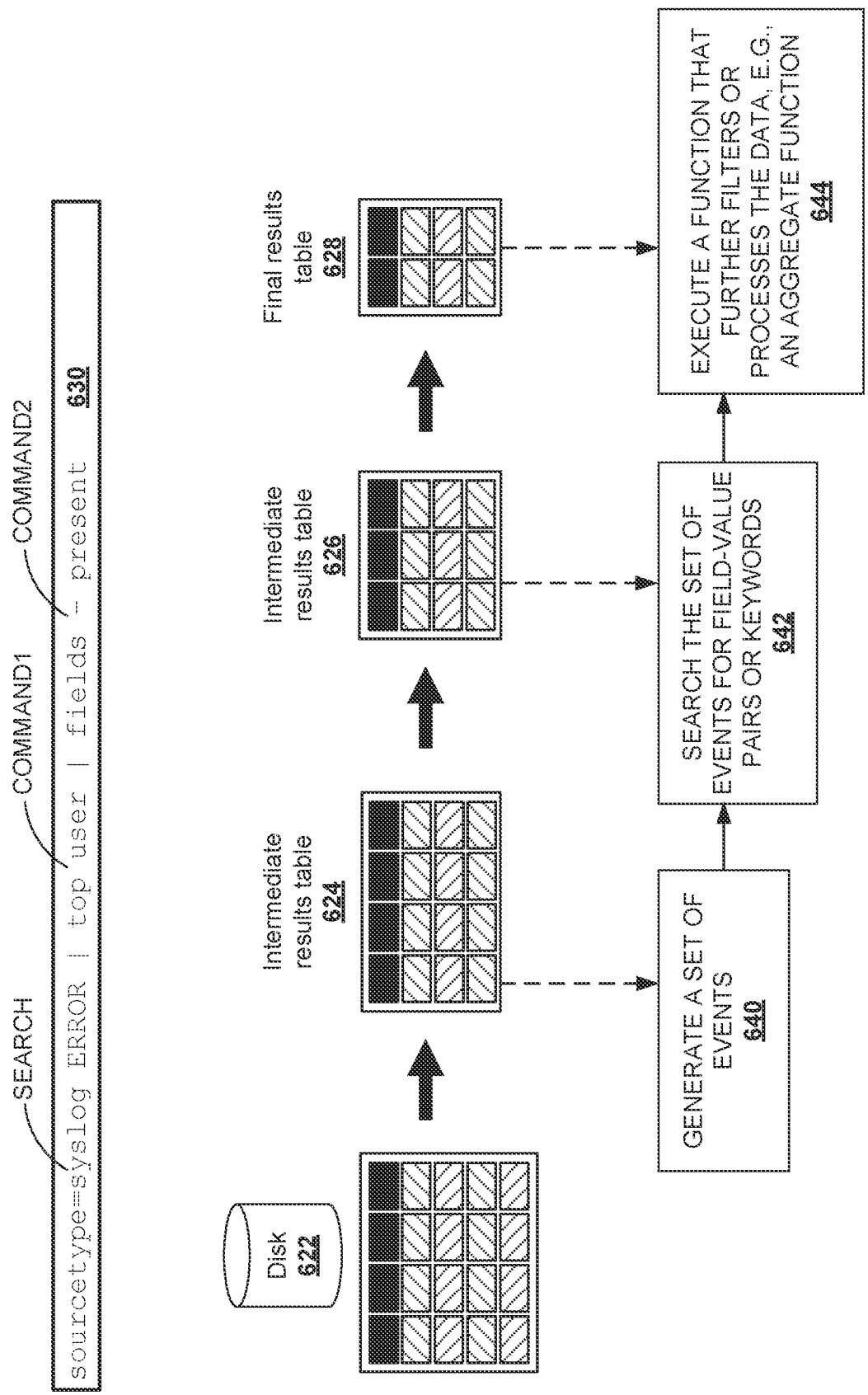
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 may be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query may comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which summarizes the events into a list of the top 10 users and displays the user, count, and percentage.

Finally, at block 644, the results of the prior stage may be pipelined to another stage where further filtering or processing of the data may be performed, e.g., preparing the data for display purposes, filtering the data based on a condition, performing a mathematical calculation with the data, etc. As shown in FIG. 6B, the "fields-percent" part of command 630 removes the column that shows the percentage, thereby, leaving a final results table 628 without a percentage column. In different embodiments, other query languages, such as the Structured Query Language ("SQL"), may be used to create a query.

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) may be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), may be used to create a query.

In response to receiving the search query, search head 210 uses extraction rules to extract values for fields in the events being searched. The search head 210 obtains extraction rules that specify how to extract a value for fields from an event. Extraction rules may comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself may specify one or more extraction rules.

The search head 210 may apply the extraction rules to events that it receives from indexers 206. Indexers 206 may apply the extraction rules to events in an associated data store 208. Extraction rules may be applied to all the events in a data store or to a subset of the events that have been filtered based on some criteria (e.g., event time stamp values, etc.). Extraction rules may be used to extract one or more values for a field from events by parsing the portions of machine data in the events and examining the data for one or more patterns of characters, numbers, delimiters, etc., that indicate where the field begins and, optionally, ends.

Figure 7A:
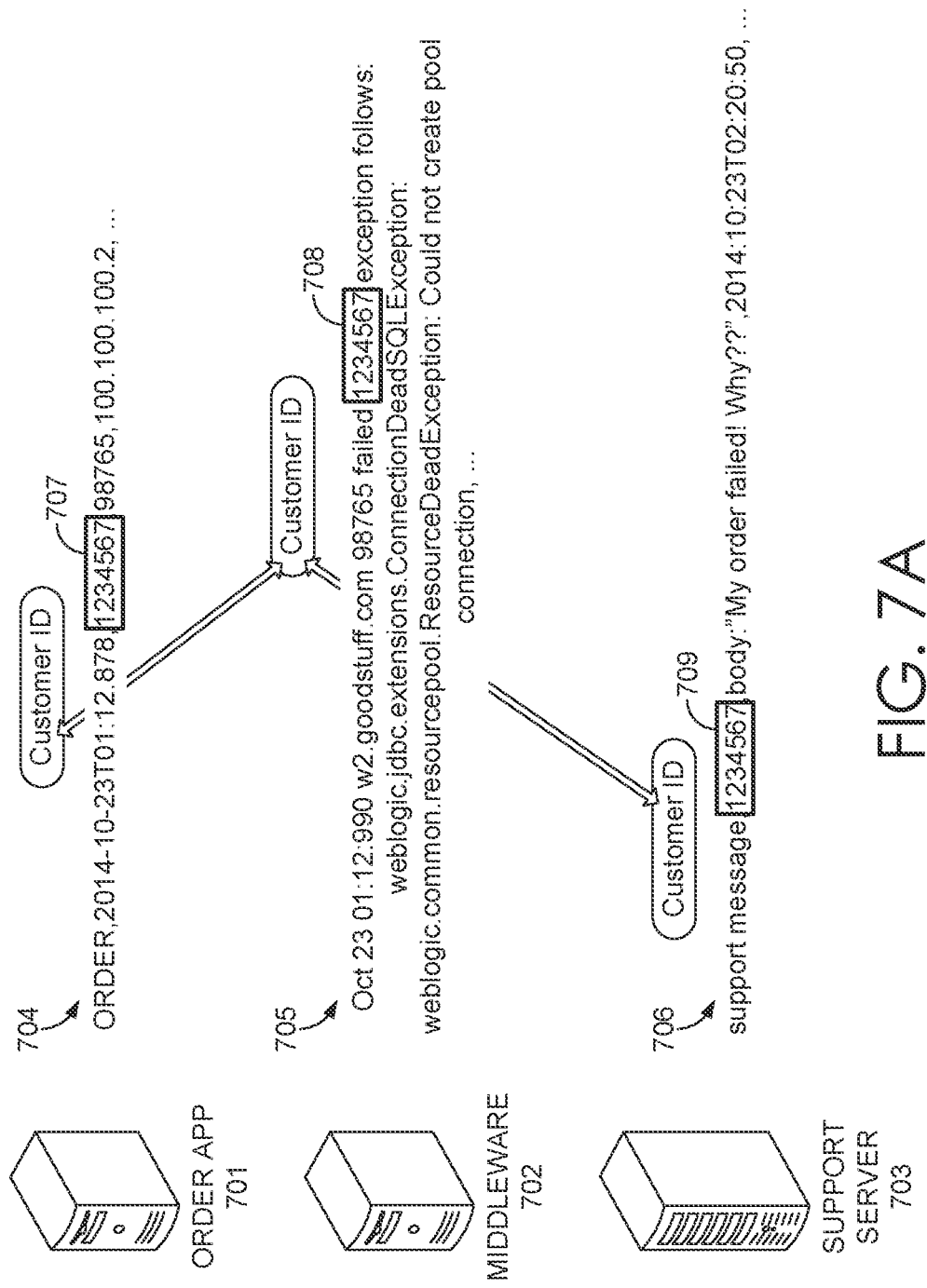
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor may uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator may query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it may correlate. The search head may apply a different extraction rule to each set of events from each system when the event format differs among systems. In this example, the user interface may display to the administrator the events corresponding to the common customer ID field values 707, 708, and 709, thereby providing the administrator with insight into a customer's experience.

Note that query results may be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
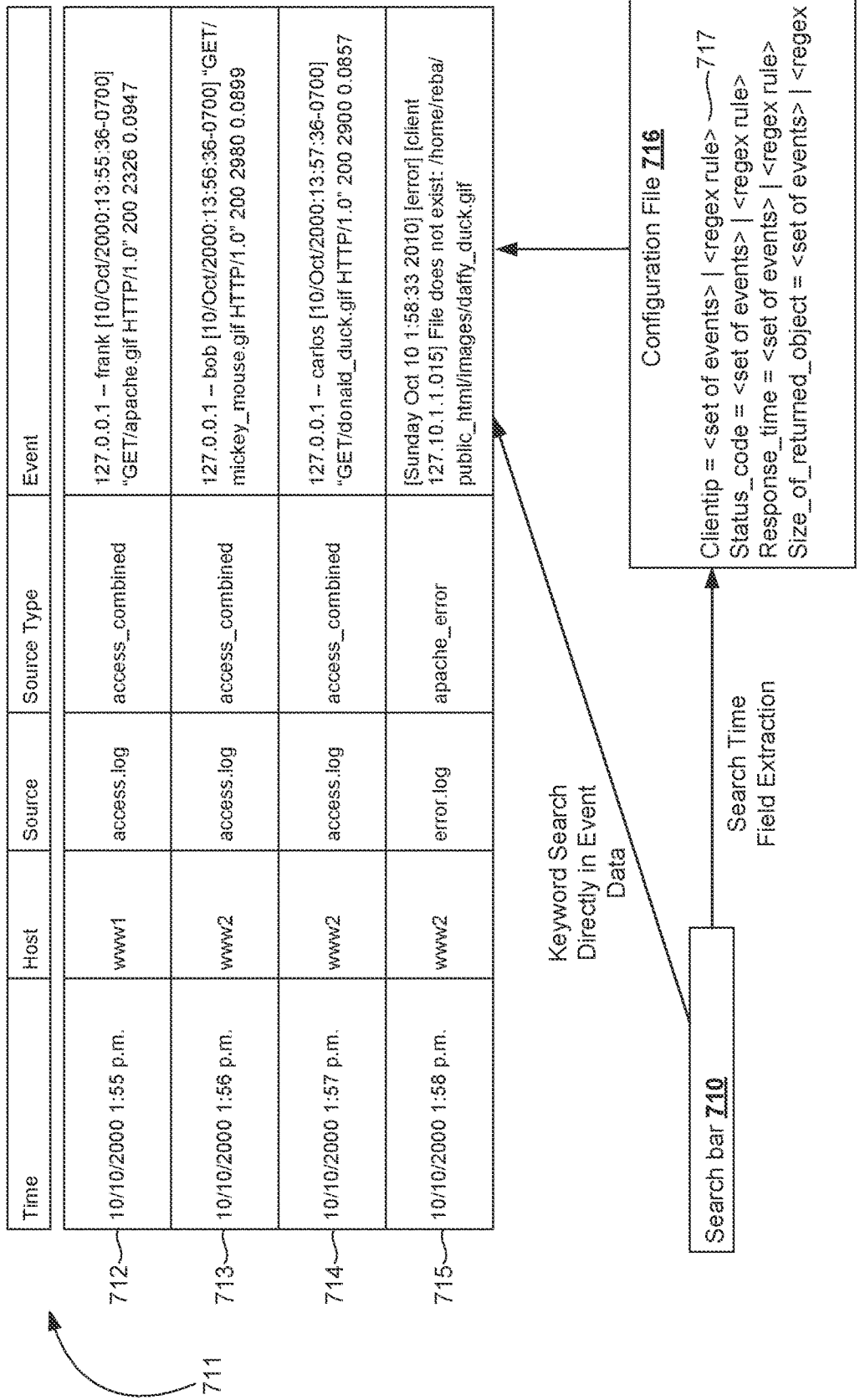
FIG. 7B illustrates an example of processing keyword searches and field searches, in accordance with disclosed embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 710 that includes only keywords (also known as "tokens"), e.g., the keyword "error" or "warning", the query search engine of the data intake and query system searches for those keywords directly in the event data 711 stored in the raw record data store. Note that while FIG. 7B only illustrates four events 712, 713, 714, 715, the raw record data store (corresponding to data store 208 in FIG. 2) may contain records for millions of events.

As disclosed above, an indexer may optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer may access the keyword index to quickly identify events containing the keyword. For example, if the keyword "HTTP" was indexed by the indexer at index time, and the user searches for the keyword "HTTP", the events 712, 713, and 714, will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the data intake and query system will search the event data directly and return the first event 712. Note that whether the keyword has been indexed at index time or not, in both cases the raw data of the events 712-715 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field may also be multivalued, that is, it may appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields may appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "November 15 09:33:22 johnmedlock."

The data intake and query system advantageously allows for search time field extraction. In other words, fields may be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules may comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself may specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 716 during the execution of the search as shown in FIG. 7B.

Configuration file 716 may contain extraction rules for all the various fields that are not metadata fields, e.g., the "clientip" field. The extraction rules may be inserted into the configuration file in a variety of ways. In some embodiments, the extraction rules may comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 716.

In some embodiments, the indexers may automatically discover certain custom fields at index time and the regular expressions for those fields will be automatically generated at index time and stored as part of extraction rules in configuration file 716. For example, fields that appear in the event data as "key=value" pairs may be automatically extracted as part of an automatic field discovery process. Note that there may be several other ways of adding field definitions to configuration files in addition to the methods discussed herein.

The search head 210 may apply the extraction rules derived from configuration file 716 to event data that it receives from indexers 206. Indexers 206 may apply the extraction rules from the configuration file to events in an associated data store 208. Extraction rules may be applied to all the events in a data store, or to a subset of the events that have been filtered based on some criteria (e.g., event time stamp values, etc.). Extraction rules may be used to extract one or more values for a field from events by parsing the event data and examining the event data for one or more patterns of characters, numbers, delimiters, etc., that indicate where the field begins and, optionally, ends.

In one more embodiments, the extraction rule in configuration file 716 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 715 also contains "clientip" field, however, the "clientip" field is in a different format from the events 712, 713, and 714. To address the discrepancies in the format and content of the different types of events, the configuration file will also need to specify the set of events that an extraction rule applies to, e.g., extraction rule 717 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 716 and each of the extraction rules would comprise a different regular expression to parse out the associated field value. The most common way to categorize events is by source type because events generated by a particular source may have the same format.

The field extraction rules stored in configuration file 716 perform search-time field extractions. For example, for a query that requests a list of events with source type "access_combined" where the "clientip" field equals "127.0.0.1," the query search engine would first locate the configuration file 716 to retrieve extraction rule 717 that would allow it to extract values associated with the "clientip" field from the event data 720 "where the source type is "access_combined. After the "clientip" field has been extracted from all the events comprising the "clientip" field where the source type is "access_combined," the query search engine may then execute the field criteria by performing the compare operation to filter out the events where the "clientip" field equals "127.0.0.1." In the example shown in FIG. 7B, the events 712, 713, and 714 would be returned in response to the user query. In this manner, the search engine may service queries containing field criteria in addition to queries containing keyword criteria (as explained above).

The configuration file may be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user may create new fields at search time and simply add field definitions to the configuration file. As a user learns more about the data in the events, the user may continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions may be added to the configuration file to capture the same field across events generated by different source types. This allows the data intake and query system to search and correlate data across heterogeneous sources flexibly and efficiently.

Further, by providing the field definitions for the queried fields at search time, the configuration file 716 allows the record data store to be field searchable. In other words, the raw record data store may be searched using keywords as well as fields, wherein the fields are searchable name/value pairings that distinguish one event from another and may be defined in configuration file 716 using extraction rules. In comparison to a search containing field names, a keyword search does not need the configuration file and may search the event data directly as shown in FIG. 7B.

It should also be noted that any events filtered out by performing a search-time field extraction using a configuration file may be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

Figure 8A:
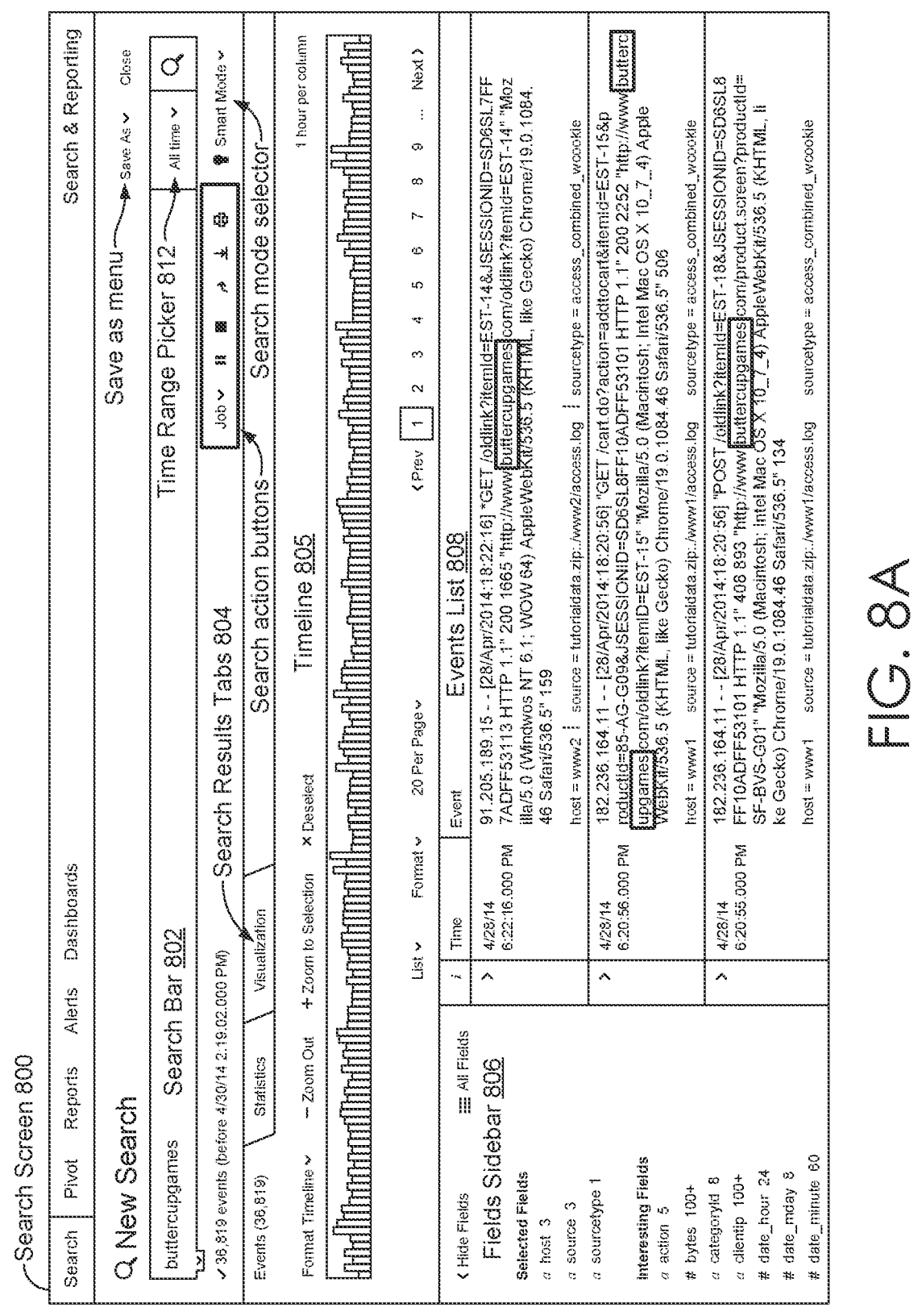

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user may select a specific time range, or alternatively a relative time range, such as "today," "yesterday" or "last week." For real-time searches (e.g., searches whose results are based on data received in real-time), the user may select the size of a preceding time window to search for real-time events. Search screen 800 also initially displays a "data summary" dialog as is illustrated in FIG. 8B that enables the user to select different sources for the events, such as by selecting specific hosts and log files.

After the search is executed, the search screen 800 in FIG. 8A may display the results through search results tabs 804, wherein search results tabs 804 includes an "events tab" that displays various information about events returned by the search, a "statistics tab" that displays statistics about the search results, and a "visualization tab" that displays various visualizations of the search results. The events tab illustrated in FIG. 8A displays a timeline graph 805 that graphically illustrates the number of events that occurred in one-hour intervals over the selected time range. The events tab also displays an events list 808 that enables a user to view the machine data in each of the returned events.

The events tab additionally displays a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has pre-selected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user may select the "host" field name, and the events shown in the events list 808 will be updated with events in the search results that have the field that is reference by the field name "host."

A data model is a hierarchically structured search-time mapping of semantic knowledge about one or more datasets. It encodes the domain knowledge used to build a variety of specialized searches of those datasets. Those searches, in turn, may be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models may be arranged hierarchically in parent/child relationships. Each child object represents a subset of the dataset covered by its parent object. The top-level objects in data models are collectively referred to as "root objects."

Child objects may inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user may simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object may be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user may retrieve and use the "e-mails sent" data model object to quickly search source data for events relating to sent e-mails, and may be provided with a listing of the set of fields relevant to the events in a user interface screen.

Examples of data models may include electronic mail, authentication, databases, intrusion detection, malware, application state, alerts, compute inventory, network sessions, network traffic, performance, audits, updates, vulnerabilities, etc. Data models and their objects may be designed by knowledge managers in an organization, and they may enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent sub set.

Data definitions in associated schemas may be taken from the common information model (CIM) or may be devised for a particular schema and optionally added to the CIM. Child objects inherit fields from parents and may include fields not present in parents. A model developer may select fewer extraction rules than are available for the sources returned by the query that defines events belonging to a model. Selecting a limited set of extraction rules may be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar., 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model may also include reports. One or more report formats may be associated with a particular data model and be made available to run against the data model. A user may use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data may be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also may be generated in a variety of formats, by reference to the data model. Reports, data visualizations, and data model objects may be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user may load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
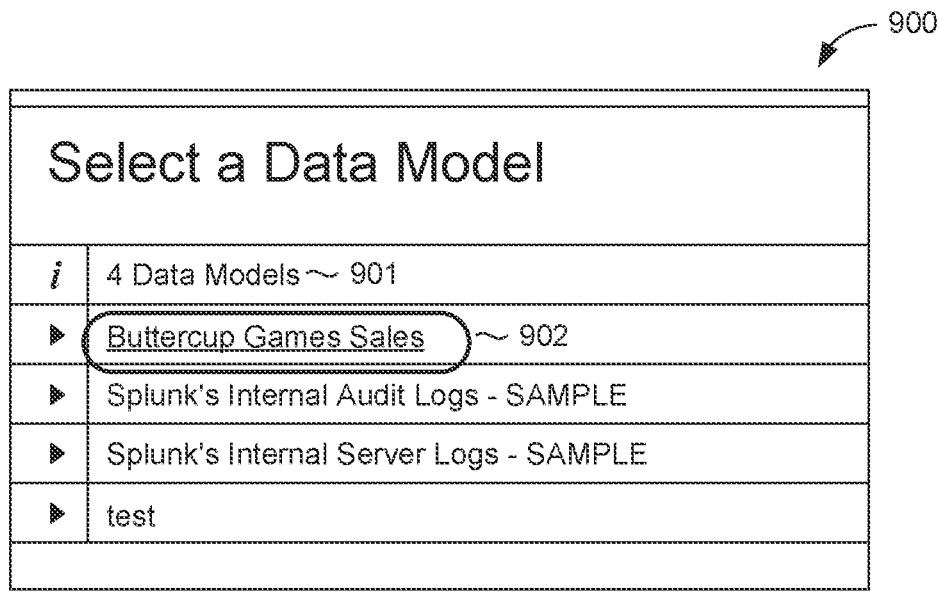

The selection of a data model object for use in driving a report generation may be facilitated by a data model object selection interface. FIG. 9 illustrates an example interactive data model selection graphical user interface 900 of a report editor that displays a listing of available data models 901. The user may select one of the data models 902.

Figure 10:
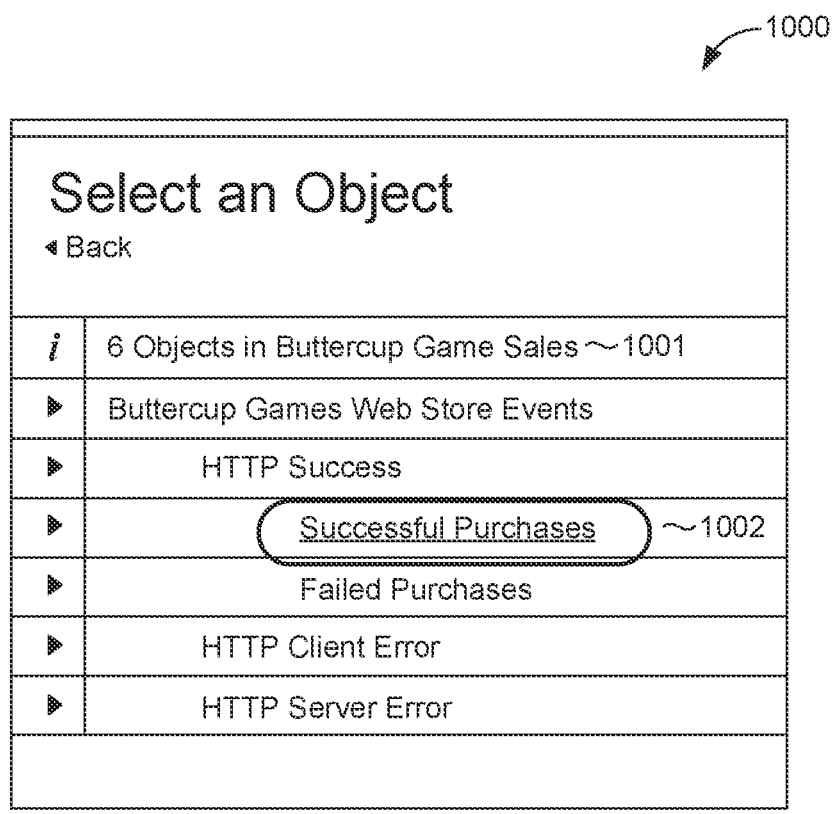

FIG. 10 illustrates an example data model object selection graphical user interface 1000 that displays available data objects 1001 for the selected data object model 902. The user may select one of the displayed data model objects 1002 for use in driving the report generation process.

Figure 11A:
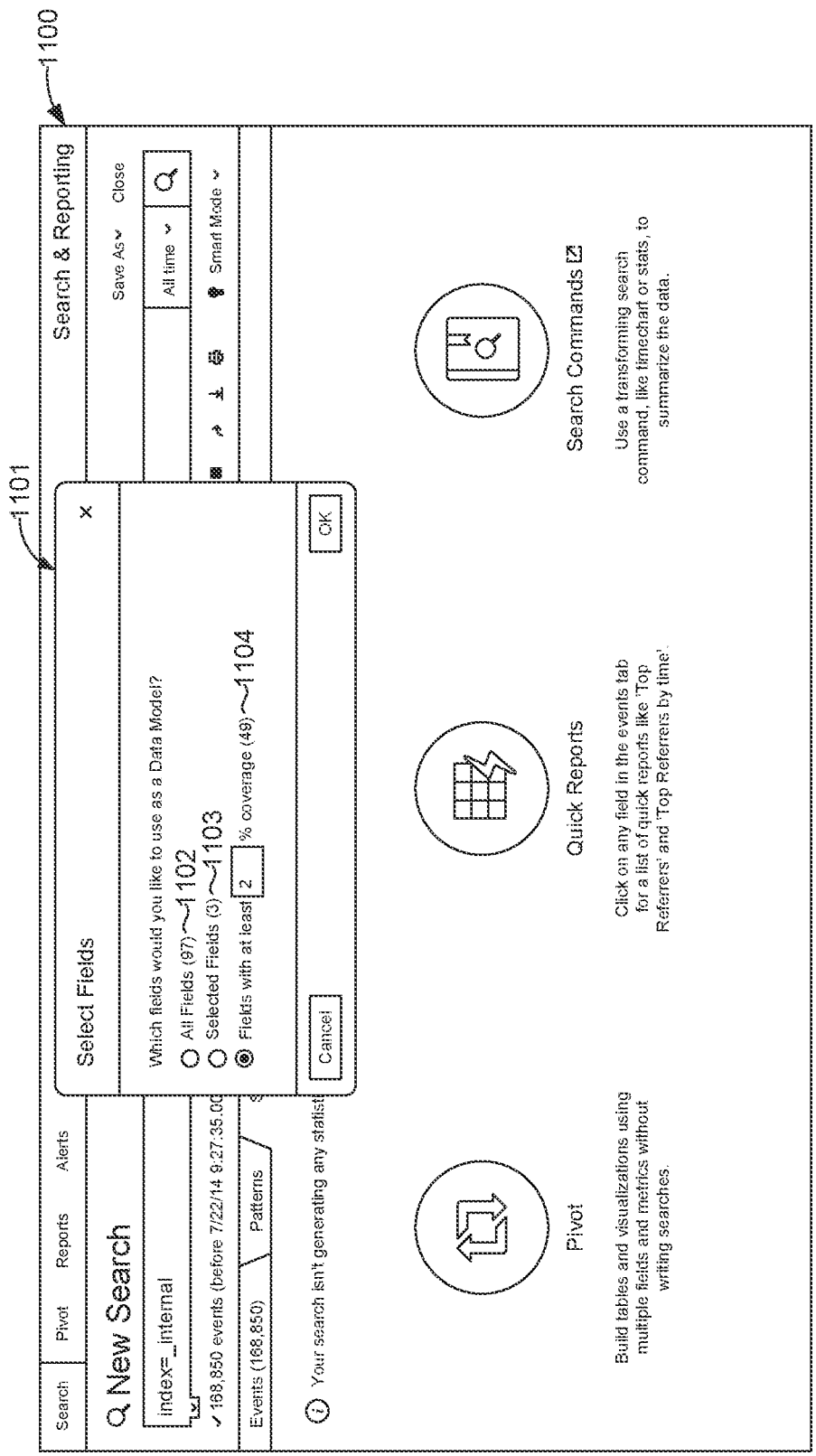

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
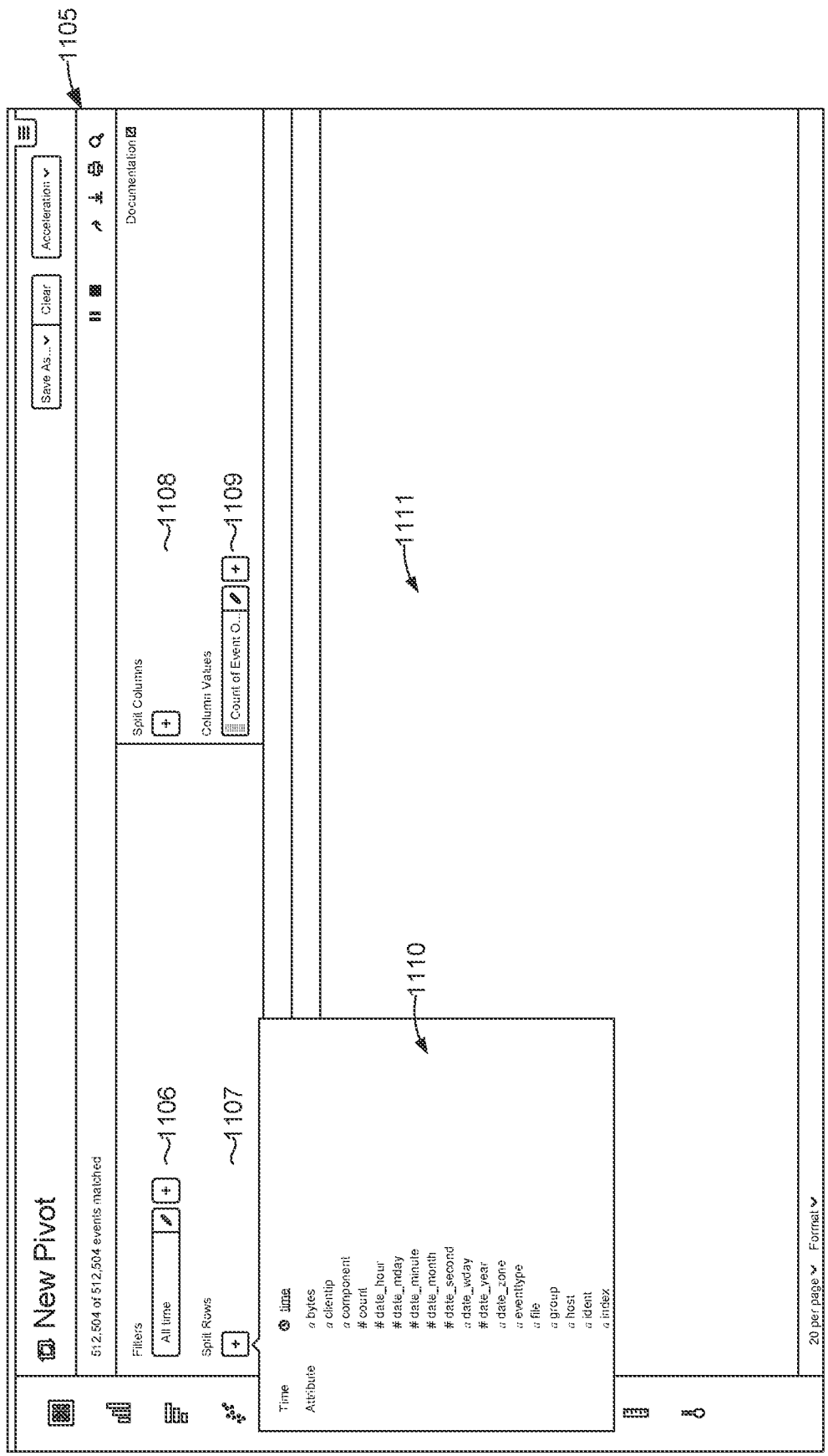
Figure 11C:
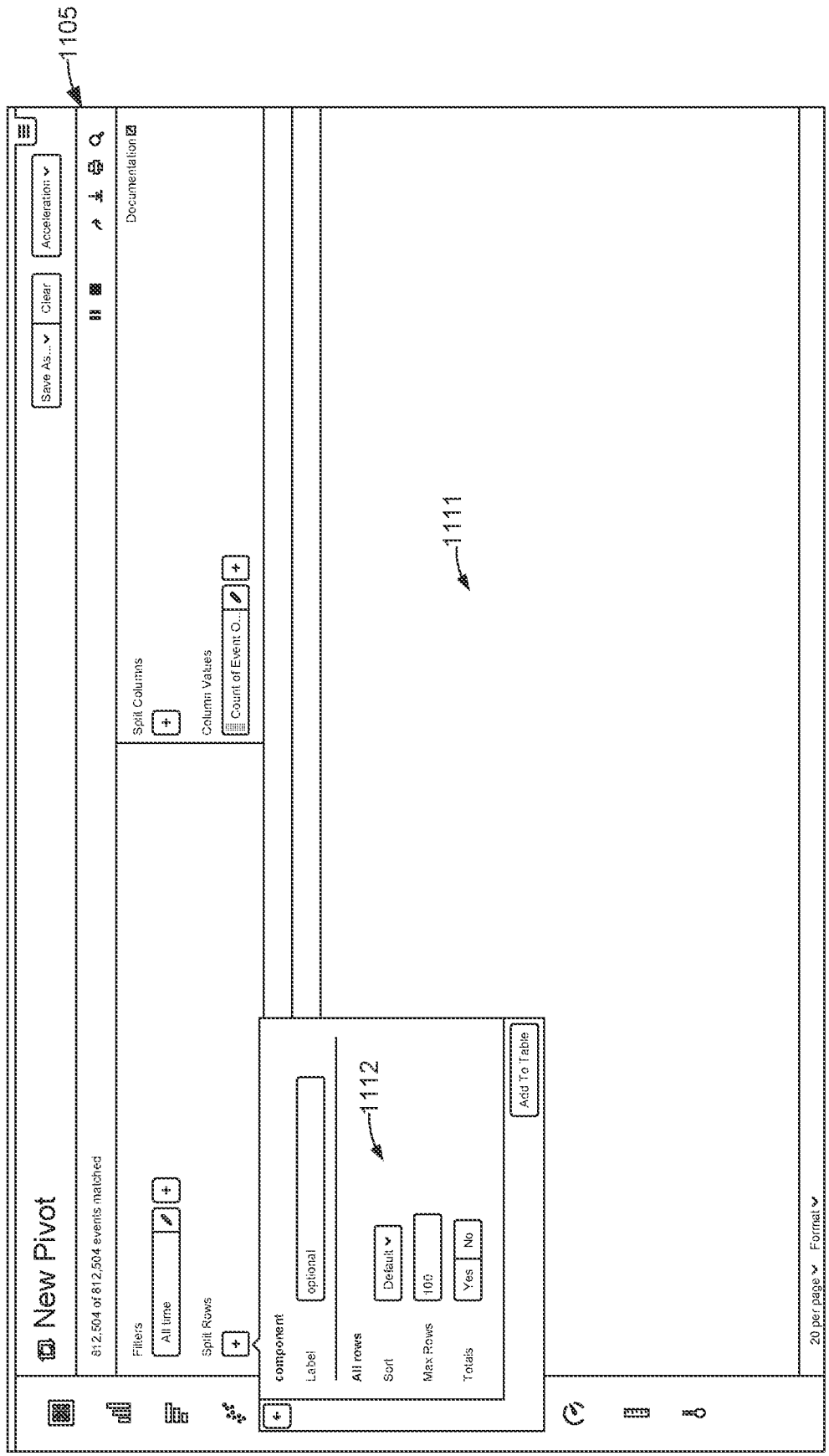

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that may be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue may be used to format the display of the results of the selection (e.g., label the column for the selected field to be displayed as "component").

Figure 11D:
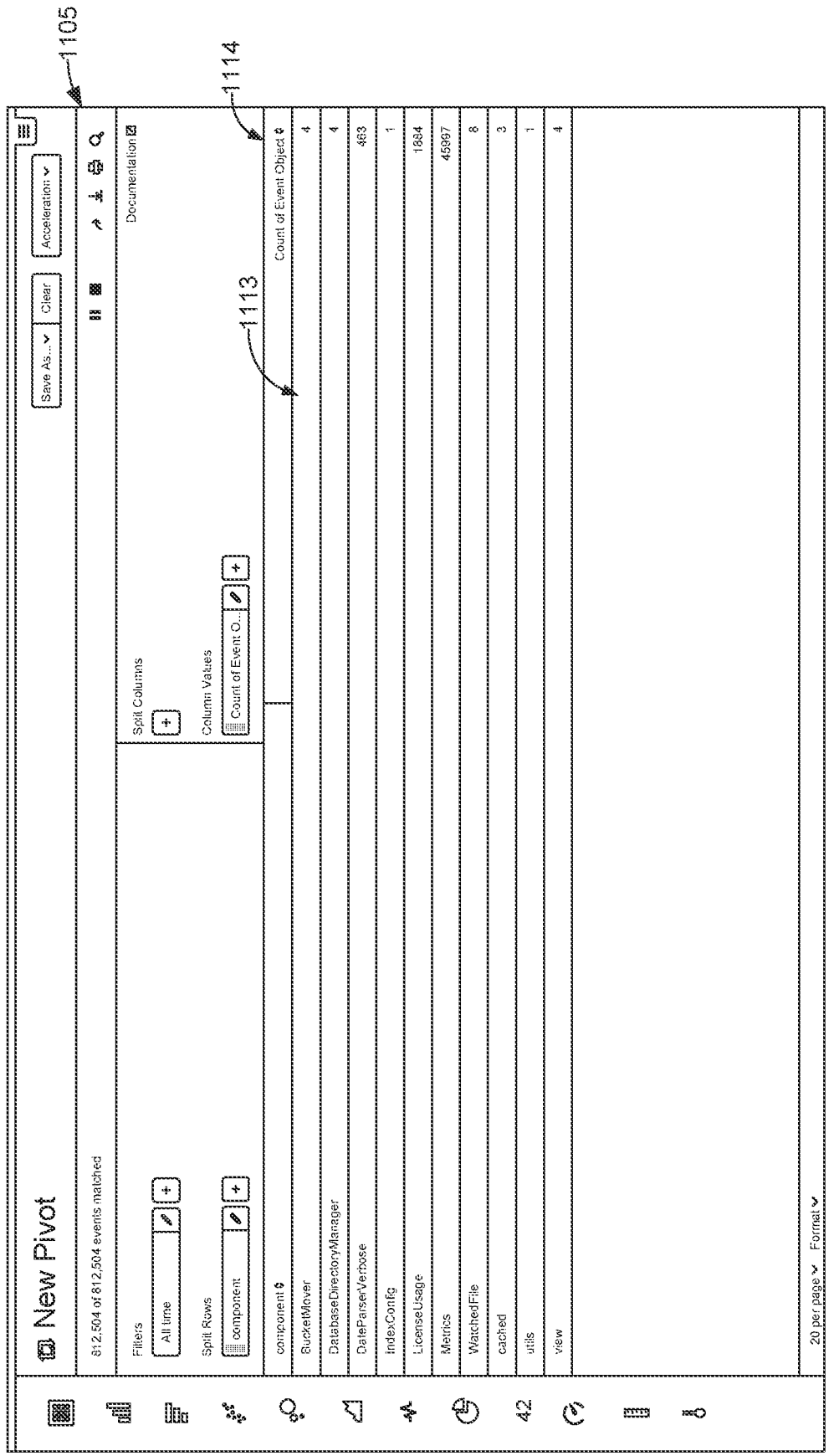

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

Figure 12:
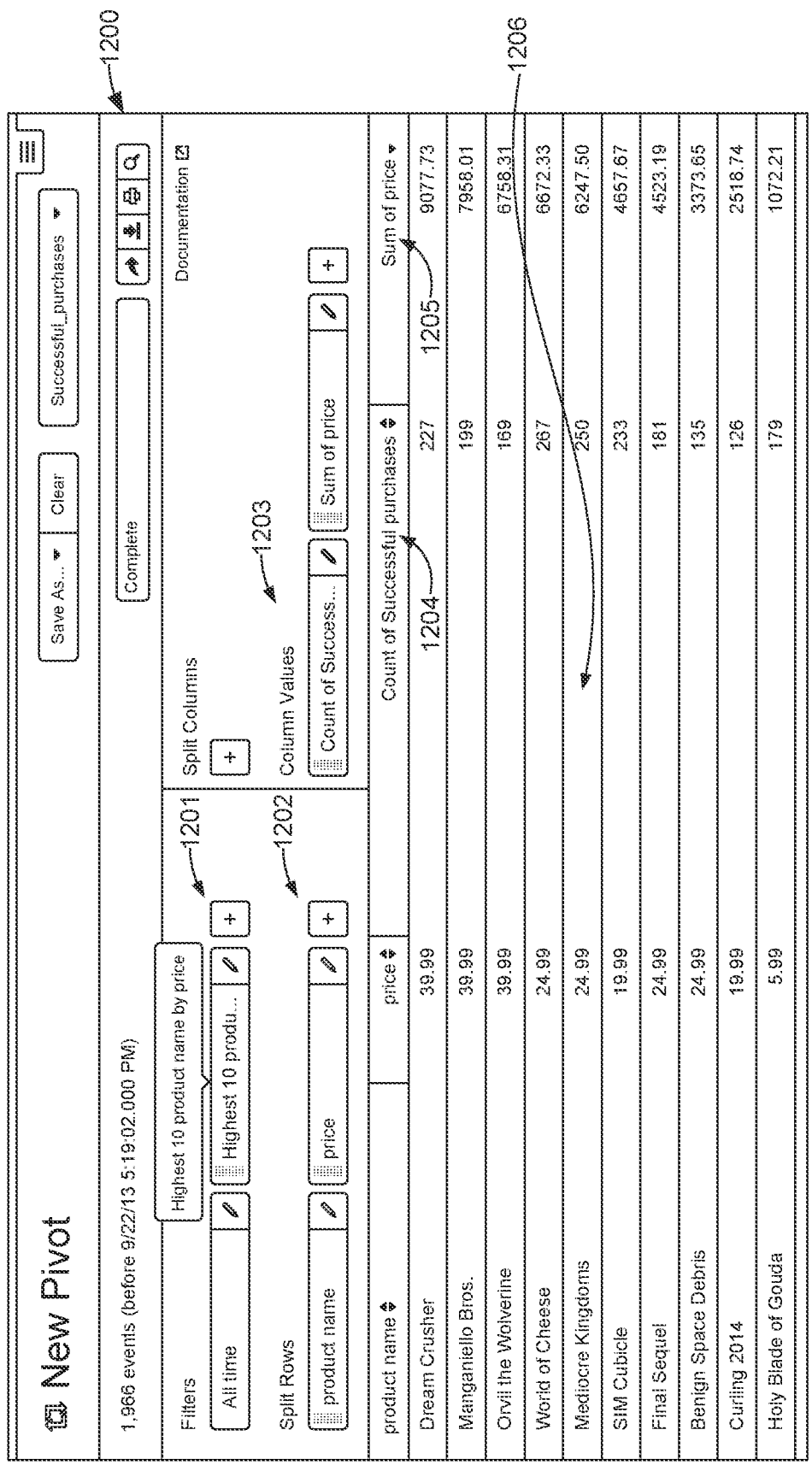

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
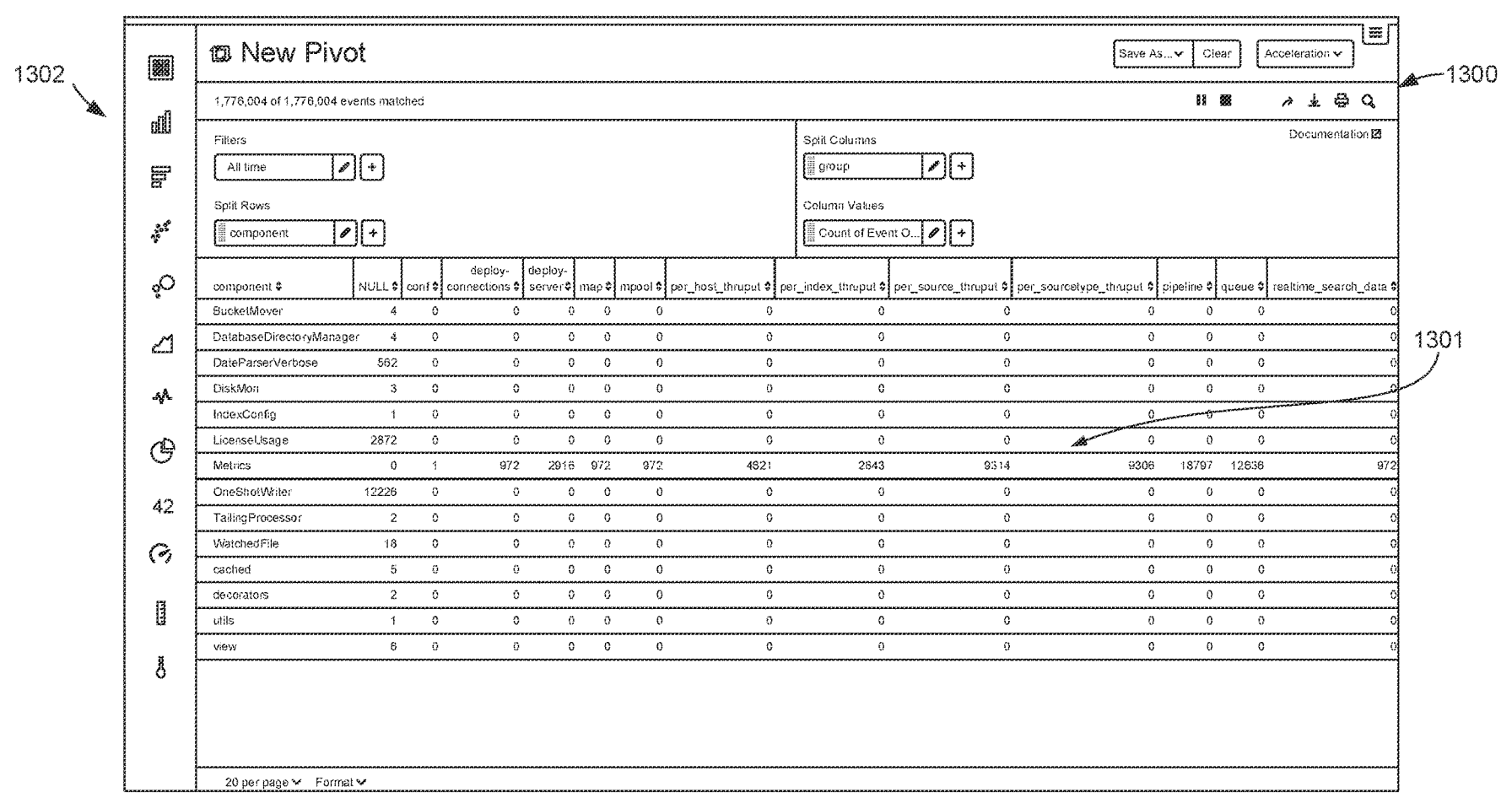
Figure 14:
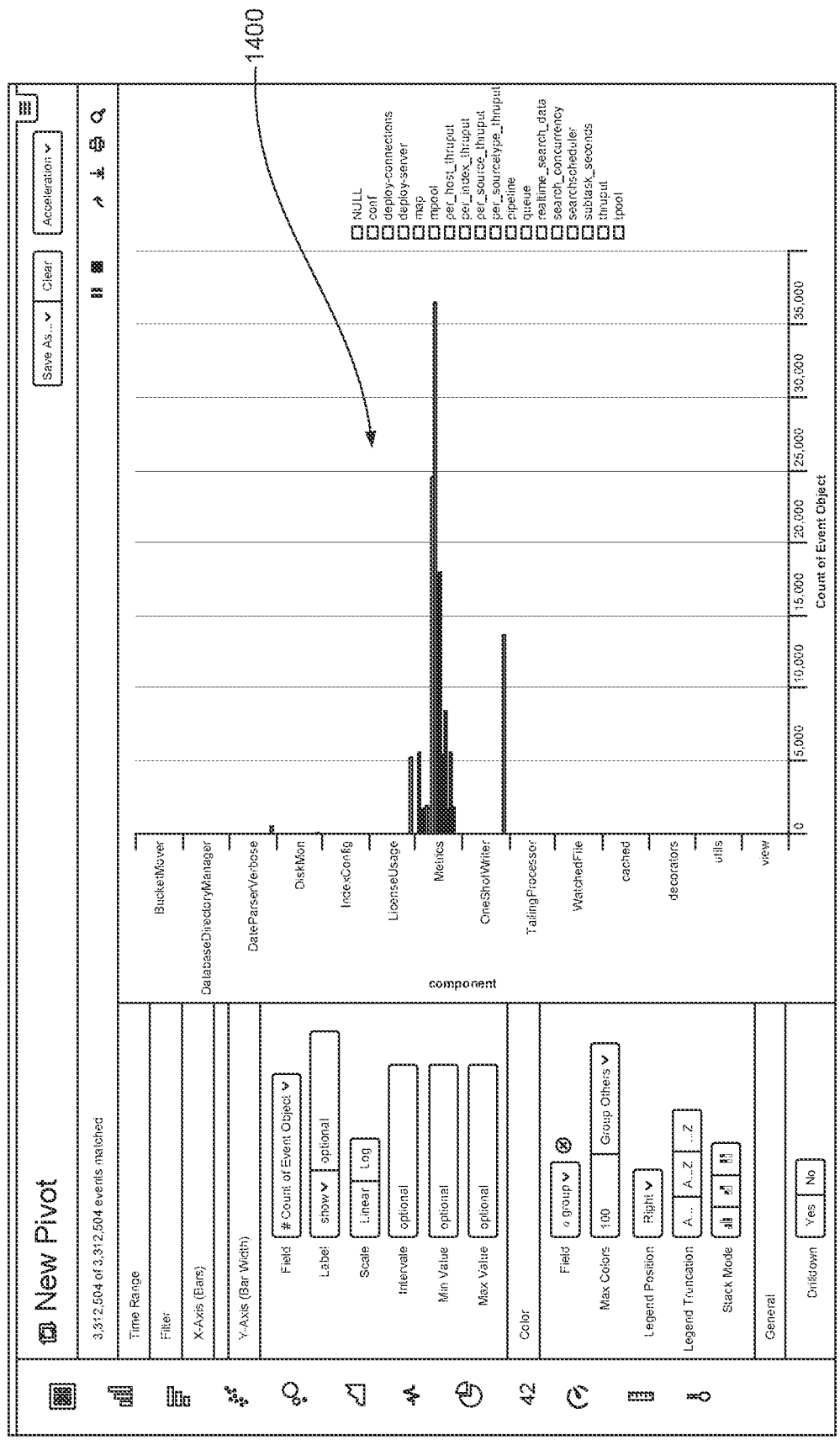
Figure 15:
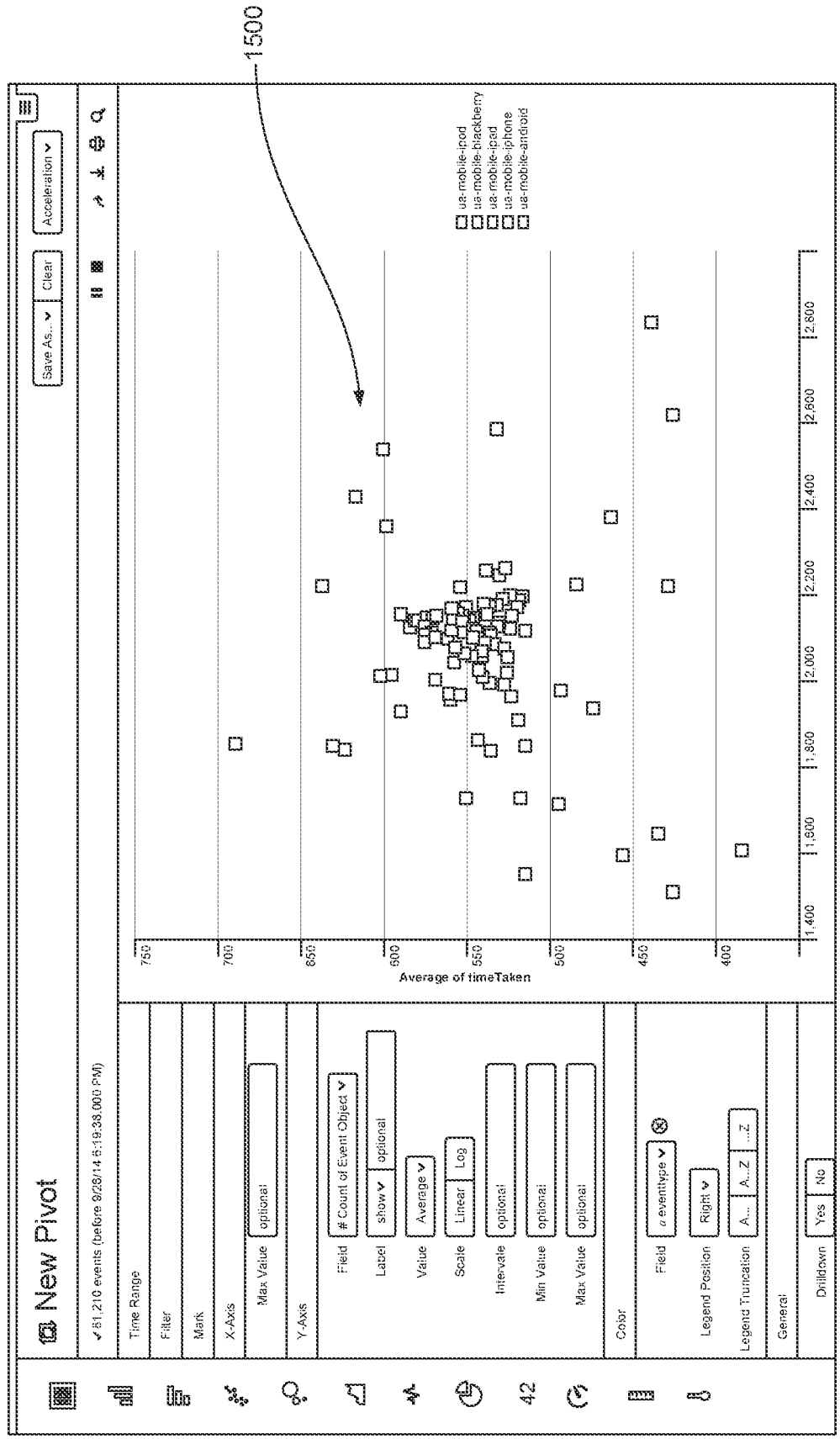

The reporting application allows the user to create graphical visualizations of the statistics generated for a report. For example, FIG. 13 illustrates an example graphical user interface 1300 that displays a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time may involve a large amount of data and require a large number of computational operations, which may cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

Figure 16:
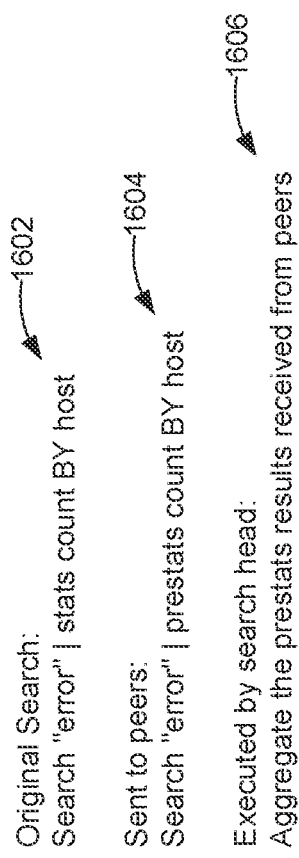
FIG. 16 is an example search query received from a client and executed by search peers, in accordance with example embodiments.

To facilitate faster query processing, a query may be structured such that multiple indexers perform the query in parallel, while aggregation of search results from the multiple indexers is performed locally at the search head. For example, FIG. 16 is an example search query received from a client and executed by search peers, in accordance with example embodiments. FIG. 16 illustrates how a search query 1602 received from a client at a search head 210 may split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

As described above with reference to the flow charts in FIG. 5A and FIG. 6A, data intake and query system 108 may construct and maintain one or more keyword indices to quickly identify events containing specific keywords. This technique may greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer may access the keyword index to quickly identify events containing the keyword.

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table may keep track of occurrences of the value "94107" in the "ZIP code" field of a set of events and the entry includes references to all of the events that contain the value "94107" in the ZIP code field. This optimization technique enables the system to quickly process queries that seek to determine how many events have a particular value for a particular field. To this end, the system may examine the entry in the summarization table to count instances of the specific value in the field without having to go through the individual events or perform data extractions at search time. Also, if the system needs to process all events that have a specific field-value combination, the system may use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system may maintain a separate summarization table for each indexer. The indexer-specific summarization table includes entries for the events in a data store that are managed by the specific indexer. Indexer-specific summarization tables may also be bucket-specific.

The summarization table may be populated by running a periodic query that scans a set of events to find instances of a specific field-value combination, or alternatively instances of all field-value combinations for a specific field. A periodic query may be initiated by a user, or may be scheduled to occur automatically at specific time intervals. A periodic query may also be automatically launched in response to a query that asks for a specific field-value combination.

In some cases, when the summarization tables may not cover all of the events that are relevant to a query, the system may use the summarization tables to obtain partial results for the events that are covered by summarization tables, but may also have to search through other events that are not covered by the summarization tables to produce additional results. These additional results may then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STOR- ING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table" (also referred to as a "lexicon" or "inverted index"), that contains entries for specific field-value pairs. Each of these entries keeps track of instances of a specific value in a specific field in the event data and includes references to events containing the specific value in the specific field. For example, an example entry in an inverted index may keep track of occurrences of the value "94107" in the "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-known compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that may be user-generated and is used to create an inverted index. A collection query is not the same as a query that is used to call up or invoke a pre-existing inverted index. In one or more embodiments, a query may comprise an initial step that calls up a pre-generated inverted index on which further filtering and processing may be performed. For example, referring back to FIG. 6B, a set of events may be generated at block 640 by either using a "collection" query to create a new inverted index or by calling up a pre-generated inverted index. A query with several pipelined steps will start with a pre-generated index to accelerate the query.

Figure 7C:
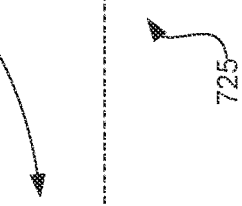
FIG. 7C illustrates an example of creating and using an inverted index, in accordance with example embodiments.

FIG. 7C illustrates the manner in which an inverted index is created and used in accordance with the disclosed embodiments. As shown in FIG. 7C, an inverted index 722 may be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in inverted index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file by specifying the "access_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within summarization table 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system may be used to pipe the contents of an inverted index to a statistical query using the "stats" command for example. A "stats" query generates a result set that may produce aggregate and statistical results from event records, e.g., average, mean, max, min, root mean square, etc. Where sufficient information is available in an inverted index, a "stats" query may generate result sets rapidly from the summarization information available in the inverted index rather than directly scanning event records. For example, the contents of inverted index 722 may be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system may examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system may maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries are stats queries, each indexer may generate a partial result set from previously generated summarization information. The partial result sets may be returned to the search head that received the query and combined into a single result set for the query As mentioned above, the inverted index may be populated by running a periodic query that scans a set of events to find instances of a specific field-value combination, or alternatively instances of all field-value combinations for a specific field. A periodic query may be initiated by a user, or may be scheduled to occur automatically at specific time intervals. A periodic query may also be automatically launched in response to a query that asks for a specific field-value combination. In some embodiments, if summarization information is absent from an indexer that includes responsive event records, further actions may be taken, such as, the summarization information may be generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system may use the inverted index to obtain partial results for the events that are covered by inverted index, but may also have to search through other events that are not covered by the inverted index to produce additional results on the fly. In other words, an indexer would need to search through event data on the data store to supplement the partial results. These additional results may then be combined with the partial results to produce a final set of results for the query. Note that in typical instances where an inverted index is not completely up to date, the number of events that an indexer would need to search through to supplement the results from the inverted index would be relatively small. In other words, the search to get the most recent results may be quick and efficient because only a small number of event records will be searched through to supplement the information from the inverted index. The inverted index and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

In one or more embodiments, if the system needs to process all events that have a specific field-value combination, the system may use the references in the inverted index entry to directly access the events to extract further information without having to search all of the events to find the specific field-value combination at search time. In other words, the system may use the reference values to locate the associated event data in the field searchable data store and extract further information from those events, e.g., extract further field values from the events for purposes of filtering or processing or both.

The information extracted from the event data using the reference values may be directed for further filtering or processing in a query using the pipeline search language. The pipelined search language will, in one embodiment, include syntax that may direct the initial filtering step in a query to an inverted index. In one embodiment, a user would include syntax in the query that explicitly directs the initial searching or filtering step to the inverted index.

Referencing the example in FIG. 7C, if the user determines that she needs the user id fields associated with the client requests from IP address "127.0.0.1," instead of incurring the computational overhead of performing a brand new search or re-generating the inverted index with an additional field, the user may generate a query that explicitly directs or pipes the contents of the already generated inverted index 722 to another filtering step requesting the user ids for the entries in inverted index 722 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one embodiment, the same methodology may be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average may be computed and returned to the user.

In one embodiment, instead of explicitly invoking the inverted index in a user-generated query, e.g., by the use of special commands or syntax, the SPLUNK® ENTERPRISE system may be configured to automatically determine if any prior-generated inverted index may be used to expedite a user query. For example, the user's query may request the average object size (size of the requested gif) requested by clients from IP_address "127.0.0.1" without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers may analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system may use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
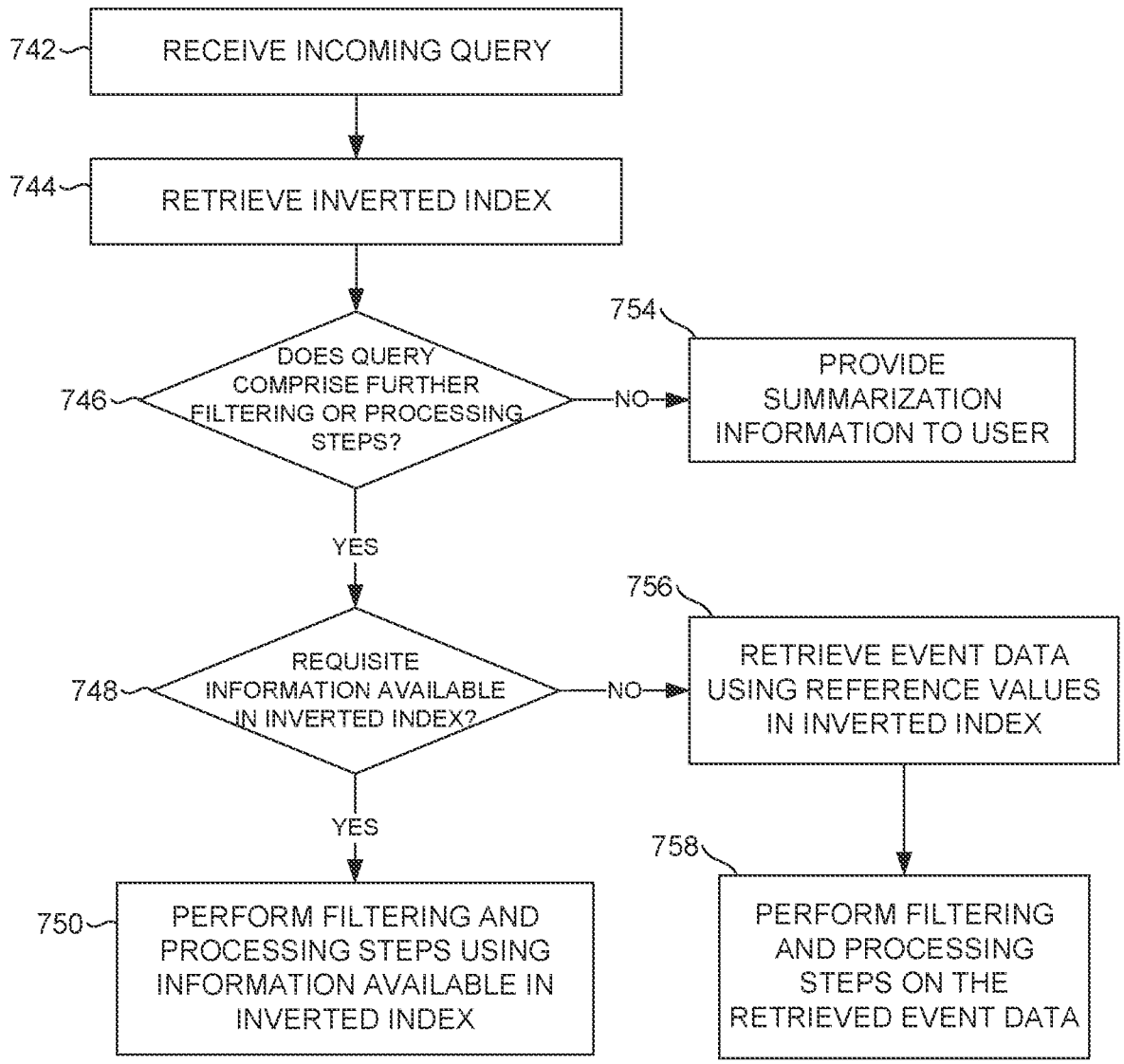
FIG. 7D depicts a flowchart of example use of an inverted index in a pipelined search query, in accordance with example embodiments.

FIG. 7D presents a flowchart illustrating how an inverted index in a pipelined search query may be used to determine a set of event data that may be further limited by filtering or processing in accordance with the disclosed embodiments.

At block 742, a query is received by a data intake and query system. In some embodiments, the query may be received as a user generated query entered into search bar of a graphical user search interface. The search interface also includes a time range control element that enables specification of a time range for the query.

At block 744, an inverted index is retrieved. Note, that the inverted index may be retrieved in response to an explicit user search command inputted as part of the user generated query. Alternatively, the search engine may be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information may be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query may be completed using data already in the generated inverted index, then the further filtering or processing steps, e.g., a "count" number of records function, "average" number of records per hour, etc., are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

In some embodiments, a data server system such as the data intake and query system may accelerate the process of periodically generating updated reports based on query results. To accelerate this process, a summarization engine automatically examines the query to determine whether generation of updated reports may be accelerated by creating intermediate summaries. If reports may be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query may be run on these additional events. Then, the results returned by this query on the additional events, along with the partial results obtained from the intermediate summaries, may be combined to generate the updated report. This process is repeated each time the report is updated. Alternatively, if the system stores events in buckets covering specific time ranges, then the summaries may be generated on a bucket-by-bucket basis. Note that producing intermediate summaries may save the work involved in re-running the query for previous time periods, so advantageously only the newer events needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

The data intake and query system provides various schemas, dashboards, and visualizations that simplify developers' tasks to create applications with additional capabilities. One such application is an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application may process many types of security-related information. In general, this security-related information may include any information that may be used to identify security threats. For example, the security-related information may include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information may also include malware infection data and system configuration information, as well as access control information, such as login/logout information and access failure notifications. The security-related information may originate from various sources within a data center, such as hosts, virtual machines, storage devices and sensors. The security-related information may also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which may be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events may be detected in a number of ways, such as: (1) a user may notice a correlation in events and may manually identify that a corresponding group of one or more events amounts to a notable event; or (2) a user may define a "correlation search" specifying criteria for a notable event, and every time one or more events satisfy the criteria, the application may indicate that the one or more events correspond to a notable event; and the like. A user may alternatively select a pre-defined correlation search provided by the application. Note that correlation searches may be run continuously or at regular intervals (e.g., every hour) to search for notable events. Upon detection, notable events may be stored in a dedicated "notable events index," which may be subsequently accessed to generate various visualizations containing security-related information. Also, alerts may be generated to notify system operators when important notable events are discovered.

Figure 17A:
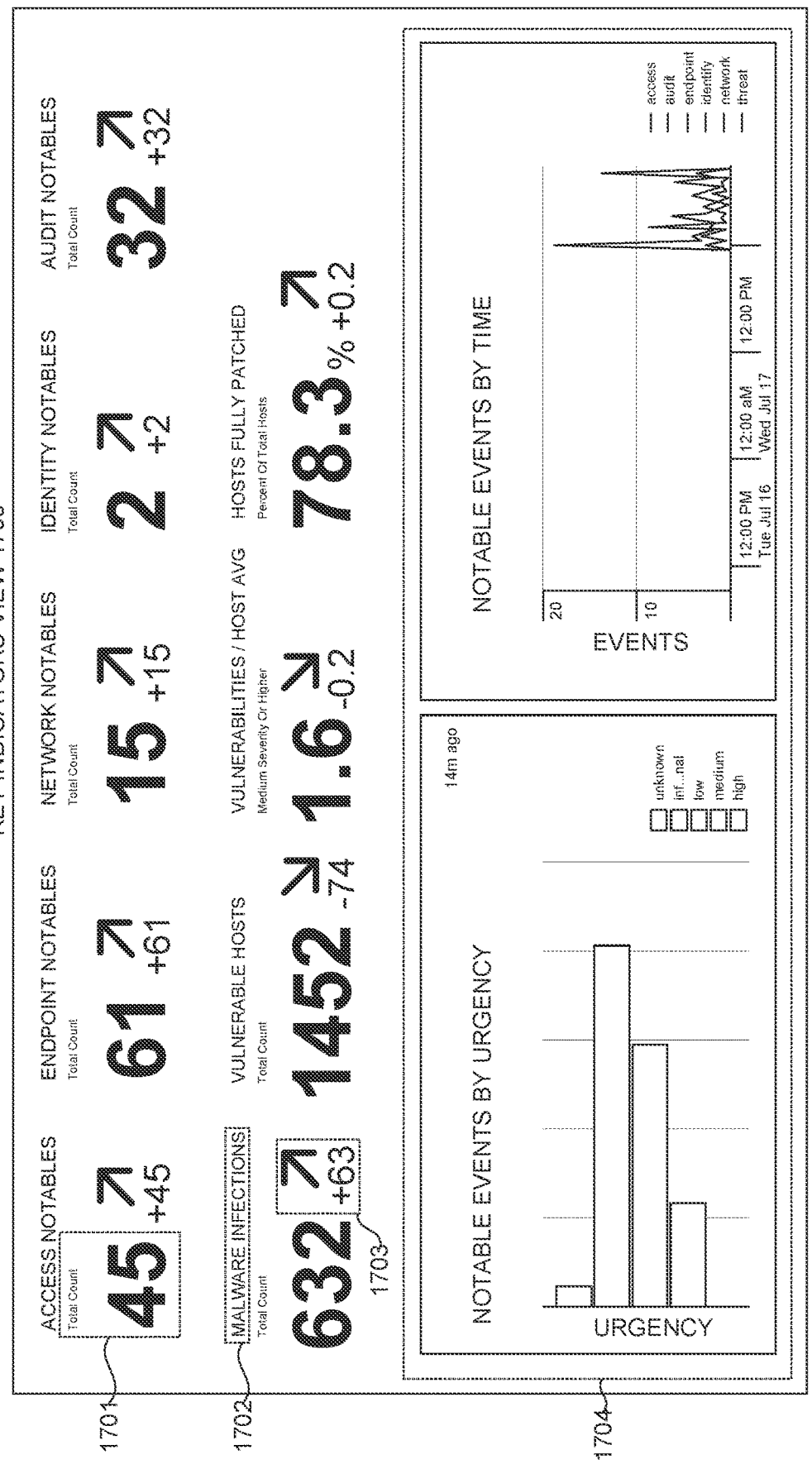
FIG. 17A is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 17A illustrates an example key indicators view 1700 that comprises a dashboard, which may display a value 1701, for various security-related metrics, such as malware infections 1702. It may also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 17B:
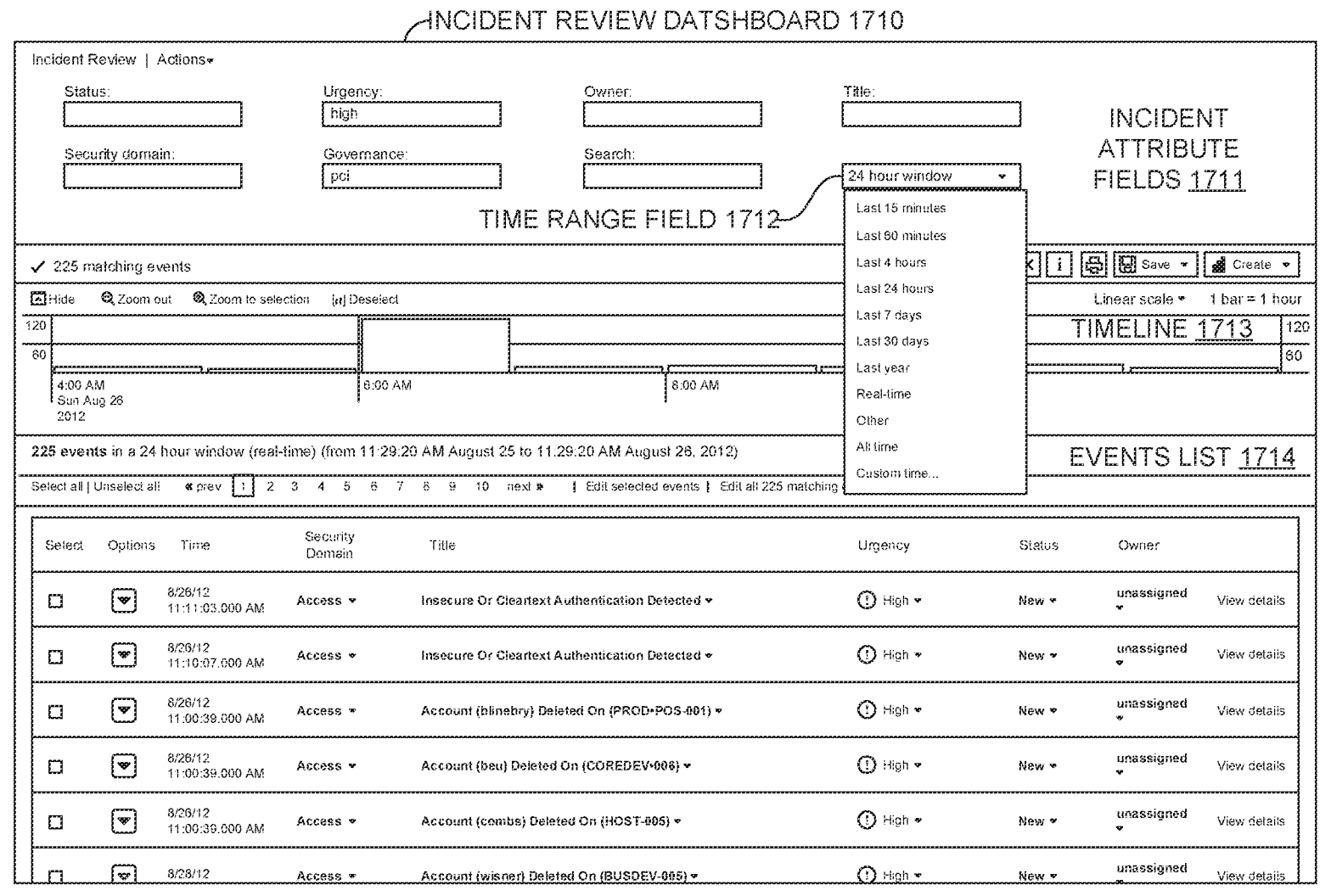

These visualizations may also include an "incident review dashboard" that enables a user to view and act on "notable events." These notable events may include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event may be associated with an urgency value (e.g., low, medium, high, critical), which is indicated in the incident review dashboard. The urgency value for a detected event may be determined based on the severity of the event and the priority of the system component associated with the event.

As mentioned above, the data intake and query platform provides various features that simplify the developer's task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information may include values for performance metrics obtained through an application programming interface (API) provided as part of the vSphere Hypervisor™ system distributed by VMware, Inc. of Palo Alto, Calif. For example, these performance metrics may include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
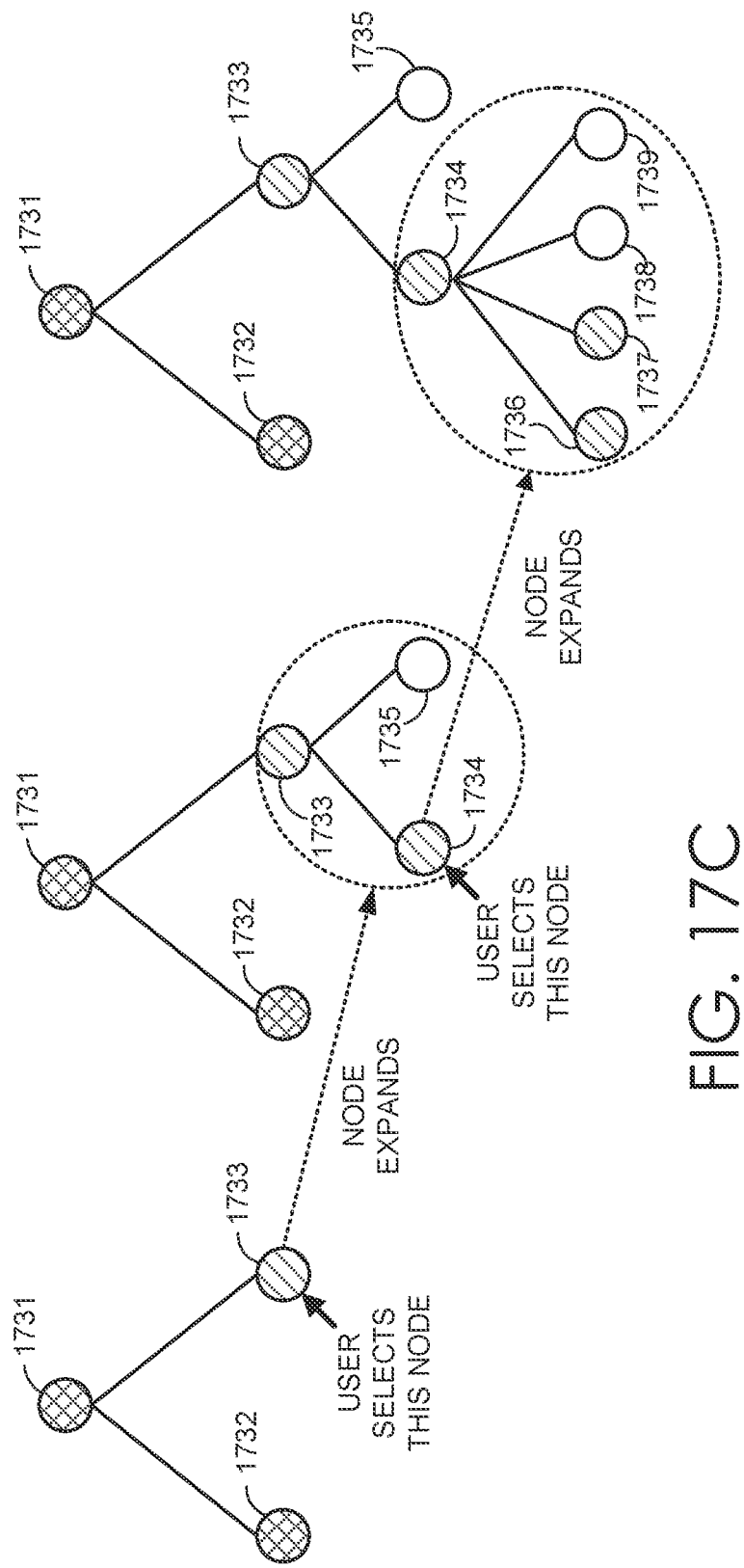
FIG. 17C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 may be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
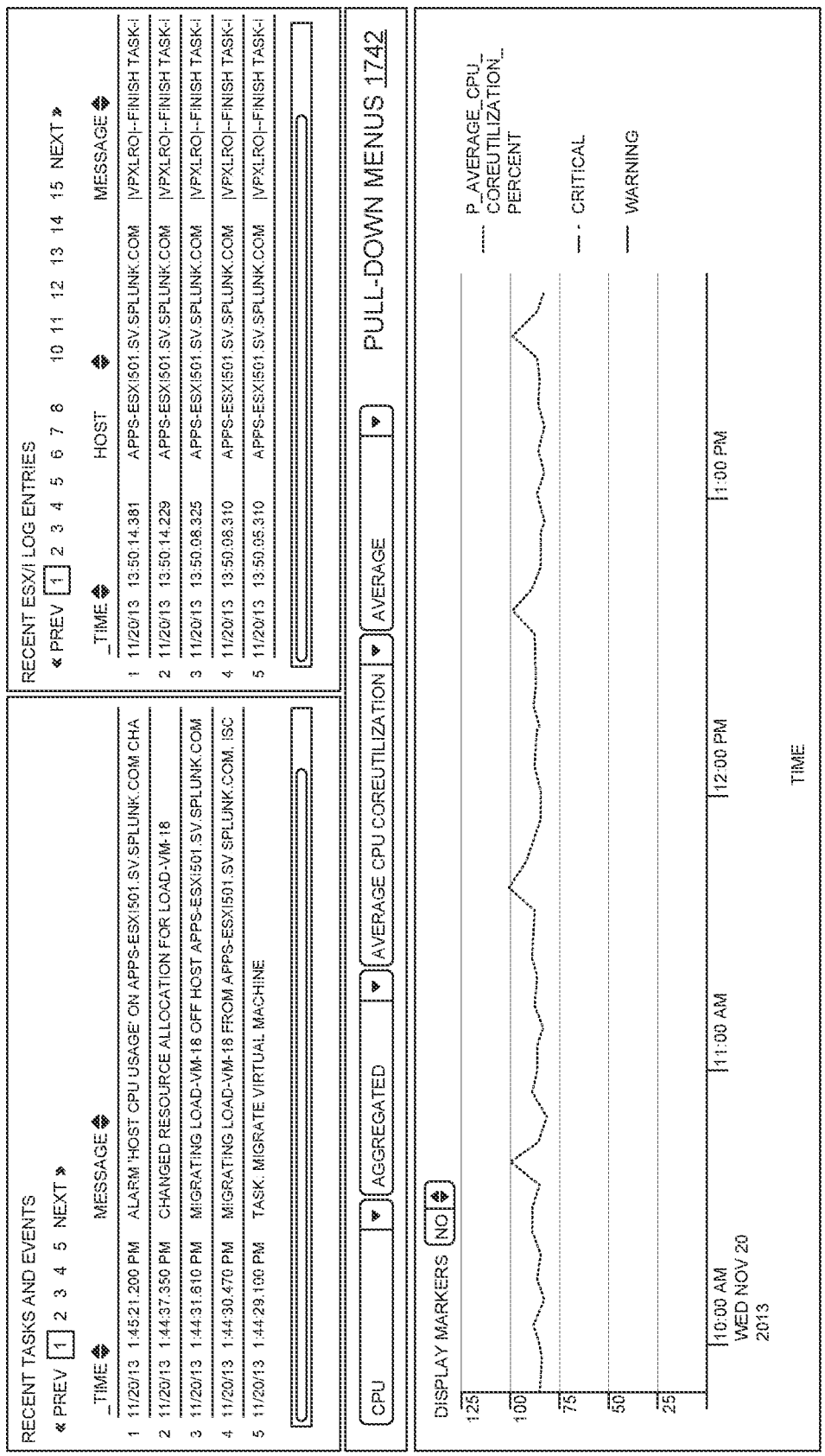
FIG. 17D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions may organize events around a service so that all of the events pertaining to that service may be easily identified. This capability provides a foundation for the implementation of Key Performance Indicators.

One or more Key Performance Indicators (KPIs) are defined for a service within the IT monitoring application. Each KPI measures an aspect of service performance at a point in time or over a period of time (aspect KPIs). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPIs of the service to indicate an overall health score for the service.

The IT monitoring application facilitates the production of meaningful aggregate KPIs through a system of KPI thresholds and state values. Different KPI definitions may produce values in different ranges, and so the same value may mean something very different from one KPI definition to another. To address this, the IT monitoring application implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPIs may be processed uniformly once they are translated into the common state values using the thresholds. For example, "normal 80% of the time" may be applied across various KPIs. To provide meaningful aggregate KPIs, a weighting value may be assigned to each KPI so that its influence on the calculated aggregate KPI value is increased or decreased relative to the other KPIs.

One service in an IT environment often impacts, or is impacted by, another service. The IT monitoring application may reflect these dependencies. For example, a dependency relationship between a corporate e-mail service and a centralized authentication service may be reflected by recording an association between their respective service definitions. The recorded associations establish a service dependency topology that informs the data or selection options presented in a GUI, for example. The service dependency topology is like a "map" showing how services are connected based on their dependencies. The service topology may itself be depicted in a GUI and may be interactive to allow navigation among related services.

Entity definitions in the IT monitoring application may include informational fields that may serve as metadata, implied data fields, or attributed data fields for the events identified by other aspects of the entity definition. Entity definitions in the IT monitoring application may also be created and updated by an import of tabular data (as represented in a CSV, another delimited file, or a search query result set). The import may be GUI-mediated or processed using import parameters from a GUI-based import definition process. Entity definitions in the IT monitoring application may also be associated with a service by means of a service definition rule. Processing the rule results in the matching entity definitions being associated with the service definition. The rule may be processed at creation time, and thereafter on a scheduled or on-demand basis. This allows dynamic, rule-based updates to the service definition.

During operation, the IT monitoring application may recognize notable events that may indicate a service performance problem or other situation of interest. These notable events may be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of events and the KPI values generated and collected. Visualizations may be particularly useful for monitoring or investigating service performance. The IT monitoring application provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPIs indicating overall health for defined services and a general KPI section with tiles for KPIs related to individual service aspects. These tiles may display KPI information in a variety of ways, such as by being colored and ordered according to factors like the KPI state value. They also may be interactive and navigate to visualizations of more detailed KPI information.

The IT monitoring application provides a service-monitoring dashboard visualization based on a user-defined template. The template may include user-selectable widgets of varying types and styles to display KPI information. The content and the appearance of widgets may respond dynamically to changing KPI information. The KPI widgets may appear in conjunction with a background image, user drawing objects, or other visual elements, that depict the IT operations environment, for example. The KPI widgets or other GUI elements may be interactive so as to provide navigation to visualizations of more detailed KPI information.

The IT monitoring application provides a visualization showing detailed time-series information for multiple KPIs in parallel graph lanes. The length of each lane may correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

The IT monitoring application provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

The IT monitoring application provides pre-specified schemas for extracting relevant values from the different types of service-related events. It also enables a user to define such schemas.

Figure 18:
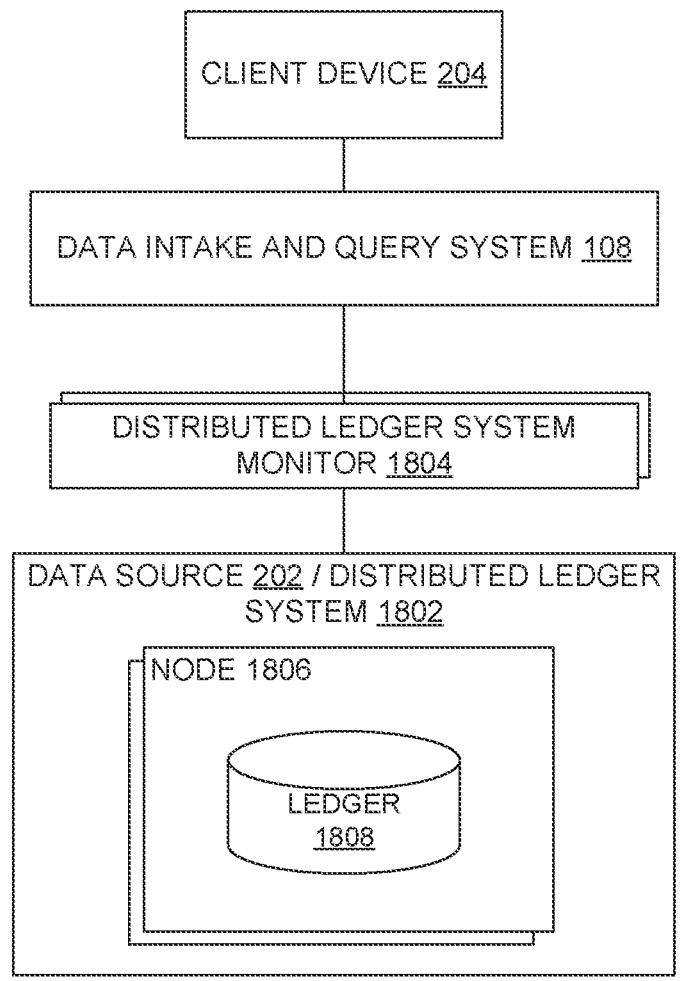
FIG. 18 is a block diagram of an embodiment of the data processing environment.

FIG. 18 is a block diagram of an embodiment of the data processing environment 200 described previously with reference to FIG. 2 that includes a distributed ledger system 1802 as a data source 202 of the data intake and query system 108, a distributed ledger system monitor 1804 (also referred to herein as monitor 1804), and a client device 204 to interact with data associated with the data intake and query system 108. Non-limiting examples of a distributed ledger system 1802 include, but are not limited to, Ethereum, Hyperledger Fabric, Quorum, Guardtime, KSI, etc.

The distributed ledger system monitor 1804 may be used to obtain and monitor data associated with the distributed ledger system 1802. The monitor 1804 may be implemented using one or more computing devices, virtual machines, containers, pods, another virtualization technology, or the like, in communication with one or more nodes 1806 of the distributed ledger system 1802. For example, in some embodiments, the monitor 1804 may be implemented on the same or across different computing devices as distinct container instances, with each container having access to a subset of the resources of a host computing device (e.g., a subset of the memory or processing time of the processors of the host computing device), but sharing a similar operating system. For example, the monitor 1804 may be implemented as one or more Docker containers, which are managed by an orchestration platform of an isolated execution environment system, such as Kubernetes.

Although illustrated as being distinct from the data intake and query system 108 and distributed ledger system 1802, it will be understood that in some embodiments, the monitor 1804 may be implemented as part of the data intake and query system 108 and/or distributed ledger system 1802. For example, the monitor 1804 may be implemented using or on one or more nodes 1806 of the distributed ledger system 1802 and/or be implemented using one or more components of the data intake and query system 108. In certain embodiments, such as when the distributed ledger system 1802 is implemented using an isolated execution environment system, such as, but not limited to Kubernetes, Docker, etc., the monitor 1804 may be implemented as an isolated execution environment of the isolated execution environment system and/or using an isolated execution environment system that is separate from the isolated execution environment system used to implement the distributed ledger system 1802.

In some embodiments, the monitor 1804 interfaces with the distributed ledger system 1802 to collect data from one or more components of the distributed ledger system 1802, such as the nodes 1806. In certain embodiments, the monitor 1804 may collect different types of data from the distributed ledger system 1802. In some embodiments, the monitor 1804 receives, from one or more nodes 1806, distributed ledger transactions, blocks, metrics data, and/or log data.

Although only one monitor 1804 is shown in FIG. 18, it will be understood that multiple monitors may be used to collect data from the distributed ledger system 1802. In some embodiments, one or more data collector agents may collect data from each node 1806 (e.g., from each peer node 1806 and/or ordering node 1806) or a subset of the nodes 1806 (e.g., one or more peer nodes 1806).

As mentioned, the monitor 1804 may collect any combination of the data generated by the nodes 1806. In some embodiments, the monitor 1804 is configured to obtain one type of data, such as the transaction notifications. A transaction notification may include information about a block (including its transactions) that is to be committed to a blockchain. In some cases, a transaction notification may correspond to one or more individual transactions of a block, the entire block, or parts of a transactions, such as the bytecode used as part of a transaction, etc. In some cases, a transaction notification may include the entire content of a block (e.g., the header portion, body portion, transactions, metadata, etc.), or a summary of information, such as an indication of which transactions of a block were validated/invalidated and/or committed to a blockchain. In certain embodiments, transaction notifications may be stored in a data store, a publication-subscription (pub-sub) messaging system, or buffer.

Transaction notifications may differ from the log data. For example, the log data may be generated asynchronously as various activities occur on different nodes 1806 (e.g., errors, specific processing tasks, etc.), whereas the transaction notifications may be generated as a result of a block being committed to a blockchain. For example, in some cases, peer nodes 1806 and/or ordering nodes 1806 may generate log data but only peer nodes 1806 may generate transaction notifications. Further, transaction notifications may differ from log data in that the log data may include unstructured raw machine data, whereas the transaction notifications may include structured data that identifies the block (or portions thereof) that is to be committed to a blockchain or a summary related to transactions of the block that is to be committed (e.g., identification of validated/invalidated transactions). In addition, a transaction notification may include information about multiple transactions and/or multiple transaction identifiers, whereas the log data may include information about only one transaction and/or only one transaction identifier.

In some embodiments, the monitor 1804 may interact with a respective node 1806 to obtain transaction notifications. As described herein, in some cases, transaction notifications are posted to a pub-sub. As such, the monitor may subscribe to the pub-sub to obtain relevant transaction notifications. In some cases, a node 1806 is associated with multiple channels and the transaction notifications for the different channels are found on different topics of a pub-sub or on different pub-subs. In these cases, the monitor 1804 may be configured to subscribe to the different topics and/or pub-subs. In this way, the monitor 1804 may collect the relevant transaction notifications from a node 1806.

In some cases, the monitor 102 processes the transaction notifications. For example, in some cases, portions of a transaction notification, such as the details of an individual transaction, may be encrypted or encoded. In these examples, the monitor 1804 may decode byte strings to readable UTF8 strings or hex. Further, the transaction notification may include information about multiple transactions. In some such embodiments, the monitor 102 may parse information about individual transactions and separately communicate the information about individual transactions to the data intake and query system 108 (as well as the entire transaction notification). In certain cases, each communication may include a transaction identifier that identifies the corresponding transaction. The data intake and query system 108 may store the separate communications as individual events. Accordingly, the monitor 1804 may be used to generate multiple events from one transaction notification. In some embodiments, the data intake and query system 108 may store the individual events generated from the transaction notifications in an index that is separate from an index that store metrics data and/or log data.

Furthermore, the monitor 1804 and/or data intake and query system 108 may extract transaction identifiers from the communications received from the monitor 1804 using one or more regex rules. In some such embodiments, the data intake and query system 108 may store the transaction identifiers in one or more inverted indexes that associate the transaction identifier with the event that includes it. In some cases, the monitor 1804 may extract additional information from the transaction notifications, such as, but not limited to channel information (e.g., the channel associated with the transaction and/or blockchain), node information (e.g., identification of the nodes that endorsed, ordered, and/or validated the transaction), etc. The data intake and query system 108 may store any combination of the extracted information in one or more inverted indexes.

Figure 19A:
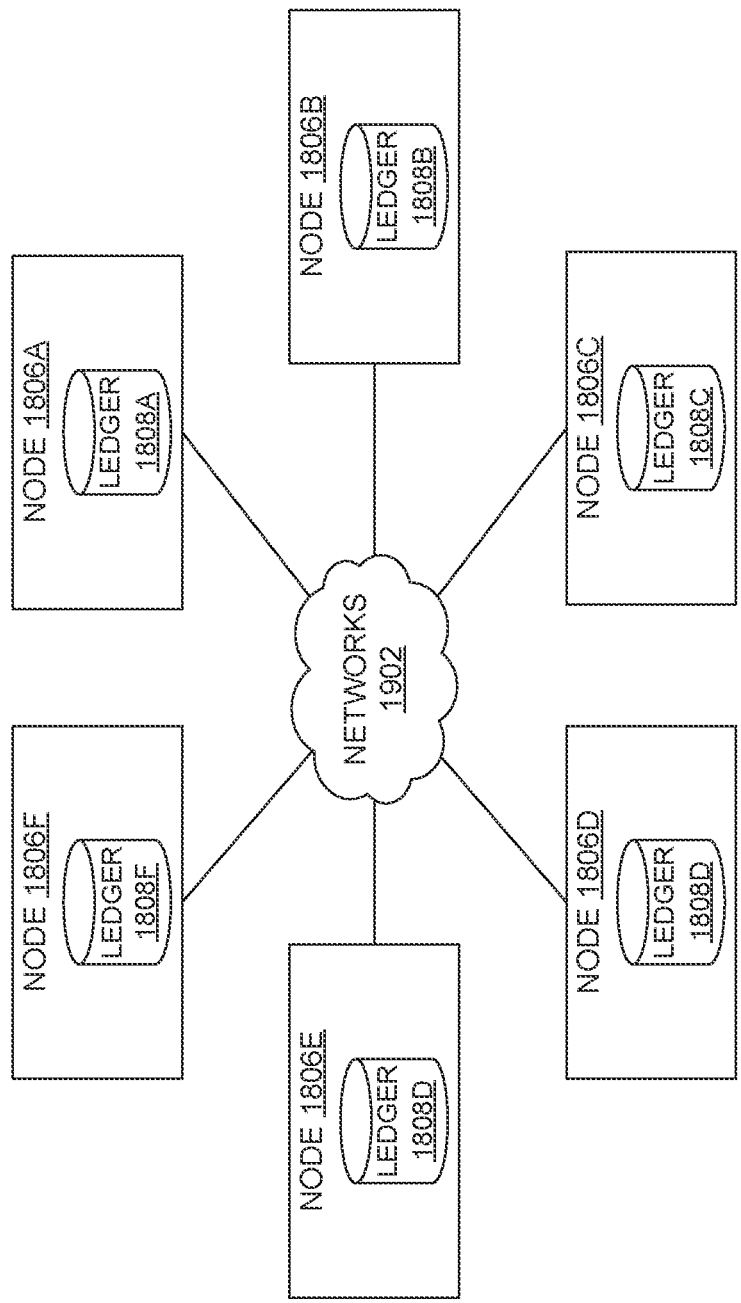
FIGS. 19A and 19B are block diagrams illustrating embodiments of a distributed ledger.

FIG. 19A is a block diagram illustrating an example of a distributed ledger system 1802 that provides one or more distributed ledgers 1808A-1808F (generically referred to as ledger(s) 1808) or blockchains across one or more nodes 1806A-1806F (generically referred to as node(s) 1806). The nodes 1806 may communicate via a network 1902. The network 1902 may be the same as network 104 or a different public or private network.

Each node 1806 may be implemented using individual computing devices, distributed processing systems, servers, isolated execution environments (e.g., containers, virtual machines, etc.), shared computing resources, and so on. In some embodiments, the nodes 1806 may be implemented on the same or as part of different isolated execution environment systems (e.g., as different containers or pods of the same or different Kubernetes cluster or Docker swarm).

In the illustrated embodiment of FIG. 19, each node 1806 is shown to include a ledger 1808 (which may include more than one ledger), which may be stored across one or more data stores, etc. In some embodiments, the ledger 1808 of each node 1806 may include one or more blockchains, etc. In some cases, the ledgers 1808 of the different nodes 1806 correspond to each other, include the same or matching data entries, or include the same data.

The distributed nodes 1806 may store, maintain and/or update their respective ledger 1808. Each node 1806 may be configured for storing a version of the distributed ledger 1808 (or a portion thereof), and the distributed ledger 1808 may be updated from time to time with modifications to the ledger 1808 and/or ledger entries, such as insertion of a ledger entry (also referred to herein as a block) or an update of a ledger entry. The distributed ledger system 1802 may be adapted such that, where issues arise with the distributed ledger 1808 (e.g., hash collisions, insertions at the same time, corrupted ledgers/ledger entries), the issues are resolved based at least on issue resolution logic. For example, such logic may be distributed among each of the nodes 1806 and/or their computing systems and may be used to improve or ensure consistency between copies of the ledgers at the different nodes. In some embodiments, issues may arise that may cause a distributed ledger 1808 to "fork" and/or spawn another instance, for example, where a collision cannot be automatically resolved between the nodes. In such cases, the resolution logic may be used to determine when to "fork" or spawn another instance, etc.

It will be understood that each node 1806 may include fewer or more components. For example, each node 1806 may include processors, buffers, applications, databases, etc. In some cases, the nodes 1806 may include executable instructions or code that when executed by the node 1806 cause the node 1806 to modify a corresponding ledger 1808 or generate a transaction that is to be stored in a block of a blockchain. In some cases, the executable instructions may be bytecode and may be used to implement or execute a smart contract relative to the ledger 1808.

As described herein, the nodes 1806 may include at least a decentralized set of computing devices and may even include personal computing devices for individuals, and so on. For example, a ledger 1808 may be stored on a large number of publicly available devices, each acting as a "node" for storing a copy of the ledger 1808 (e.g., being collaboratively maintained by anonymous peers on a network). In some embodiments, the ledger 1808 is only stored and maintained on a set of trusted "nodes", such as on a private network or on the computing systems of authorized users. In some embodiments, a combination and/or a "mix" of both trusted nodes and public nodes may be utilized, with the same and/or different rules being applied to activities performed at each (e.g., a different validation process may be used for untrusted nodes, or simply untrusted nodes may be unable to perform certain activities). In some embodiments, there may be different levels of nodes with differing characteristics and applied logic.

The ledgers 1808, ledger entries, and/or information stored on the ledger entries may be used to store information received from one or more computing devices. For example, the information may include banking information, other commercial information, smart contracts, etc. Further, the ledger 1808 and ledger entries may utilize encryption technology to facilitate and/or validate digital signatures or the data received from the computing devices.

In some embodiments, the ledger 1808 is publicly accessible. In some embodiments, the ledger 1808 is only accessible to select, authorized nodes having the appropriate permissions. In some embodiments, portions of the ledger 1808 are public and portions of the ledger 1808 are private. When the ledger 1808 is publicly accessible, the ledger 1808 may be adapted to only store information incidental to a transaction or a document relating to a transaction, and may be adapted such that identifiable information is removed but validation information is maintained (e.g., storing a hash value computed from the underlying information). Further, the information stored on the ledger 1808 may be encrypted (non-limiting example: using a public key of a key pair associated with the data intake and query system 108), redacted, compressed, transformed (e.g., through a one-way transformation or a reversible transformation), and so on.

Each of the one or more nodes 1806 may have, at various times, versions of the ledger 1808, and the ledger 1808 may be maintained through the propagation of entries and/or updates that may be copied across ledgers 1808. Ledger entries may contain elements of information (e.g., header information and/or other data). There may be various rules and/or logic involved in activities relating to the ledger entries (e.g., creating, updating, validating, deleting); for example, a majority, supermajority, or unanimous consent between nodes may be enforced as a condition to an activity relating to an entry. In some embodiments, distributed ledgers 1808 are utilized and the ledger entries are adapted to have various linkages to one another such that the integrity of the ledger entries may be reinforced and/or validated. For example, the linkages may include hashes computed based on prior entries in the ledger 1808, which may be utilized to determine whether a ledger entry is a fraudulent entry by reviewing the correctness of the hash based on performing the hash on information stored on prior entries.

The ledger 1808 may be maintained through, for example, a "distributed network system", the distributed network system providing decentralized control and storage of the ledger 1808 at the one or more nodes (which may be considered "nodes" of the system). The number of "nodes" may be fixed or vary with time, and increasing or decreasing the number of "nodes" may impact the performance and/or security of the system.

The ledger 1808 copies stored and maintained at each "node" provide cross-validation with one another in the event of conflicts between ledgers 1808, and various cryptographic and/or hashing algorithms may be utilized during the generation, updating, deletion, linking, and so on, of ledger entries such that ledger entries have increased resiliency to unauthorized tampering or modification. For example, a blockchain ledger 1808 may be distributed across nodes 1806 and used to track information received from one or more computing devices. The blockchain ledger 1808 may have entries linked to one another using cryptographic records, and entries in the blockchain may be ordered, time stamped, and/or associated with metadata. These and other methods may be used for protection against "double" transfers and unauthorized modification of ledger entries.

Figure 19B:
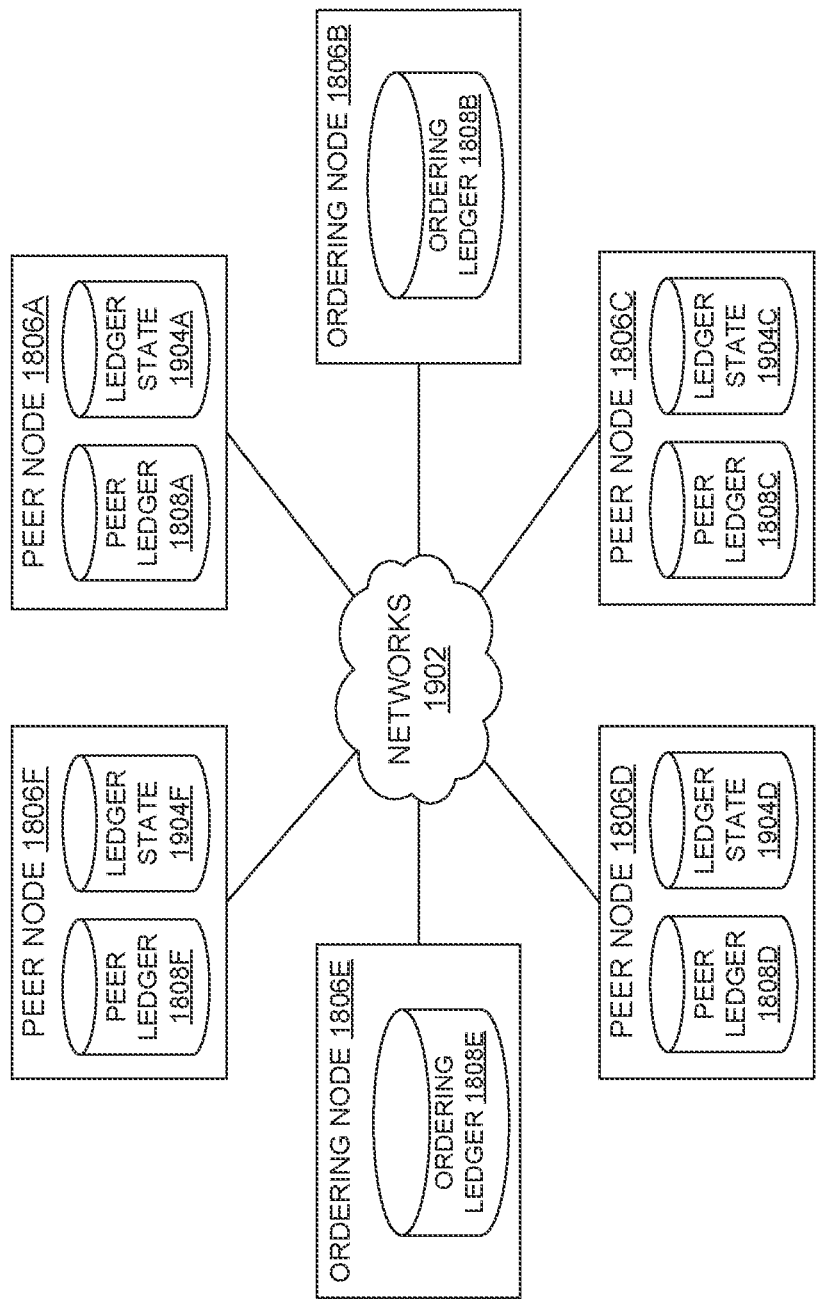

FIG. 19B is a block diagram illustrating another example of a distributed ledger system 1802 that includes different types of nodes 1806. Specifically, the illustrated example of FIG. 19B includes four peer nodes 1806A, 1806C, 1806D, 1806F (generically referred to as peer node(s) 1806) and two ordering nodes 1806B, 1806D (generically referred to as ordering node(s) 1806). It will be understood that fewer or more nodes may be included as desired. For example, the distributed ledger system 1802 may include only one ordering node 1806 or two or more ordering nodes 1806. Similarly, the distributed ledger system 1802 may include fewer or more peer nodes 1806 as desired.

As described herein, the peer nodes 1806 and ordering nodes 1806 may be implemented using one or more computing devices, isolated execution environments, etc. In some embodiments, each peer node 1806 and/or ordering node 1806 may be associated with the same or different organization, entity, or user. For example, one organization may be associated with or control peer nodes 1806A, 1806C and ordering node 1806B, a second organization may be associated with or control peer node 1806D and ordering node 1806E, and a third organization may be associated with or control peer node 1806F. A non-limiting example of a distributed ledger system 1802 that includes peer nodes 1806 and ordering nodes 1806 is the Hyperledger Fabric.

For simplicity in describing FIG. 19B, the peer nodes 1806 and ordering nodes 1806 are described with reference to a common channel that enables private communications/transactions between the illustrated nodes 1806A-1806F. However, it will be understood that the peer nodes 1806 and ordering nodes 1806 may be associated with multiple channels that each enable private communications/transactions between nodes associated with the channel and/or be associated with multiple consortiums made up of organizations that control the individual nodes 1806. Further, it will be understood that each peer node 1806 may include one or more peer node ledgers 1808 and/or ledger states 1904 and perform the functions described herein for each channel with which the peer node 1806 is associated. Similarly, each ordering node 1806 may include an ordering node ledger 1808 and perform the functions described herein for each channel with which the ordering node 1806 is associated. In some cases, each channel may include at least one ordering node 1806 and multiple peer nodes 1806. In certain embodiments, a channel is associated with multiple peer nodes 1806 and only one ordering node 1806. In certain cases, multiple ordering nodes 1806 may be associated with the same channel.

In the illustrated embodiment of FIG. 19B, each of the peer nodes 1806A, 1806C, 1806D, 1806E includes a respective peer node ledger 1808A, 1808C, 1808D, 1808F (generically referred to as peer node ledger(s) 1808) and a respective ledger state 1904A, 1904C, 1904D, 1904E (generically referred to as ledger state(s) 1904), and may be used to receive proposed transactions from a client computing device (not shown), endorse transactions, communicate endorsed transactions to a client computing device or ordering node 1806, validate transactions of a block, commit blocks to a respective peer node ledger 1808, and/or update a respective ledger state 1904.

Similar to the description of ledgers 1808 with reference to FIG. 19A, the peer node ledgers 1808 may include one or more ledgers or blockchains. Further, the peer node ledgers 1808 of the different peer nodes 1806 may correspond to each other, include the same or matching entries, transactions, blocks, blockchains, etc. In some cases, the peer node ledger 1808 may include blocks formed from validated transactions, but may exclude invalidated transactions. In certain embodiments, the peer node ledgers 1808 may include blocks formed from validated and invalidated (or failed) transactions. In certain embodiments, such as embodiments in which an ordering node 1806 maintains an ordering node ledger 1808, the peer node ledgers 1808 may correspond to or match the ordering node ledgers 1808 of the ordering nodes 1806 and/or be different. For example, in some cases, the ordering node ledgers 1808 may include all endorsed transactions, regardless of whether they are validated and the peer node ledgers 1808 may include endorsed and validated transactions but not endorsed and invalidated or failed transactions. In certain embodiments, the peer node ledgers 1808 may include one ledger or blockchain that matches the ordering node ledger 1808 and another ledger that does not match the ordering node ledger 1808.

In some cases, the peer node ledger 1808 is generated based on blocks received from an ordering node 1806. For example, the peer node 1806 may review the transactions of a received block and, if a transaction is validated, may include the transaction as part of a block for the peer node ledger 1808. Accordingly, in certain embodiments a block of a peer node 1806 may have fewer transactions (or none) compared to a corresponding block received from the ordering node 1806 and/or found in the ordering node ledger 1808.

Figure 20:
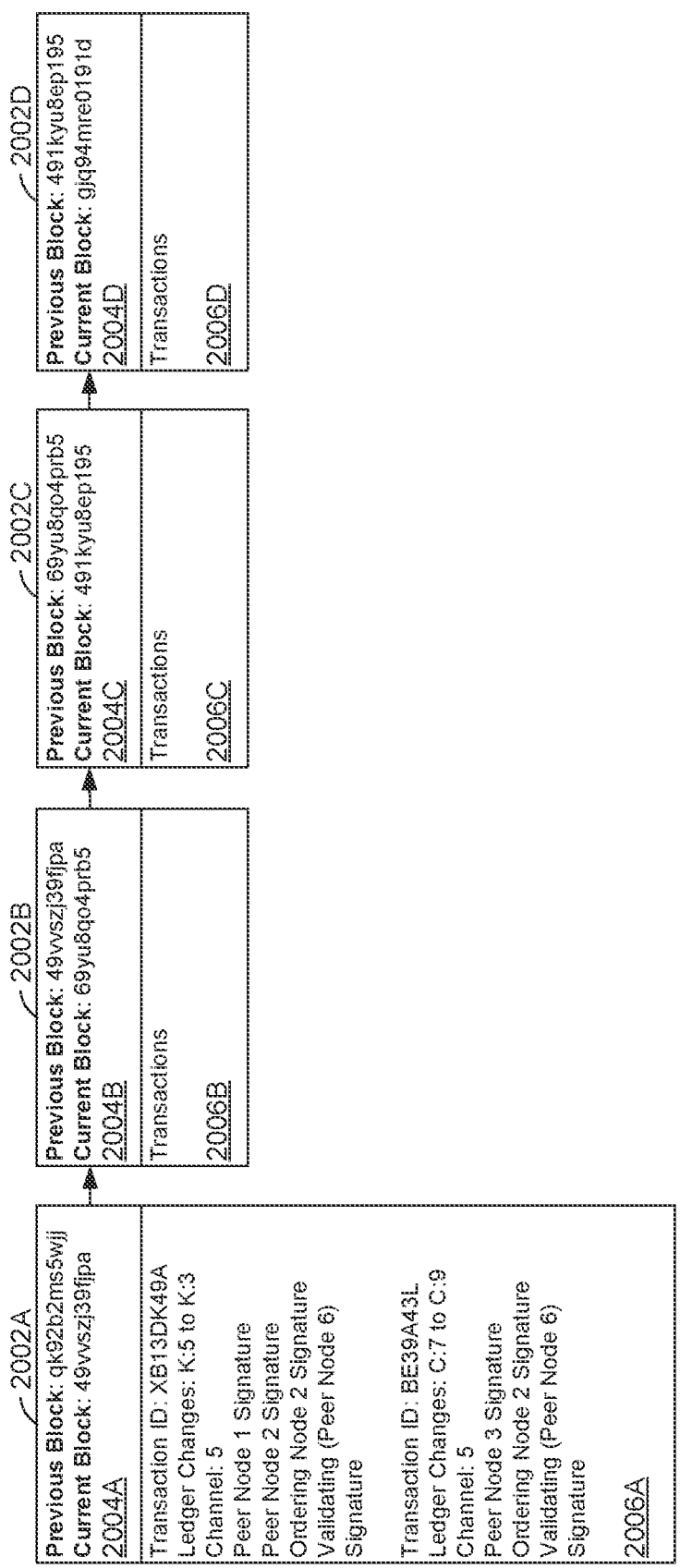
FIG. 20 is a block diagram illustrating an embodiment of a blockchain.

As described herein at least with reference to FIG. 20, when a peer node ledger 1808 is implemented as a blockchain, each block of the blockchain may include a header portion (including metadata) and a body portion. The header portion and/or metadata may include a block number (e.g., which block the block is in the blockchain), one or more content identifiers for the current block, a content identifier for a previous block, one or more timestamps (e.g., when block was created, added to the blockchain, etc.), a digital certificate, a public key (of a public-private key pair), a digital signature of the peer node 1806 that added the block to the blockchain, and/or indicators as to whether a transaction of the block is valid/invalid, etc. In addition, in some cases, the header portion may include hashes or content identifiers for individual transactions of a block, and the body portion of a block in the blockchain may include one or more transactions or transaction data associated with a transaction.

In certain embodiments, each transaction may include header information (e.g., bytecode used to generate the transaction, software version, etc.), digital signature of the client computing device that initiated the transaction, a signature or identifier of the endorsing peer nodes 1806 (peer nodes 1806 that signed and/or endorsed the transaction), channel information (which channel the transaction is associated with), a signature or identifier of the ordering node 1806 that ordered the transaction in the block, a proposed change to the peer node ledger 1808, an expected input/output of the transaction (e.g., the content of the ledger state 1904 before and after the transaction is executed, etc.), etc.

The ledger state 1904 may include one or more key-value pairs reflecting the value or state of the key (of the key-value pair), and may be implemented as a database in one or more data stores of a peer node 1806. In some embodiments, the ledger state 1904 reflects a current state or value of the keys based on the transactions in the corresponding peer node ledger 1808 or blockchain. As a non-limiting example, if the peer node ledger 1808 reflects transactions (e.g., debits and credits) associated with a particular bank account or other intangible object, the ledger state 1904 may reflect the current value of money in the bank account based on all previous transactions. As another non-limiting example, the ledger state 1904 may reflect a current ownership of a car or other physical object based on previous (validated) transactions associated with the car found in the peer node ledger 1808. Accordingly, as a peer node 1806 adds a block with one or more transactions to a peer node ledger 1808 or blockchain, the peer node 1806 may update the ledger state 1904 for keys that were altered based on any combination of the (validated) transactions of the block. Similar to the peer node ledgers 1808, the ledger states 1904 of the different peer nodes 1806 may correspond to each other, include the same or matching key-value pairs, etc.

Although not illustrated, it will be understood that each peer node 1806 may include fewer or more components. For example, as mentioned, each peer node 1806 may include multiple peer node ledgers 1808, as well as bytecodes, permissions, etc. This information may be stored on one or more data store associated with the peer node 1806. The permissions may indicate which channels, organizations, or other components, the peer node 1806 is associated with and/or what information the peer node 1806 is allowed to access or edit, etc.

The bytecodes may include executable instructions that the peer node 1806 is to execute and which may generate or be used to endorse or validate transactions for a block of a blockchain. For example, a bytecode may indicate that a peer node 1806 is to read/write information to a ledger state 1904. A client computing device (not shown) may cause the peer node 1806 to execute the bytecode by providing the peer node 1806 with one or more inputs. For example, if the bytecode is used to reflect the change in ownership of a car, the client computing device may identify the subject car and the identity of the parties involved in the transaction (e.g., buyer and seller). The peer node 1806 may use the bytecode to verify whether the ledger state 1904 includes the identified car and the parties are valid (e.g., identified owner owns the car and buyer is able to purchase the car), etc. Based on the bytecode, the relevant peer nodes 1806 may endorse or validate a transaction that is to be included as part of a block in a blockchain.

FIG. 20 is a block diagram illustrating an embodiment of a blockchain 2000 or distributed ledger that includes blocks that are linked together. The blockchain 2000 may correspond to a peer node blockchain (non-limiting example: include only validated transactions or an indication of valid/invalid transactions) and/or an ordering node blockchain (non-limiting example: include transactions regardless of validation). In the illustrated embodiment, four blocks 2002A, 2002B, 2002C, 2002D (generically referred to as block(s) 2002) of the blockchain 2000 are shown, with each block 2002 including a header portion 2004A, 2004B, 2004C, 2004D (generically referred to as header portion(s) 2004) and a body portion 2006A, 2006B, 2006C, 2006D (generically referred to as body portion 2006). However, it will be understood that each block 2002 may include fewer or more sections, etc. For example, in some embodiments, each block 2002 may include only a body portion 2006 or only a header portions 2004 (e.g., if a peer node 1806 determines that no transactions of a block received from an ordering node 1806 may be validated, the peer node 1806 may generate a block with no transactions). In addition, for simplicity, some details of the blocks 2002 are not shown. For example, additional information may be included in the header portions and/or body portions, etc.

The distributed ledger system 1802 may generate blocks based on various criteria, such as, but not limited to, expiration of a predetermined period, the size or amount of data/transactions received, solving a computational task that is determined by a difficulty parameter, the number of block entries (or transactions), or generated content identifiers received, etc. In some embodiments, the distributed ledger system 1802 may generate a block based on expiration of a predetermined period. For example, the distributed ledger system 1802 may generate a block for the blockchain 2000 once a second, every 10 seconds, once a minute, every 10 min., every hour, etc. In certain embodiments, the distributed ledger system 1802 may generate a block based on the size or amount of data corresponding to one or more transactions. For example, the distributed ledger system 1802 may generate a block for each group of transactions that forms a megabyte or gigabyte of data. In some embodiments, the distributed ledger system 1802 may generate a block based a node or computing system determining a solution to a computational puzzle that is based on a difficulty parameter. In certain cases, the difficulty parameter changes over time to ensure that blocks are likely to produce on a regular time interval. In some cases, the distributed ledger system may generate a block based on a number of block entries, transactions, or content identifiers. For example, the distributed ledger system 1802 may generate a block for each transaction or each set of 100, 1000, or 1,000,000 transactions, etc. The distributed ledger system 1802 may use any combination of the aforementioned techniques to generate a block.

In the illustrated embodiment, the header portions 2004 include a content identifier (e.g., a hash) associated with the previous block (e.g., a hash of the body portion of the previous block) and a content identifier for the current block (e.g., a hash of the body portion of the current block). For example, the header portion 2004B includes the hash "49vvszj39fjpa," which corresponds to the hash of the body portion 2006A and the hash "69yu8qo4prb5," which corresponds to the hash of the body portion 2006B.

It will be understood that less, different, or more information may be included in the header portions 2004, as desired. For example, the header portions 2004 may include a nonce, root hash of a Merkle tree, timestamp, difficulty level, software version number, block number indicating the number of blocks in the blockchain that precede the block, etc. The nonce may correspond to the number used to obtain a hash that is smaller than a target hash. For example, in some embodiments, before a group of transactions may be added as a block to the blockchain 2000, the distributed ledger system 1802 may require that the hash of the content of the block (e.g., the hash of the body portion 2006) be lower than a threshold number. To meet that criteria, a node 1806 may add a nonce value and hash the combination of the nonce value and the content of the block. If the resulting hash does not meet the size criteria, the node may repeatedly increment the nonce value and take hash again until the threshold is satisfied. The final nonce value may be included in the block.

As another example, the header portions 2004 may include hashes of the entire previous block (header and/or body portion), one or more timestamps (or time range) reflecting the time when the block was started, completed, and/or added to the blockchain 2000, and/or a difficulty level. In certain cases, the timestamp may correspond to current day and time and/or a time period elapsed from a particular time. The difficulty level can, in certain cases, correspond to the size of the hash. In certain cases, a smaller hash may correspond to a higher difficulty level. The root hash may correspond to the hash created based on hashes of multiple transactions, including any hashes of hashes generated by hashing transactions, and so on.

The header portions 2004 may include a content identifier for each transaction included in the body portion 2006. For example, the header portion 2004 may include a hash of each transaction in the body portion 2006. In certain embodiments, the header portion 2004 may include a digital certificate, public key, and/or digital signature associated with the peer node 1806 or ordering node 1806 that created it. In some cases, the header portion 2004 (or other metadata) may include an indicator for each transaction indicating whether the transaction was validated by a peer node 1806. In some embodiments, where the ordering node ledger 1808 and the peer node ledger 1808 are different, the header portion of a block in a peer node ledger 1808 may include an indication of the block in the ordering node ledger to which it relates. For example, if OrderBlock_12 in an ordering node blockchain includes Transaction_A that is later invalidated and excluded from a corresponding PeerBlock_12 in a peer node blockchain, the header portion of the PeerBlock_12 may include an identifier that identifies OrderBlock_12 in the ordering node blockchain as including Transaction_A.

With continued reference to FIG. 20, the body portions 2006 may include one or more block entries for each transaction of the block. In some embodiments, the block entries may be compressed and/or the content of one or more block entries (or all block entries) may be encoded or encrypted using a public key of a key pair associated with the computing device that provided the information for the block entry. In this way, the distributed ledger system 1802 may limit the accessibility of the block entries.

In some embodiments, the block entries may include transaction data, such as but not limited to, a transaction identifier, node signatures (e.g., endorsing/validating peer nodes 1806, ordering nodes 1806, etc.), client computing device signatures, proposed ledger changes, expected input/ output of the transaction, bytecode identification, inputs into the bytecode, channel information, timestamp of creation, etc. In some cases, each proposed transaction received by a peer node may be assigned (or come with) a transaction identifier or transaction ID. The transaction identifier may follow the transaction throughout the validation process and/or be included as part of transaction in a block entry of a block.

The digital signatures may include any combination of a digital signature from the client computing device that initiated the proposed transaction, a digital signature corresponding to the peer nodes 1806 that endorsed the transaction, the digital signature of the ordering node(s) 1806 that ordered the transactions in and/or created the block, and/or the digital signature of the peer node 1806 that validated the transaction as part of the block and/or committed the block to the blockchain. In certain cases, the transaction data of a block entry may include the proposed change to the ledger state 1904, including the proposed key-value pairs before and after the transaction is executed. In certain cases, the transaction data may include an identification of the bytecode that generated or corresponds to the transaction.

In the illustrated embodiment, the block entry for the transactions of body portion 306A includes a transaction identifier that uniquely identifies the transaction, an indication of ledger changes, the identification of the channel with which the blockchain is related (channel 5), the signatures of the endorsing peer nodes (peer node 1 and peer node 2 for the first transaction and peer node 3 for the second transaction), the signature of the ordering node that ordered the transactions (ordering node 2), and the signature of the validating peer node (peer node 6). As shown, given that the transactions are included in the same blockchain, the channel and validating peer node for the transactions in the body portion 2006A is the same. However, the endorsing peer nodes are different. As described herein, this may be due to the peer nodes involved in a transaction as determined by the bytecode and/or request made by a client computing device.

As described herein, the information in the block 2002A may be used to generate one or more transaction notifications. For example, one transaction notification may include the entirety of the block 2002A. As another example, a transaction notification may include information about the validation of the transactions in the block. For example, the transaction notification may identify the transactions of a block that are validated and/or invalidated, etc.

FIGS. 21A-21D are data flow illustrating an embodiment of a distributed ledger system 1802 processing a transaction and generating and storing a block that includes the transaction to a blockchain. In some cases, the validation process described herein with reference to FIGS. 21A-21D may correspond to the validation of one or more transactions on a particular channel within the distributed ledger system 1802.

Figure 21B:
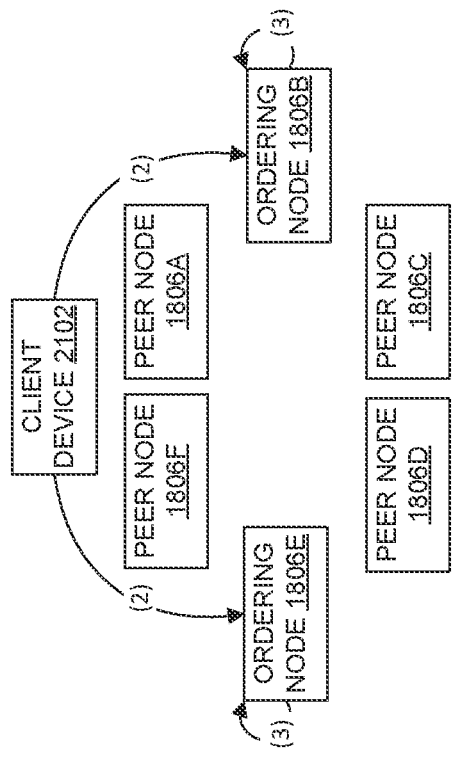
FIGS. 21A-21D are data flow diagrams illustrating an embodiment of a distributed ledger system processing a transaction.
Figure 21D:
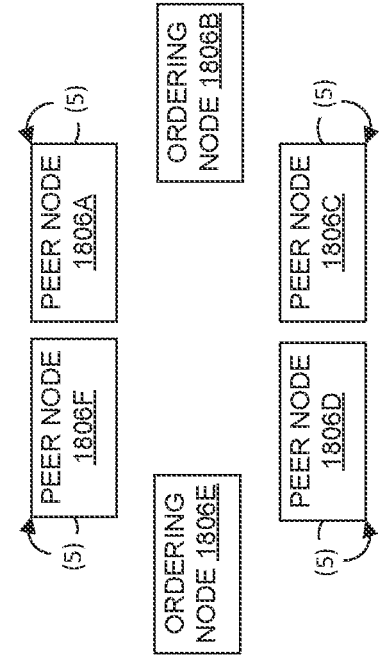
Figure 21A:
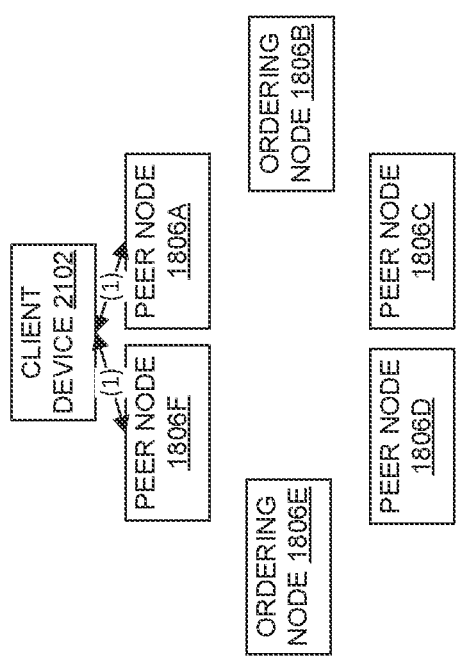

In the illustrated embodiment of FIG. 21A, (1) a client computing device 2102 proposes a transaction to peer nodes 1806A and 1806F and receives an endorsed transaction in return. As mentioned, the peer nodes 1806A and 1806F may be associated with different parties or organizations. Further, the proposed transaction may relate to a proposed physical transaction between the different organizations.

The peer nodes 1806A and 1806F process the proposed transaction and determine whether to endorse it. In certain embodiments, upon receipt of the proposed transaction, the peer nodes 1806A may assign a transaction identifier to the proposed transaction. In certain embodiments, the client computing device 2102 may generate a transaction identifier for the proposed transaction and communicate the transaction identifier to the peer nodes 1806A and 1806F with the or as part of the proposed transaction. The peer nodes 1806 and ordering node 1806 may use the transaction identifier to uniquely identify the transaction throughout the validation process.

In some cases, processing the proposed transaction may include executing bytecode related to the proposed transaction using one or more blocks of a respective peer node ledger 1808 or by referencing the ledger state 1904. In certain cases, the execution of the bytecode does not modify any blocks or the ledger state 1904, but merely verifies whether the proposed transaction could be done based on the information in the blocks and ledger state 1904. In response to the proposed transaction, the peer nodes 1806A, 1806F may endorse the proposed transaction. For example, if the proposed transaction includes the proper credentials and references the correct values of the ledger state 1904, and identifies the proper values as part of the transaction, the peer nodes 1806A, 1806F may endorse the proposed transaction. As yet another example, the peer nodes 1806 may endorse a transaction based on a user determining that an entity associated with the peer node 1806 desires to proceed with the transaction. For example, if the transaction corresponds to the change in ownership, then the entities associated with the change in ownership may endorse the proposed transaction via the peer nodes 1806.

In some cases, the peer nodes 1806A, 1806F may endorse the proposed transaction by digitally signing the proposed transaction using a private key of a public-private key pair. In certain cases, if the peer nodes 1806A, 1806F do not endorse the proposed transaction (within a particular time period) the transaction may fail or the client computing device 2102 may resubmit the proposed transaction at a later time.

In the illustrated embodiment of FIG. 21A, the client computing device 2102 communicates with peer nodes 1806A and 1806F. However, it will be understood that the interactions may vary depending on the type of transaction, permissions, etc. In some cases, based on the transaction, the client computing device 2102 interacts with only one peer node 1806. In certain embodiments, the client computing device 2102 may interact with multiple peer nodes 1806. Further, in some embodiments, as part of the validation, one peer node 1806 may interact with another peer node 1806. For example, if the transaction is a transfer of ownership between an entity associated with peer node 1806A and a different entity associated with peer node 1806F, and the transaction is initiated with peer node 1806A, the peer node 1806A may communicate the proposed transaction to peer node 1806F for endorsement. In certain embodiments, an application executing on the client computing device 2102 identifies the peer nodes 1806 that are associated with a particular proposed transaction and communicates the proposed transaction to the different peer nodes 1806 for endorsement. In some cases, the peer nodes may endorse the proposed transaction in a round robin fashion. For example, after one peer node 1806 endorses the proposed transaction, it may forward the proposed transaction to another peer node for endorsement until a threshold number (e.g., all or a particular subset) of the peer nodes 1806 have endorsed the proposed transaction. In some embodiments, the ordering nodes 106 are not involved with the endorsement of the proposed transaction.

With reference to FIG. 21B, the client computing device 2102 may (2) request the ordering nodes 1806B, 1806E to order the transaction. As part of requesting the ordering nodes 1806 to order the transaction, the client computing device 2102 may provide the ordering nodes 1806B, 1806E with the endorsed transaction.

Although illustrated as providing the endorsed transactions to two ordering nodes, it will be understood that the client computing device 2102 may provide the endorsed transactions to fewer or more ordering nodes 1806 as desired. In addition, in certain embodiments, one or more of the endorsing peer nodes 1806A, 1806F may provide the endorsed transaction to the ordering nodes 1806B, 1806E for ordering.

The ordering nodes 1806B, 1806E may (3) process the endorsed transaction received from the client computing device 2102. In some cases, processing the endorsed transaction may include ordering the endorsed transaction relative to other endorsed transactions of the distributed ledger system 1802. For example, multiple client computing devices 2102 may be interacting with any combination of the peer nodes 1806 to generate endorsed transactions. The ordering nodes 1806 may receive the endorsed transactions and order them.

In certain embodiments, the ordering nodes 1806 may order the endorsed transactions based on a timestamp, such as the first, last, or an average of the timestamps of one or more of the endorsements (e.g., the timestamp associated with the peer node 1806A and/or the peer node 1806F), the timestamp of the proposed transaction submission or creation, etc.

In addition, as part of processing the endorsed transactions, the ordering nodes 1806B, 1806E may generate a block for a blockchain using the endorsed transactions, including generating a header, body, and/or other parts of the block, as discussed above. In some cases, the ordering nodes 1806B, 1806E may append the generated blocks to a local blockchain or ordering node ledger 1808. In some cases, when appending the generated blocks to the local blockchain, the ordering nodes 1806 do not validate the transactions of the block. In certain embodiments, the peer nodes 1806 are not involved with the ordering of the transactions and/or the creation of the blocks from the ordered transactions.

Figure 21C:
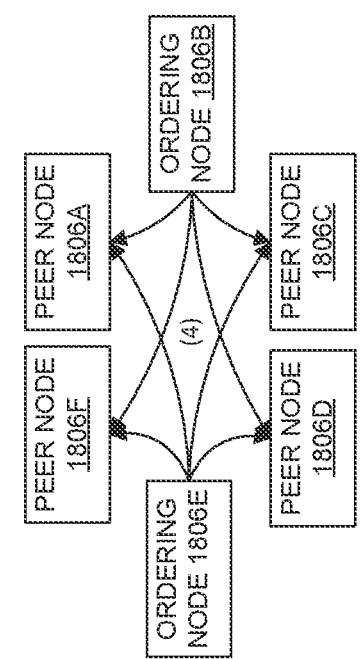

With reference to FIG. 21C, the ordering nodes 1806B, 1806E (4) communicate the generated blocks to the peer nodes 1806A, 1806C, 1806D, 1806F for validation and commitment to a blockchain. As described herein, each generated block may include one or more endorsed transactions in a body portion, a header portion, and/or metadata, etc. As described herein, at least with reference to FIG. 20, the header portion may include a hash of each transaction in the block, a hash of the hashes of each transaction, a hash of all transactions of the block or the content of a body portion of the block, a hash of a previous block of the blockchain, etc. Although both ordering nodes 1806B, 1806E are illustrated as providing the generated blocks to all peer nodes 1806A, 1806C, 1806D, 1806F, it will be understood that in some cases, each ordering node 1806 provides the generated blocks to a subset of the peer nodes 1806A, 1806C, 1806D, 1806F (e.g., ordering node 1806B may send the generated blocks to peer nodes 1806A, 1806C and ordering node 1806E may send the generated blocks to peer nodes 1806D, 1806F) or only one ordering node 1806 may provide the generated blocks to all peer nodes 1806.

The body portion may include one or more transactions or transaction data. As described herein, in some embodiments, the transaction data may include any combination of: a timestamp corresponding to the transactions submission/creation, an identifier of the code (or bytecode) associated with the transaction, a signature or identification of the client computing device (or corresponding application) that initiated the transaction, a signature or identifier of the endorsing peer nodes (peer nodes 1806A, 1806F that signed and/or endorsed the transaction), a signature or identifier of the ordering node 1806B that ordered the transaction and/or generated the block, a proposed change to the ledger, a channel identifier that identifies the channel associated with the blockchain, an expected input/output of the transaction, such as the content of a database of the ledger that stores the key-values associated with different transactions before and after the change is implemented, etc. Further, in some cases, the transaction data may include an identification of log data generated during bytecode execution, a bytecode response, etc.

As illustrated at FIG. 21D, the peer nodes 1806A, 1806C, 1806D, 1806F may (5) validate the transactions in the block and append or commit the block to a peer node ledger 1808 and/or a peer node blockchain. In certain embodiments, the peer nodes 1806A, 1806C, 1806D, 1806F may validate the transactions by comparing the expected inputs (e.g., value indicated in the transaction for a particular key of the ledger state 1904 compared to the actual value of the key in the ledger state 1904). In some cases, if the value or state of the key in the ledger state 1904 matches the value or state identified by the transaction, the peer node 1806 may validate the transaction. In certain cases, the peer nodes may validate the transactions based on permissions or other information associated with the endorsing peer nodes 1806A, 1806F, etc.

In addition, in some cases, the peer nodes 1806A, 1806C, 1806D, 1806F may update the ledger state 1904 based on the transactions. For example, as described herein, the ledger state 1904 may store key-values corresponding to the subject of one or more transactions. When a transaction affects a particular key-value pair, the peer nodes 1806 may update the key-value pair in the respective ledger state 1904 and append the corresponding block to the blockchain of the respective peer node ledger 1808. As described herein, the ledger state 1904 may reflect the current state or value of a key based on the combination of valid transactions in a blockchain.

Throughout the validation process, the nodes 1806 may generate different types of data, such as, but not limited to transaction notifications, log data, and/or metrics data.

In some cases, the peer nodes 1806 may generate one or more transaction notifications. The transaction notifications may correspond to individual transactions of a block, the entire block, or parts of a transactions, such as the bytecode used as part of a transaction, etc. In some cases, the transaction notifications may include the entire content of a block (e.g., the header portion, body portion, transactions, metadata, etc.), or a summary of information, such as an indication of which transactions were validated and/or posted to a peer node blockchain. In certain embodiments, the notifications may be stored in a pub-sub or buffer and/or the peer nodes 1806 may notify the client computing device 2102 based on the generated transaction notifications, and provide client computing device 2102 with information about the transaction as part of the block of a blockchain. In some cases, the peer node 1806 may indicate to the client computing device 2102 whether the transaction was validated or invalidated, etc.

In addition to generating notifications, the nodes 1806 may generate log data. The log data may correspond to or identify different transactions that are being processed by the nodes 1806 or other activities related to the node, such as errors, etc. For example, the log data generated by a peer node 1806 may indicate what the peer node 1806 doing for a particular proposed transaction (e.g., receive transaction, assign transaction identifier, endorse transaction, validate/invalidate transaction, post block with transaction to blockchain, read/write proposed changes of the transaction to the ledger state 1904, etc.). Similarly, the ordering nodes 1806 may generate log data indicative of activities it is executing relative to the transactions (e.g., receive endorsed transaction, order transaction, generate block, add transaction to a block, communicate transaction to peer nodes as part of the block, post transaction to blockchain as part of a block, etc.). Though log data may capture the activity of a node as the node processes transactions, the log data for the node can, in some cases, only capture the activity of the one node. Depending on the implementation of the nodes 1806, the log data may be stored in a data store of the nodes, and/or converted and stored as part of log data of an isolated execution environment system, etc.

Moreover, as the nodes 1806 process data, they may generate certain metrics. For example, the nodes 1806 may generate CPU usage, disk space, and/or other metrics. Though the metrics for a node result from processing performed by the node, metrics data may not capture any information about transactions that were processed. In some cases, the metrics are stored in a data store of the nodes 1806.

The data intake and query system 108 may ingest and correlate the data generated by a distributed ledger system 1802. In some cases, the data intake and query system 108 may ingest the data using different components. For example, the data intake and query system 108 may use a monitor to ingest one type of data and use a forwarder, connector, and/or data adapter for other types of data.

Based on the collected data, the data intake and query system 108 may identify correlations between transactions that are included in a blockchain and corresponding log data and metrics data. This information may provide insight into the inner workings of the distributed ledger system 1802, identify performance issues, security issues, errors, etc. By identifying faults, errors, and issues with the different components of the distributed ledger system 1802, the data intake and query system 108 may improve the distributed ledger system 1802 as a whole. For example, based on the identified issues, system configurations may be adjusted, components may be fixed or reconfigured, etc. In this way, the data intake and query system 108 may improve the speed, efficiency, throughput, and processing power of the distributed ledger system 1802. In addition, by correlating the different data types or associating data from different nodes of the distributed ledger system 1802, the data intake and query system 108 may track the throughput of the system, identify bottlenecks, and be used to make adjustments to the distributed ledger system 1802.

Figure 22:
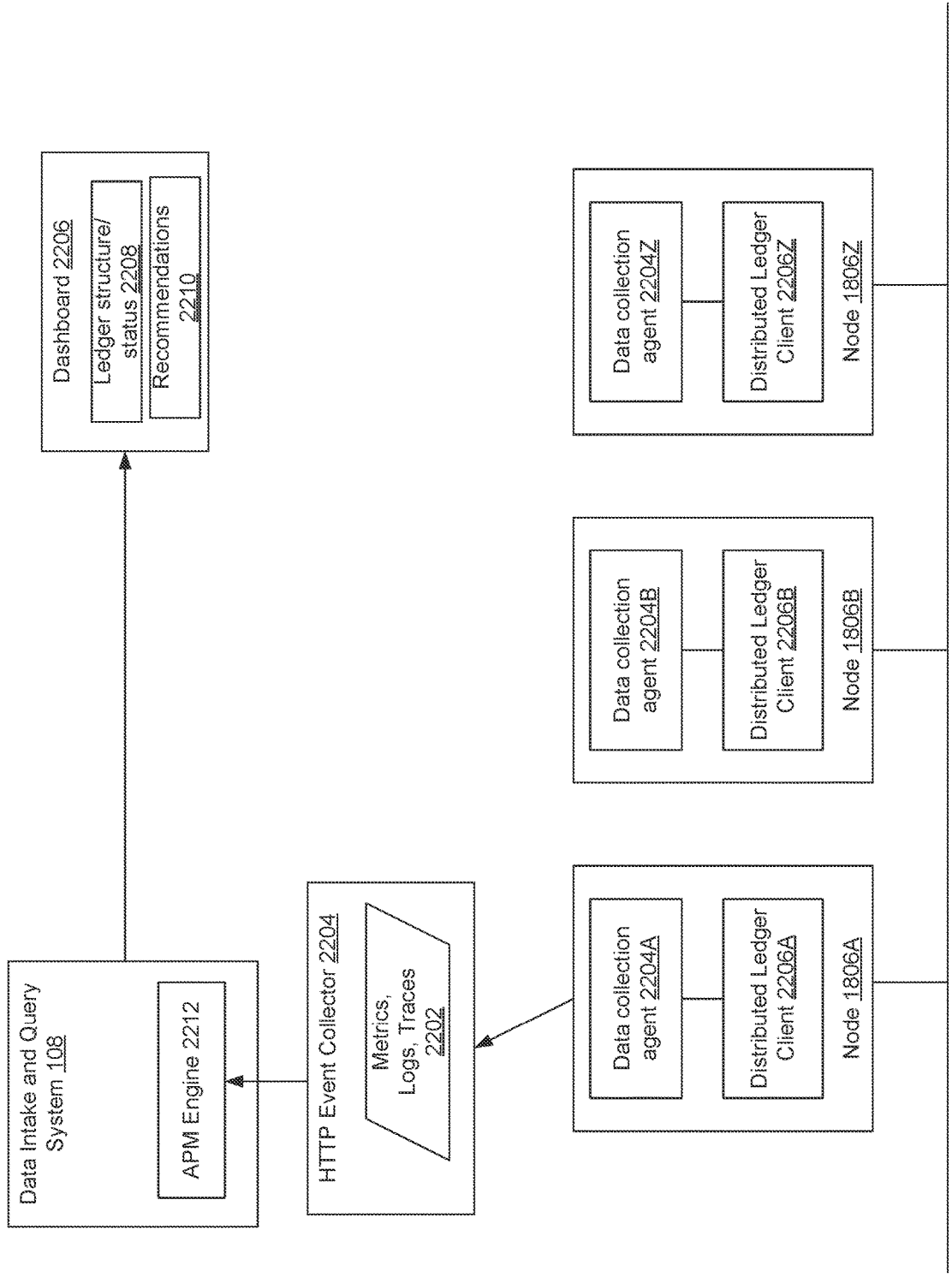
FIG. 22 is a data flow diagram illustrating data ingestion from the distributed ledger system 1802 by the data intake and query system 108 operating in accordance with aspects of the present disclosure.

FIG. 22 is a data flow diagram illustrating data ingestion and processing from the distributed ledger system 1802 by the data intake and query system 108 operating in accordance with aspects of the present disclosure. As noted herein above, the data intake and query system 108 may include an application performance monitoring (APM) engine 2212, which is employed to receive and process metric, trace, and log data from data collector agents 2204A-2204Z operating on nodes 1806A-1806Z. In some implementations, the data collector agents 2204A-2204Z may further forward the distributed ledger transaction and event data to the data intake and query system 108. In an illustrative example, a transaction may include the transaction identifier, a timestamp, the source account identifier, the destination account identifier, and a bytecode invoking a smart contract.

A data collector agent 2204 installed on a node 1806 may receive the metric, trace, and log data from one or more processes implementing the distributed ledger client functionality of the node 1806. In various illustrative example, the data collector agent may receive the data via one or more TCP connections, RPC calls, and/or other suitable inter-process communication mechanisms.

In various illustrative examples, the metrics may reflect computing resource usage by the node (e.g., CPU, disk, memory, network, energy), network communications by the node, overall system availability. The metrics may further reflect various operational aspects of the distributed ledger node, such as the synchronization state of the node, the highest block number processed by the node, the connectivity of the node with peer nodes 1806, etc.).

In some implementations, the executable code implementing at least some functions performed by the distributed ledger client may be instrumented for intercepting function calls and messages passed between software components operating on the node 1806. Execution traces may be generated that show the functions being called together with their input parameter values, return values, and timestamps. Furthermore, the executable code implementing at least some functions performed by the distributed ledger client 2206 operating on the node 1806 may be instrumented, e.g., by injecting timer reading instructions and/or other executable instructions at the entry and exit points of each function (method) being instrumented. The recorded timer values may be utilized for generating execution profiles of various functions performed by the distributed ledger client.

In addition to the metrics and traces, the data collector agent installed on the node 1806 may ingest the logs generated by various processes running on the node 1806. The log data may be generated in response to one or more functions performed by the node 1806 or events occurring on the node 1806, such as an error, receipt of a request from another node 1806, or in response to the node 1806 processing a transaction of the distributed ledger system 1802. The log data may include information about the function or event, such as an identification of the error, a transaction identifier corresponding to the transaction being processed and the nature of the processing task, etc. In some embodiments, the log data may correspond to or identify different transactions that are being processed by the nodes 1806. For example, the log data generated by a peer node 1806 may identify the processing task being performed on a particular transaction (e.g., receive transaction, endorse transaction, validate/invalidate transaction, commit block with transaction to blockchain, read/write the proposed changes of the transaction to the ledger state 1904, etc.). Similarly, an ordering node 1806 may generate log data indicative of activities it is executing relative to a transaction (e.g., receive endorsed transaction, order transaction, add transaction to a block, communicate transaction to peer nodes 1806 as part of the block, committing transaction to blockchain as part of a block, etc.).

Before being transmitted to the data intake and query system 108, the collected metrics, traces, and logs raw data may be anonymized to exclude any personal identifiable information (PII), filtered, and/or otherwise transformed. In some implementations, the collected metric, trace, and log data may be processed by the data collector agent in order to produce certain synthetic metrics reflecting various operational aspects of the distributed ledger node. In an illustrative example, the data collector agent may, by analyzing the collected raw data, determine the number of blocks processed by the distributed ledger node within a specified period of time, the currently observed block processing time, the number of transaction processed by the node within a specified period of time, and the currently observed time for propagating a block to peer nodes. In another illustrative example, the data collector agent may determine the number of currently active peer nodes and the number of peer connections performed by the distributed ledger node within a specified period of time. In another illustrative example, the data collector agent may determine the number of errors observed by the distributed ledger node within a specified period of time, the number of invalid connections by the distributed ledger node within a specified period of time, and the number of bad peers observed by the distributed ledger node within a specified period of time.

In some implementations, the collected metrics, traces, and logs raw data may be processed by the data collector agent in order to produce profiling data reflecting the operation of the distributed ledger node. In various illustrative example, the profiling data may reflect the elapsed time to store various data objects to a local data store, to perform various block processing functions (e.g., verifying block signature, computing a hash of the block), to receive and/or transmit messages, to run discovery sessions, to obtain a number of peers that would be sufficient for synchronization, etc.

The collected data, including the metrics, traces, and/or logs, may be fed to the data intake and query system 108, e.g., in the form of JSON objects 2202, via a forwarder or an HTTP event collector 2204.

The data intake and query system 108 may process the data received from one or more distributed ledger nodes 1806 in order to identify the structure of the distributed ledger system 1802 and/or given node 1806, identify node failures or bottlenecks, perform node diagnostics, and generate troubleshooting and/or performance improvement recommendations.

The data intake and query system 108 may correlate multiple data items of the metrics, log, and trace data based on the timestamps, transaction identifiers, node identifiers, and/or other suitable information. This way, the data intake and query system 108 may identify relevant metrics of the node 1806 corresponding to particular log data and/or transaction notification.

Analyzing the collected metrics, log, trace, and transaction data may provide useful insights into the state of the distributed ledger system 1802, a given transaction, and/or a specified node 1806. In an illustrative example, the data intake and query system 108 may analyze the collected metric, trace, and log data to identify components of the distributed ledger system 1802 and their relationships. In another illustrative example, by analyzing logged transaction notifications, the data intake and query system 108 may determine the number of ordering nodes, peer nodes, and channels in the distributed ledger system 1802, and may further analyze the logs to determine respective statuses of the identified components. In another illustrative example, by analyzing the metric, log, and trace data and transaction notifications of a node, the data intake and query system 108 may identify node failures in relation to particular transactions, node throughput, elapsed time and/or frequency of block generation or block commitment to a blockchain. In another illustrative example, by analyzing the collected metric, trace, and log data, the data intake and query system 108 may determine the optimal time for publishing new transactions on the distributed ledger.

Furthermore, the data intake and query system 108 may correlate the collected data from a first peer node 1806 with the collected data from a second peer node 1806. The collected and correlated data may be used to track a given transaction being received, endorsed, ordered, validated, included in a block, and/or committed to a blockchain.

In some implementations, the data intake and query system 108 may, by analyzing the collected raw data, build enhanced execution profiles of one or more functional components of a given node. The execution profiles may reflect the times of performing various operations, such as verifying block signature, generating a hash of the block, saving data to a local data store, receiving and/or sending data over the network, etc.

Based on the enhanced execution profile data, the data intake and query system 108 may build various execution profiles illustrating the timing and/or frequency of complex operations and/or state transitions by one or more nodes of the distributed ledger. In an illustrative example, the data intake and query system 108 may determine, based on the execution profiles, the time necessary for a given node to acquire a number of peer that would be sufficient for synchronization. In another illustrative example, the data intake and query system 108 may determine, based on the execution profiles, the time necessary for a given node to run a discovery session and the number of discovery operations that are necessary to establish communications with a certain number of peers. In another illustrative example, by analyzing the collected metric, trace, and log data, the data intake and query system 108 may determine the time necessary to perform a full synchronization of a distributed ledger node. In another illustrative example, by analyzing the collected metric, trace, and log data, the data intake and query system 108 may determine the block ingestion rate time necessary to perform a full synchronization of a distributed ledger node.

Furthermore, the collected and correlated data may be used to identify faults and errors in a particular node 1806. For example, if a majority of nodes of a distributed ledger system 1802 have committed a certain block to the blockchain, the data intake and query system 108 may identify a potential fault in a particular peer node that failed to commit the block.

Moreover, analysis of data received from multiple nodes 1806 may enable the data intake and query system 108 compare the throughput and other performance characteristics of multiple nodes 1806 in order to identify underperforming nodes, faulty nodes, bottlenecks, etc. In some implementations, the data intake and query system 108 may generate recommendations for resolving the detected issues and/or other performance improvement recommendations.

For example, if the block number on a given node has not been increasing for over a threshold period of time, or has not being increasing while other nodes see the larger block numbers, the node in question may not be receiving new blocks. Accordingly, the data intake and query system 108 may generate a recommended sequence of operations to be performed for diagnosing and resolving the issue, e.g., check the networking stack on the node, make sure that two or more neighboring nodes are reachable over the network, ascertain that all necessary processes are running on the node, etc.

In some implementations, the data intake and query system 108 may process at least a subset of the observed data by one or more sets of configurable rules in order to generate the corrective recommendations. In an illustrative example, a rule may specify one or more actions to be performed responsive to determining that a logical condition specified by the rule is satisfied. The logical condition may compare the values of certain data items to their respective threshold values. In another illustrative example, a rule may reference one or more related rules to be applied responsive to determining that a logical condition specified by the rule is satisfied.

In some implementations, the logical conditions and threshold values may be dynamically updated, e.g. based on the data collected from at least a threshold number of nodes 1806. In an illustrative example, one or more trainable classifiers (e.g., implemented by neural networks) may be utilized for dynamically updating the logical conditions and threshold values based on the current and historic metric, log, and trace data. In an illustrative example, the threshold time value utilized for detecting a faulty node based on the node's failure to commit a given block that has been committed by other peer nodes may be dynamically updated to reflect an aggregate statistic (e.g., average or median) of the elapsed times to commit a block by at least a subset of peer nodes 1806.

In some implementations, the corrective recommendations may be generated based on the output of one or more trainable classifiers (e.g., implemented by neural networks) that may ingest at least a subset of the collected data and produce the node status and optional corrective recommendations with respect to a specified node. The trainable classifiers may be trained based on the current and historic metric, log, and trace data. In an illustrative example, a convolutional neural network may be utilized for determining the status of a given node 1806 based on a subset of the collected metric, log, and trace data. In particular, the convolutional neural network may generate, for each node 1806, a corresponding embedding (i.e., a vector of numeric values) reflecting the collected metrics, logs, and traces data for a certain time frame. "Embedding" herein refers to a numeric vector representing a subset of the metrics, loss, and trace data in a multidimensional space having an associated distance metric reflecting the similarity of the subsets of the collected data, such that two or more vectors representing similar subsets of the collected data would be located close to each other, based on a chosen distance metric, in the multidimensional space. The number of elements in the embedding vector may be substantially smaller than the number of elements in the input vector of the collected metric, log, and trace data that is processed by the convolutional neural network. Thus, the convolutional neural network would perform the dimensionality reduction of the input data without losing relevant information reflecting the node status. The computed embeddings may then be utilized for clustering the nodes of the distributed ledger in two or more clusters, such that normally performing nodes would be clustered together in one cluster, while any outlier nodes located at a more than a threshold distance from the centroid of the cluster would be classified as performing abnormally.

In an illustrative example, the data intake and query system 108 may generate an alert identifying the outlier nodes. The generated alert may be visually represented via a graphical user interface (e.g., by highlighting the visual objects representing the outlier nodes in the graphic representation of the structure of the distributed ledger and/or by displaying textual messages informing the user of the potentially faulty status of the outlier nodes).

In some implementations, analysis of data received from multiple nodes 1806 may also enable identification of potential security issues, such as, validated transactions that were not endorsed, digital certificate or signature abnormalities, abnormal volumes of transactions by a node, significant interactions of a node with computers from a particular geographic area or block of IP addresses, etc.

The data intake and query system 108 may render various visual representations of the data received from the data collector agents operating on the nodes 1806 and/or information and recommendations derived from the collected data. An example visual representation may include various components of the components of the distributed ledger system 1802.

In some implementations, the visual representation may reflect the structure of the distributed ledger, which may be enhanced by statuses of individual components of the distributed ledger system 1802. For example, a visual object representing a distributed ledger node may be colored green to indicate the "healthy" status (e.g., fewer than a threshold number of errors/warnings or no errors/warnings) and red to indicate the "error" status (e.g., greater than a threshold number of errors or warnings, certain performance metrics falling below their respective threshold values, certain timing parameters exceeding their threshold values, etc.). In some implementations, the visual representation may track various processing steps of a transaction across different nodes of the distributed ledger system 1802.

The graphical user interface may also enable the user to drill down on visual representations of the nodes of the distributed ledger system 1802 to display information, metrics, and log data in order to evaluate the performance and/or perform troubleshooting of a component. In certain embodiments, such as when a user "drills down" to a particular component, the visualization may display log data, metrics data, traces data, transaction data, corrective recommendations, etc.

Figure 23A:
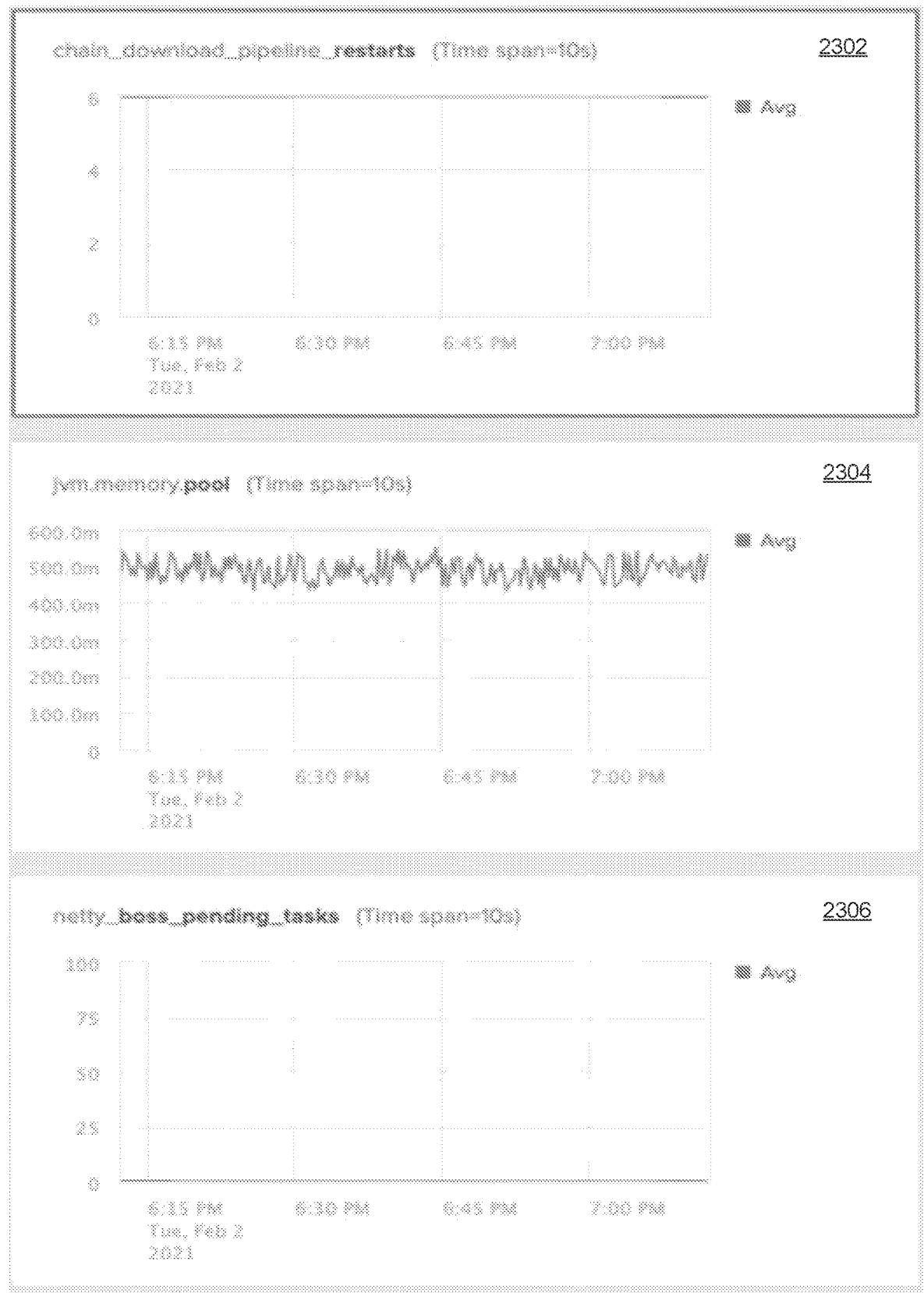
FIGS. 23A-23C illustrate visual representations of metrics data of a distributed ledger node.
Figure 23B:
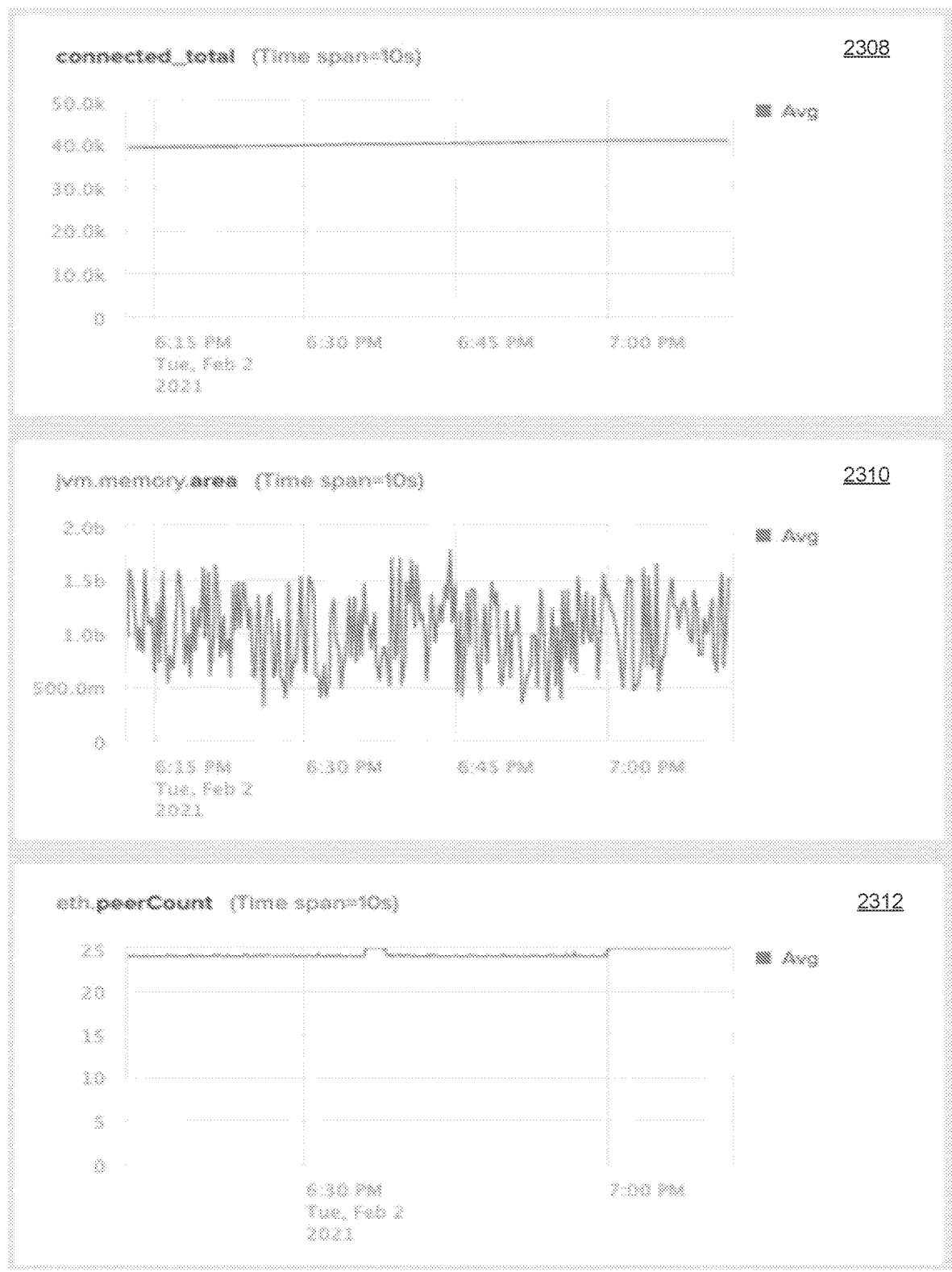
Figure 23C:
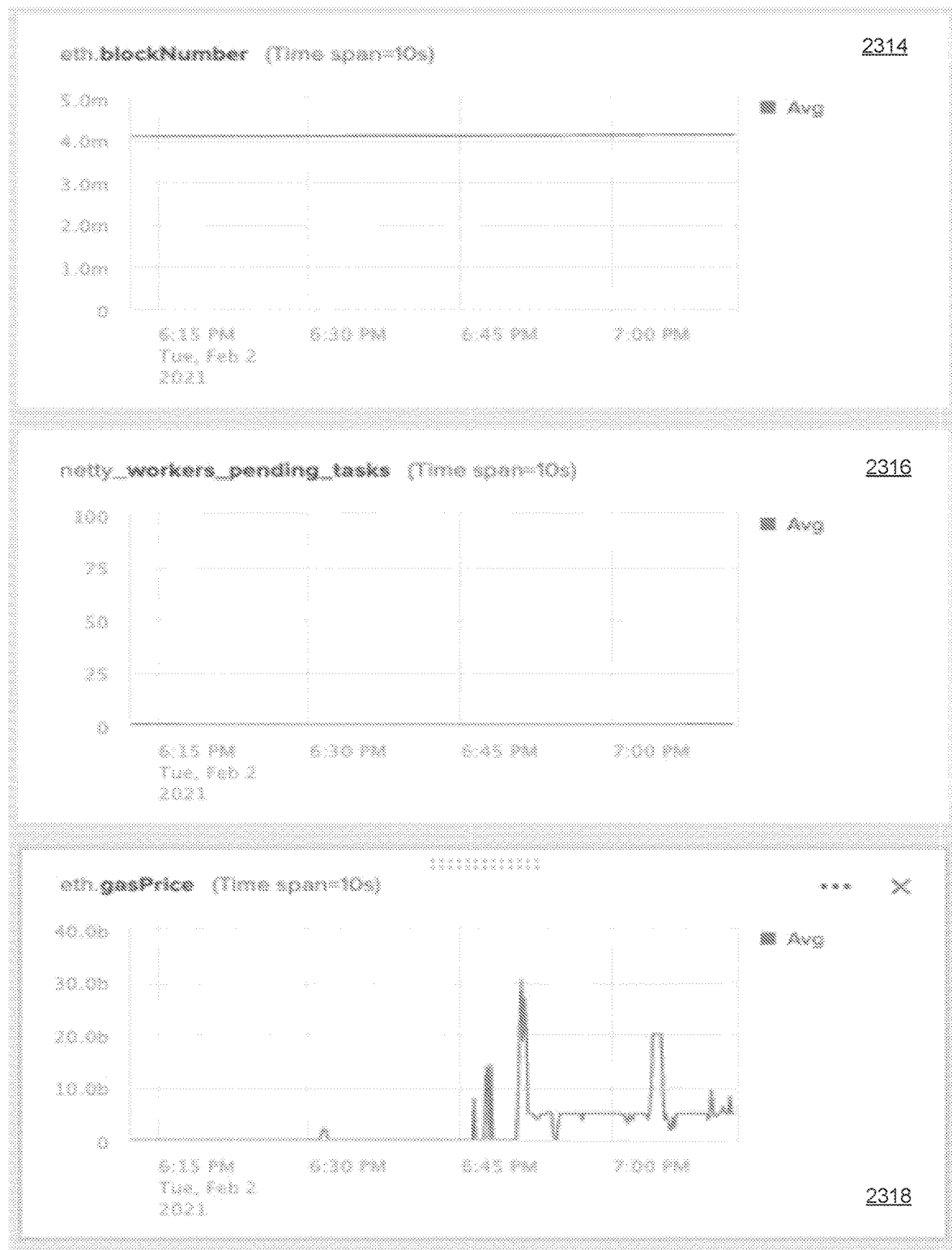

FIGS. 23A-23C illustrate visual representations of metrics data of a distributed ledger node 1806. In particular, screenshot 2302 shows an example plot of number of chain download pipeline restarts vs. time at a particular node of the distributed ledger. Screenshot 2304 shows an example plot of the free space in the Java Virtual Machine (JVM) memory pool vs. time at a particular node of the distributed ledger. Screenshot 2306 shows an example plot of the number of networking threads vs. time at a particular node of the distributed ledger. Screenshot 2308 shows an example plot of the number of connected peer nodes vs. time at a particular node of the distributed ledger. Screenshot 2310 shows an example plot of the JVM memory area vs. time at a particular node of the distributed ledger. Screenshot 2312 shows an example plot of the peer count vs. time at a particular node of the distributed ledger. Screenshot 2314 shows an example plot of the block number vs. time at a particular node of the distributed ledger. Screenshot 2316 shows an example plot of the number of pending tasks vs. time at a particular node of the distributed ledger. Screenshot 2318 shows an example transaction unit price count vs. time at a particular node of the distributed ledger.

Figure 24:
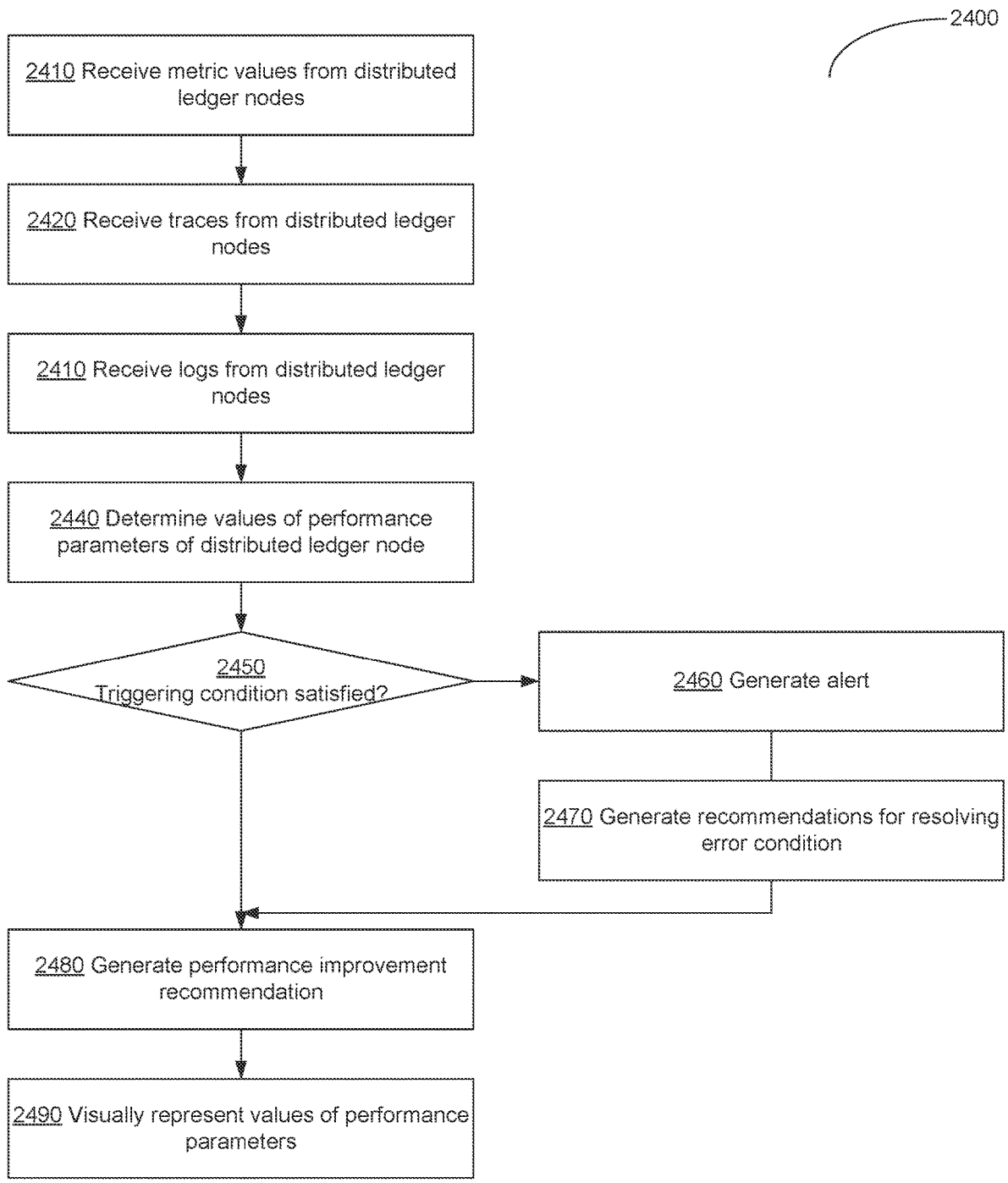
FIG. 24 is a flow diagram of an embodiment of an example method of performance monitoring of distributed ledger nodes, in accordance with aspects of the present disclosure.

FIG. 24 is a flow diagram of an embodiment of a method 2400 of performance monitoring of distributed ledger nodes, in accordance with aspects of the present disclosure. Method 2400 and/or each of its individual functions, routines, subroutines, or operations may be performed by one or more processors of the APM engine 2212 and/or other components of the data intake and query system 108. In certain implementations, method 2400 may be performed by a single processing thread. Alternatively, method 2400 may be performed by two or more processing threads, each thread executing one or more individual functions, routines, subroutines, or operations of the method. In an illustrative example, the processing threads implementing method 2400 may be synchronized (e.g., using semaphores, critical sections, and/or other thread synchronization mechanisms). Alternatively, the processing threads implementing method 2400 may be executed asynchronously with respect to each other. Therefore, while FIG. 24 and the associated description lists the operations of method 2400 in certain order, various implementations of the method may perform at least some of the described operations in parallel and/or in arbitrary selected orders. While method 2400 is described as being implemented by the data intake and query system 108, one or more operations of method 2400 may be implemented by one or more computing devices/components that are associated with a data intake and query system 108, such as the search head 210, indexer 206, etc.

At block 2410, the processing device implementing the method receives, from one or more distributed ledger nodes, values of metrics reflecting operational parameters of one or more tasks performed by the distributed ledger node. In various illustrative examples, the metrics may reflect the number of distributed ledger peers, the current block number, the current transaction price, the number of retries for performing a particular distributed ledger task, the total elapsed time for performing a particular distributed ledger task, the aggregated transaction processing time over a specified time period, the aggregated number of errors over a specified time period, or the aggregated number of network connections over a specified time period, as described in more detail herein above. The processing device appends the received metric values to a data set storing metric, trace, and log data.

At block 2420, the processing device receiving process trace information of one or more computing processes performing respective tasks of the distributed ledger nodes, as described in more detail herein above. The processing device appends the received trace data to a data set storing metric, trace, and log data.

At block 2430, the processing device receives one or more logs of computing processes performing respective tasks of the distributed ledger nodes, as described in more detail herein above. The processing device appends the received logs to a data set storing metric, trace, and log data.

At block 2440, the processing device determines, by analyzing the data set comprising the values of the plurality of metrics, values of one or more performance parameters of one of the distributed ledger nodes, as described in more detail herein above.

Responsive to determining, at block 2450, that the value of the performance parameter satisfies an alert triggering condition, the processing device, at block 2460, generates an alert. In an illustrative example, the alert triggering condition may specify one or more threshold values of the parameter. In another illustrative example, the processing device may apply a trainable classifier (e.g., a convolutional neural network) to the data set and determine that the alert triggering condition is satisfied if the output vector produced by the convolutional neural network is located at a more than a threshold distance from the centroid of the cluster of normally performing nodes. The generated alert may be displayed via a graphical user interface and/or transmitted via one or more communication interfaces to one or more external computing devices (e.g., smartphones), as described in more detail herein above.

At block 2470, the processing device applies a set of configurable rules to the data set to generate a recommended sequence of operations to be performed for resolving the error condition that has triggered the alert, as described in more detail herein above.

At block 2480, the processing device generates a performance improvement recommendation with respect to the distributed ledger node.

At block 2490, the processing device causing the values of one or more performance parameters of the distributed ledger be visually rendered via a graphical user interface (GUI) in a visual association with at least a subset of the values of the plurality of metrics, traces, or logs reflecting operational parameters.

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above may be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements may be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein may be performed in a different sequence, may be added, merged, or left out altogether (e.g., not all are necessary for the practice of the algorithms). In certain embodiments, operations, acts, functions, or events may be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems may be distributed across multiple machines, networks, and other computing resources. In certain embodiments, one or more of the components of the data intake and query system 108 may be implemented in a remote distributed computing system. In this context, a remote distributed computing system or cloud-based service may refer to a service hosted by one more computing resources that are accessible to end users over a network, for example, by using a web browser or other application on a client device to interface with the remote computing resources. For example, a service provider may provide a data intake and query system 108 by managing computing resources configured to implement various aspects of the system (e.g., search head 210, indexers 206, etc.) and by providing access to the system to end users via a network.

When implemented as a cloud-based service, various components of the system 108 may be implemented using containerization or operating-system-level virtualization, or other virtualization technique. For example, one or more components of the system 108 (e.g., search head 210, indexers 206, etc.) may be implemented as separate software containers or container instances. Each container instance may have certain resources (e.g., memory, processor, etc.) of the underlying host computing system assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques may be used. For example, the components may be implemented using virtual machines using full virtualization or paravirtualization, etc. Thus, where reference is made to "containerized" components, it should be understood that such components may additionally or alternatively be implemented in other isolated execution environments, such as a virtual machine environment.

Likewise, the data repositories shown may represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown may communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that may direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention may be modified, if necessary, to employ the systems, functions, and concepts of the various references described above to provide yet further implementations of the invention. These and other changes may be made to the invention in light of the above Detailed Description. While the above description describes certain examples of the invention, and describes the best mode contemplated, no matter how detailed the above appears in text, the invention may be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method implemented by one or more processing devices, the method comprising:
   receiving, by an application performance monitoring engine, from a data collector agent operating at a first node of a plurality of nodes of a distributed ledger implementing an immutable database, values of a plurality of metrics reflecting aggregated transaction processing times over respective specified time periods by the first node;
   determining, by analyzing a data set comprising the values of the plurality of metrics, a value of a performance parameter of the first node; and
   generating an alert responsive to determining that the value of the performance parameter satisfies an alert triggering condition.

2. The method of claim 1, further comprising:
   identifying, by applying a trainable classifier to the data set, an error condition at the first node;
   generating, by applying a set of configurable rules to the data set, a recommended sequence of operations to be performed for resolving the error condition.

3. The method of claim 1, further comprising:
   generating a performance improvement recommendation with respect to the first node.

4. The method of claim 1, further comprising:
   receiving process trace information of a computing process performing one or more functions of the first node; and
   appending the process trace information to the data set.

5. The method of claim 1, further comprising:
   receiving a log of a computing process performing one or more functions of the first node; and
   appending the log to the data set.

6. The method of claim 1, further comprising:
   causing the value of the performance parameter of the first node be visually rendered via a graphical user interface (GUI) in a visual association with at least a subset of the values of the plurality of metrics.

7. The method of claim 1, wherein at least one metric of the plurality of metrics reflects one of: a number of distributed ledger peers, a current block number, or a current transaction price.

8. The method of claim 1, wherein at least one metric of the plurality of metrics reflects a number of retries for performing a particular distributed ledger task.

9. The method of claim 1, wherein at least one metric of the plurality of metrics reflects a total elapsed time for performing a particular distributed ledger task.

10. The method of claim 1, wherein at least one metric of the plurality of metrics reflects one of: an aggregated number of errors over a specified time period or an aggregated number of network connections over a specified time period.

11. The method of claim 1, wherein the performance parameter of the first node reflects a time for completing a full synchronization of the first node.

12. The method of claim 1, wherein the performance parameter of the first node reflects a block ingestion rate.

13. The method of claim 1, wherein the performance parameter of the first node reflects a suggested time of day for executing one or more distributed ledger transactions.

14. The method of claim 1, wherein the distributed ledger is an Ethereum system.

15. A computing system, comprising:
    a memory; and
    one or more processing devices coupled to the memory, the one or more processing devices to:
       receive, from a data collector agent operating at a first node of a plurality of nodes of a distributed ledger implementing an immutable database, values of a plurality of metrics reflecting aggregated transaction processing times over respective specified time periods by the first node;
       determine, by analyzing a data set comprising the values of the plurality of metrics, a value of a performance parameter of the first node; and
       generate an alert responsive to determining that the value of the performance parameter satisfies an alert triggering condition.

16. The computing system of claim 15, wherein the one or more processing devices are further to:
    identify, by applying a trainable classifier to the data set, an error condition at the first node;
    generate, by applying a set of configurable rules to the data set, a recommended sequence of operations to be performed for resolving the error condition.

17. The computing system of claim 15, wherein the one or more processing devices are further to:
    generate a performance improvement recommendation with respect to the first node.

18. The computing system of claim 15, wherein the one or more processing devices are further to:

cause the value of the performance parameter of the first node be visually rendered via a graphical user interface (GUI) in a visual association with at least a subset of the values of the plurality of metrics.

19. A non-transitory computer-readable storage medium comprising executable instructions that, when executed by a computing system, cause the computing system to:
receive, from a data collector agent operating at a first node of a plurality of nodes of a distributed ledger implementing an immutable database, values of a plurality of metrics reflecting aggregated transaction processing times over respective specified time periods by the first node;
determine, by analyzing a data set comprising the values of the plurality of metrics, a value of a performance parameter of the first node; and
generate an alert responsive to determining that the value of the performance parameter satisfies an alert triggering condition.

20. The non-transitory computer-readable storage medium of claim 19, further comprising executable instructions that, when executed by the computing system, cause the computing system to:
causing the value of the performance parameter of the first node be visually rendered via a graphical user interface (GUI) in a visual association with at least a subset of the values of the plurality of metrics.

* * * * *